United States Patent [19]
Tremblay et al.

[11] Patent Number: 6,065,108
[45] Date of Patent: *May 16, 2000

[54] NON-QUICK INSTRUCTION ACCELERATOR INCLUDING INSTRUCTION IDENTIFIER AND DATA SET STORAGE AND METHOD OF IMPLEMENTING SAME

[75] Inventors: Marc Tremblay, Palo Alto; James Michael O'Connor, Mountain View, both of Calif.

[73] Assignee: Sun Microsystems Inc, Palto Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/788,805

[22] Filed: Jan. 23, 1997

Related U.S. Application Data

[63] Continuation-in-part of application No. 08/646,442, May 7, 1996, abandoned.
[60] Provisional application No. 60/010,527, Jan. 24, 1996.

[51] Int. Cl.$^7$ ...................................................... G06F 9/34
[52] U.S. Cl. .......................... 712/201; 712/202; 711/108
[58] Field of Search ................................... 395/377, 378, 395/394; 712/201, 202; 711/108

[56] References Cited

U.S. PATENT DOCUMENTS

| | | | |
|---|---|---|---|
| 4,775,927 | 10/1988 | Hester et al. ............................ | 395/383 |
| 5,020,097 | 5/1991 | Tanaka et al. ...................... | 379/102.01 |
| 5,113,506 | 5/1992 | Moussouris et al. ........................ | 711/3 |
| 5,241,635 | 8/1993 | Papadopoulos et al. ............... | 395/377 |
| 5,349,672 | 9/1994 | Nishimukai et al. .................... | 711/123 |
| 5,367,660 | 11/1994 | Gat et al. ..................................... | 711/3 |
| 5,440,701 | 8/1995 | Matsuzaki et al. ...................... | 395/386 |
| 5,546,597 | 8/1996 | Martell et al. ...................... | 395/800.23 |
| 5,692,170 | 11/1997 | Isaman ..................................... | 395/591 |
| 5,715,427 | 2/1998 | Barrera et al. ........................... | 711/136 |
| 5,721,865 | 2/1998 | Shintani et al. ......................... | 395/464 |
| 5,790,823 | 8/1998 | Puzak et al. ............................ | 395/383 |
| 5,796,971 | 8/1998 | Emberson ................................ | 712/207 |
| 5,809,566 | 9/1998 | Charney et al. ......................... | 711/213 |

OTHER PUBLICATIONS

Reid (Thinking in PostScript) Addison–Wesley Publishing Co. pp.28–29, Jun. 1990.

*Primary Examiner*—Larry D. Donaghue
*Assistant Examiner*—Gautam R. Patel
*Attorney, Agent, or Firm*—Skjerven, Morrill, MacPherson, Franklin & Friel, L.L.P.

[57] ABSTRACT

An instruction accelerator which includes a processor and an associative memory. The processor is coupled to receive a stream of instructions and a corresponding stream of instruction identifier values. The instructions include at least one non-quick instruction which has a first associated data set which must be accessed prior to executing the non-quick instruction. A memory, which is coupled to the processor, stores one or more instruction identifier values and one or more associated data sets. The memory receives the stream of instruction identifier values. When a current instruction identifier value in the stream of instruction identifier values matches an instruction identifier value stored in the memory, an associated data set is accessed from the memory. More specifically, if the first instruction identifier value and the first data set are stored in the memory, and the current instruction identifier value is equal to the first instruction identifier value, then the first data set is read out of the memory. Execution of the non-quick instruction is accelerated because the first data set is readily accessible within the memory. If the first data set is not stored in the memory, the associative memory and the processor control the initial retrieval of the first data set.

23 Claims, 6 Drawing Sheets

NON-QUICK INSTRUCTION ACCELERATOR INCLUDING INSTRUCTION IDENTIFIER AND DATA SET STORAGE AND METHOD OF IMPLEMENTING SAME

RELATED APPLICATIONS

This application claims the benefit of U.S. Provisional Application Ser. No. 60/010,527, filed Jan. 24, 1996, entitled "Methods and Apparatuses for Implementing the JAVA Virtual Machine" (JAVA is a trademark of Sun Microsystems, Inc.) and naming Marc Tremblay, James Michael O'Connor, Robert Garner, and William N. Joy as inventors, and is a continuation-in-part application of U.S. application Ser. No. 08/646,442, now abandoned, filed May 7, 1996, entitled "Apparatus and Method for Enhancing the Operational Speed of the JAVA Virtual Machine", and naming Marc Tremblay and James Michael O'Connor as inventors that also claimed the benefit of U.S. Provisional Application Ser. No. 60/010,527, filed Jan. 24, 1996, entitled "Methods and Apparatuses for Implementing the JAVA Virtual Machine" and naming Marc Tremblay, James Michael O'Connor, Robert Garner, and William N. Joy as inventors.

REFERENCE TO SECTION I

A portion of the disclosure of this patent document including Section I, The JAVA Virtual Machine Specification and Section A thereto, contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

BACKGROUND OF THE INVENTION

1. Field of the Invention

The present invention relates generally to computer systems, and in particular, to the accelerated execution of instructions in a computer system.

2. Discussion of Related Art

Many individuals and organizations in the computer and communications industries tout the Internet as the fastest growing market on the planet. In the 1990s, the number of users of the Internet appears to be growing exponentially with no end in sight. In June of 1995, an estimated 6,642,000 hosts were connected to the Internet; this represented an increase from an estimated 4,852,000 hosts in January, 1995. The number of hosts appears to be growing at around 75% per year. Among the hosts, there were approximately 120,000 networks and over 27,000 web servers. The number of web servers appears to be approximately doubling every 53 days.

In July 1995, with over 1,000,000 active Internet users, over 12,505 usenet news groups, and over 10,000,000 usenet readers, the Internet appears to be destined to explode into a very large market for a wide variety of information and multimedia services.

In addition, to the public carrier network or Internet, many corporations and other businesses are shifting their internal information systems onto an intranet as a way of more effectively sharing information within a corporate or private network. The basic infrastructure for an intranet is an internal network connecting servers and desktops, which may or may not be connected to the Internet through a firewall. These intranets provide services to desktops via standard open network protocols which are well established in the industry. Intranets provide many benefits to the enterprises which employ them, such as simplified internal information management and improved internal communication using the browser paradigm.

Integrating Internet technologies with a company's enterprise infrastructure and legacy systems also leverages existing technology investment for the party employing an intranet. As discussed above, intranets and the Internet are closely related, with intranets being used for internal and secure communications within the business and the Internet being used for external transactions between the business and the outside world. For the purposes of this document, the term "networks" includes both the Internet and intranets. However, the distinction between the Internet and an intranet should be born in mind where applicable.

In 1990, programmers at Sun Microsystems wrote a universal programming language. This language was eventually named the JAVA programming language. JAVA and JAVA-based trademarks are trademarks or registered trademarks of Sun Microsystems, Inc. in the United States and other countries. The JAVA programming language resulted from programming efforts which initially were intended to be coded in the C++ programming language; therefore, the JAVA programming language has many commonalities with the C++ programming language. However, the JAVA programming language is a simple, object-oriented, distributed, interpreted yet high performance, robust yet safe, secure, dynamic, architecture neutral, portable, and multi-threaded language.

The JAVA programming language has emerged as the programming language of choice for the Internet as many large hardware and software companies have licensed it from Sun Microsystems. The JAVA programming language and environment is designed to solve a number of problems in modern programming practice. The JAVA programming language omits many rarely used, poorly understood, and confusing features of the C++ programming language. These omitted features primarily consist of operator overloading, multiple inheritance, and extensive automatic coercions. The JAVA programming language includes automatic garbage collection that simplifies the task of programming because it is no longer necessary to allocated and free memory as in the C programming language. The JAVA programming language restricts the use of pointers as defined in the C programming language, and instead has true arrays in which array bounds are explicitly checked, thereby eliminating vulnerability to many viruses and nasty bugs. The JAVA programming language includes objective-C interfaces and specific exception handlers.

The JAVA programming language has an extensive library of routines for coping easily with TCP/IP protocol (Transmission Control Protocol based on Internet protocol), HTTP (Hypertext Transfer Protocol) and FTP (File Transfer Protocol). The JAVA programming language is intended to be used in networked/distributed environments. The JAVA programming language enabled the construction of virus-free, tamper-free systems. The authentication techniques are based on public-key encryption.

Many computer systems, including those implementing the JAVA virtual machine specification, implement instructions which require that additional data be located and retrieved prior to executing the instruction. Within the JAVA virtual machine specification, the location and retrieval of such data is referred to as resolving a constant pool entry. Instructions which require that data be located and retrieved prior to execution are hereinafter generally referred to as non-quick instructions. Locating and retrieving the data required to execute a non-quick instruction can take hundreds of cycles. It would therefore be desirable to have a method and apparatus for accelerating the execution of non-quick instructions.

A conventional method for accelerating the execution of a non-quick instruction involves the steps of (1) retrieving the original instruction code from a discrete location in program memory, (2) locating and retrieving the data required to execute the non-quick instruction, (3) modifying the original instruction code to include the retrieved data and then (4) overwriting the original instruction code at the discrete location in the program memory with the modified instruction code. The modified instruction code is subsequently executed in place of the original instruction code. This is commonly referred to as self-modifying code. One disadvantage with self-modifying code is that once the original instruction code has been modified, the original instruction code is no longer available. The unavailability of the original instruction code can hamper subsequent program debugging. Another disadvantage is that the discrete location in the memory may not have sufficient capacity to store the modified instruction code (which includes the retrieved data). In certain prior art applications, the original instruction code is stored in a read only memory (ROM). In such applications, it is not possible to overwrite the original instruction code with a modified instruction code.

It would therefore be desirable to have an instruction accelerator which accelerates the execution of non-quick instructions in a manner which overcomes the above-described shortcomings of the prior art.

SUMMARY OF THE INVENTION

Accordingly, the present invention provides an instruction accelerator which includes a processor and an associative memory. The processor is coupled to receive a stream of instructions and a corresponding stream of instruction identifier values. The instructions include at least one non-quick instruction which has a first associated data set which must be accessed prior to executing the non-quick instruction. The associative memory, which is coupled to the processor, stores one or more instruction identifier values and one or more associated data sets. The associative memory also receives the stream of instruction identifier values. When a current instruction identifier value in the stream of instruction identifier values matches an instruction identifier value stored in the memory, an associated data set is accessed from the memory. More specifically, if the first instruction identifier value and the first data set are stored in the memory, and the current instruction identifier value is equal to the first instruction identifier value, then the first data set is read out of the memory. Execution of the non-quick instruction is accelerated because the first data set is readily accessible within the memory. In one embodiment, the associative memory is a content addressable memory.

If the first data set and the first instruction identifier value are not initially stored in the associative memory, then the associative memory will not detect a match between the current instruction identifier value and any of the instruction identifier values stored in the memory when the current instruction is the non-quick instruction. In the absence of such a match, the associative memory asserts a control signal which is provided to the processor. Upon detecting the asserted control signal and the presence of the non-quick instruction, the processor causes a portion of software code to be accessed. This software code locates and retrieves the first data set. The first data set is then loaded into the associative memory, along with the first instruction identifier value.

After initially loading the first data set and the first instruction identifier value into the associative memory, the first data set is readily accessible to accelerate the execution of the non-quick instruction during subsequent execution of the same instruction.

Because the non-quick instruction is not overwritten, the non-quick instruction remains available in its original form. Moreover, because the non-quick instruction is not overwritten, the non-quick instruction can be stored in read only memory.

The present invention further includes a method of accelerating the execution of a non-quick instruction having an associated first instruction identifier value and an associated first data set. This method includes the steps of (1) storing the first instruction identifier value and the first data set in an associative memory, (2) comparing a current instruction identifier value associated with a current instruction with the first instruction identifier value stored in the memory, (3) accessing the first data set stored in the memory when the current instruction identifier value matches the first instruction identifier value, and (4) providing the non-quick instruction, the first instruction identifier value and the first data set to an execution unit for execution when the current instruction identifier value matches the first instruction identifier value.

The present invention further includes another method of accelerating the execution of a non-quick instruction having an associated first instruction identifier value and an associated first data set. This method includes the steps of (1) storing one or more instruction identifier values in a memory, (2) comparing a current instruction identifier value associated with a current instruction with the instruction identifier values stored in the memory, (3) retrieving the first data set from a program memory when the current instruction is the non-quick instruction and the current instruction identifier value is the first instruction identifier value, and the current instruction identifier value does not match any of the instruction identifier values stored in the memory, and (4) loading the retrieved first data set and the first instruction identifier value into the memory.

The present invention will be more fully understood in light of the following detailed description taken together with the drawings.

Figure 1:
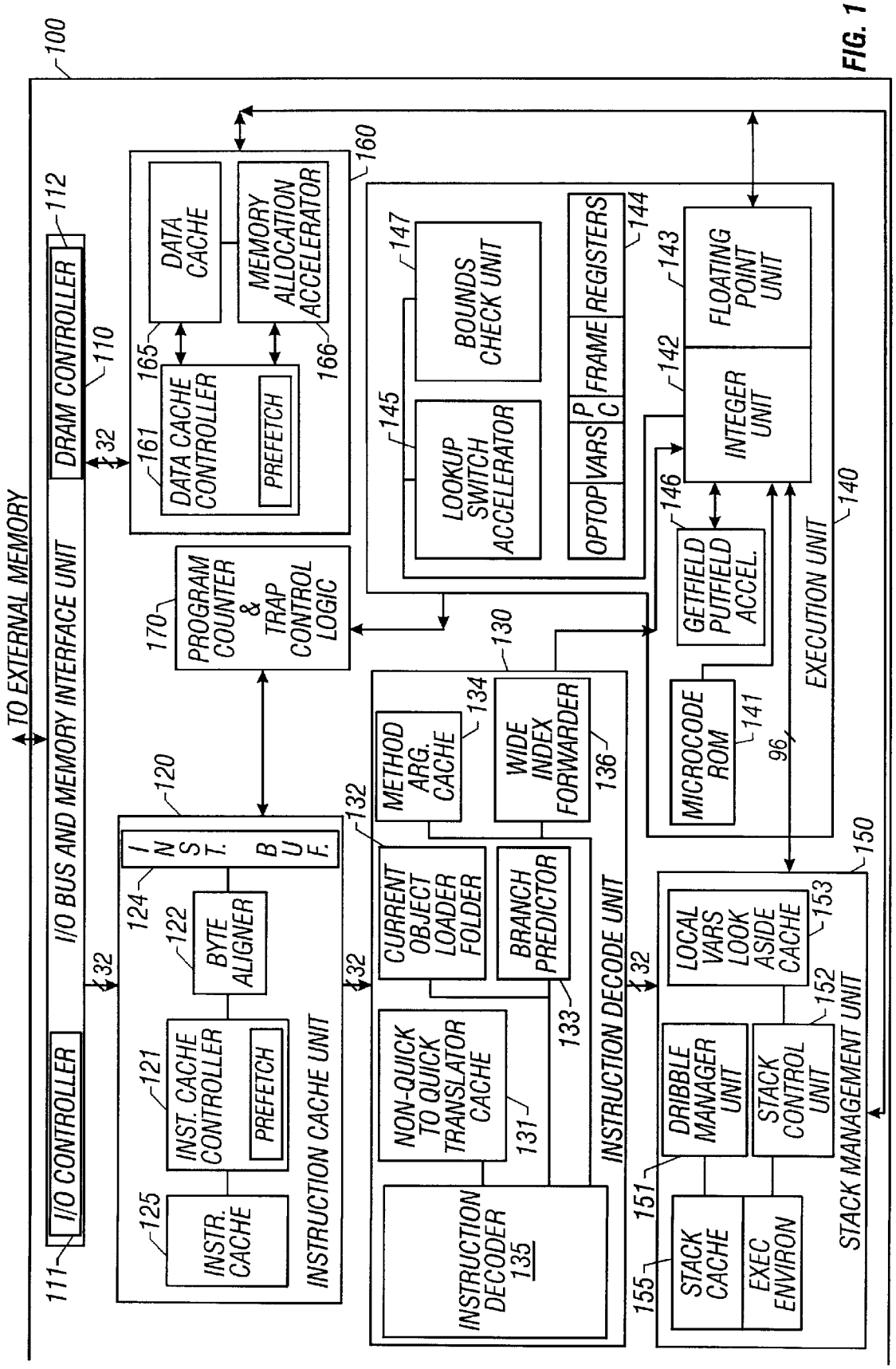
FIG. 1 is a block diagram of one embodiment of virtual machine hardware processor that utilizes the non-quick to quick translator cache of this invention.

These and other features and advantages of the present invention will be apparent from the Figures as explained in the Detailed Description of the Invention. Like or similar features are designated by the same reference numeral(s) throughout the drawings and the Detailed Description of the Invention.

DETAILED DESCRIPTION OF THE INVENTION

In accordance with one embodiment of the present invention, a non-quick to quick instruction accelerator is implemented within a hardware processor which is configured to execute virtual computing machine instructions (e.g., JAVA Virtual Machine computing instructions). Such a hardware processor is described below. The description of this hardware processor is followed by a description of a non-quick to quick instruction accelerator which is implemented within the hardware processor. Although the non-quick to quick instruction accelerator is described as being implemented within a particular processor, it is understood that in other embodiments of the invention, the non-quick to quick instruction accelerator can be implemented within any processor which executes non-quick instructions.

FIG. 1 illustrates one embodiment of a virtual machine instruction hardware processor 100, hereinafter hardware processor 100, that includes non-quick to quick translator cache 131 in accordance with the present invention, and that directly executes virtual machine instructions that are processor architecture independent. The performance of hardware processor 100 in executing JAVA virtual machine instructions is much better than high-end CPUs, such as the Intel PENTIUM microprocessor or the Sun Microsystems ULTRASPARC processor, All SPARC trademarks are used under license and are trademarks or registered trademarks of SPARC International, Inc., in the United States and other countries. Products bearing SPARC trademarks are based upon an architecture developed by Sun Microsystems, Inc. PENTIUM is a trademark of Intel Corp. of Sunnyvale, Calif.) interpreting the same virtual machine instructions with a software JAVA interpreter. or with a JAVA just-in-time compiler; is low cost; and exhibits low power consumption. As a result, hardware processor 100 is well suited for portable applications. Hardware processor 100 provides similar advantages for other virtual machine stack-based architectures as well as for virtual machines utilizing features such as garbage collection, thread synchronization, etc.

In view of these characteristics, a system based on hardware processor 100 presents attractive price for performance characteristics, if not the best overall performance, as compared with alternative virtual machine execution environments including software interpreters and just-in-time compilers. Nonetheless, the present invention is not limited to virtual machine hardware processor embodiments, and encompasses any suitable stack-based, or non-stack-based machine implementations, including implementations emulating the JAVA virtual machine as a software interpreter, compiling JAVA virtual machine instructions (either in batch or just-in-time) to machine instruction native to a particular hardware processor, or providing hardware implementing the JAVA virtual machine in microcode, directly in silicon, or in some combination thereof.

Regarding price for performance characteristics, hardware processor 100 has the advantage that the 250 Kilobytes to 500 Kilobytes (Kbytes) of memory storage, e.g., read-only memory or random access memory, typically required by a software interpreter, is eliminated.

A simulation of hardware processor 100 showed that hardware processor 100 executes virtual machine instructions twenty times faster than a software interpreter running a variety of applications on a PENTIUM processor clocked at the same clock rate as hardware processor 100, and executing the same virtual machine instructions. Another simulation of hardware processor 100 showed that hardware processor 100 executes virtual machine instructions five times faster than a just-in-time compiler running on a PENTIUM processor running at the same clock rate as hardware processor 100, and executing the same virtual machine instructions.

In environments in which the expense of the memory required for a software virtual machine instruction interpreter is prohibitive, hardware processor 100 is advantageous. These applications include, for example, an Internet chip for network appliances, a cellular telephone processor, other telecommunications integrated circuits, or other low-power, low-cost applications such as embedded processors, and portable devices.

As used herein, a virtual machine is an abstract computing machine that, like a real computing machine, has an instruction set and uses various memory areas. A virtual machine specification defines a set of processor architecture independent virtual machine instructions that are executed by a virtual machine implementation, e.g., hardware processor 100. Each virtual machine instruction defines a specific operation that is to be performed. The virtual computing machine need not understand the computer language that is used to generate virtual machine instructions or the underlying implementation of the virtual machine. Only a particular file format for virtual machine instructions needs to be understood.

In an exemplary embodiment, the virtual machine instructions are JAVA virtual machine instructions. Each JAVA virtual machine instruction includes one or more bytes that encode instruction identifying information, operands, and any other required information. Section I, which is incorporated herein by reference in its entirety, includes an illustrative set of the JAVA virtual machine instructions. The particular set of virtual machine instructions utilized is not an essential aspect of this invention. In view of the virtual machine instructions in Section I and this disclosure, those of skill in the art can modify the invention for a particular set of virtual machine instructions, or for changes to the JAVA virtual machine specification.

Figure 2:
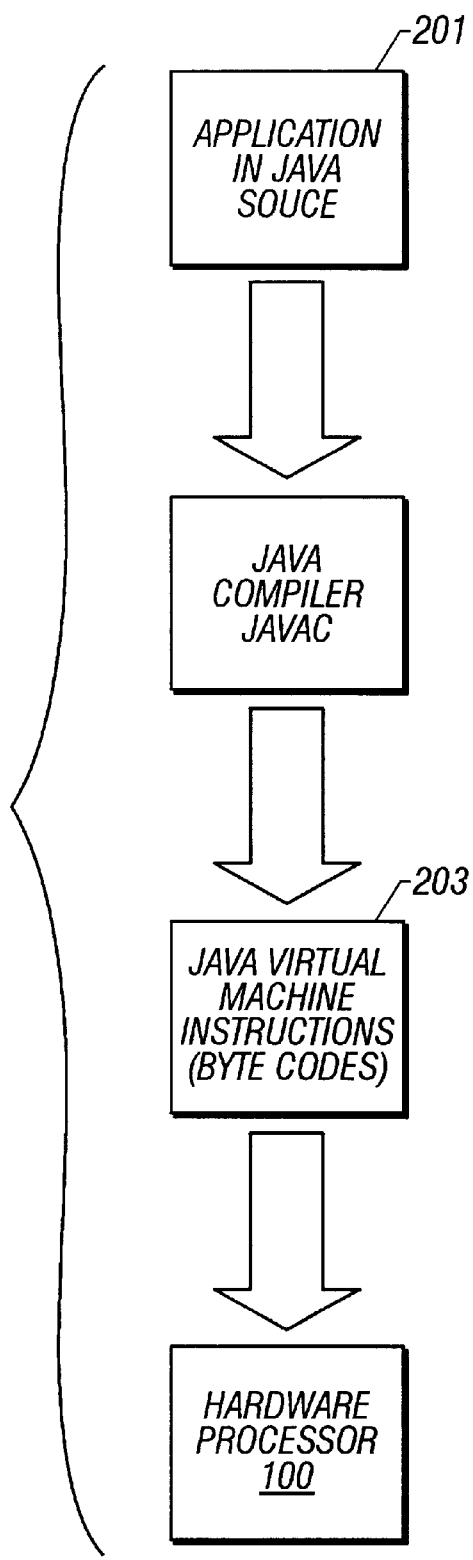
FIG. 2 is a process flow diagram for generation of virtual machine instructions that are used in one embodiment of this invention.

A JAVA compiler JAVAC, (FIG. 2) that is executing on a computer platform, converts an application 201 written in the JAVA computer language to an architecture neutral object file format encoding a compiled instruction sequence 203, according to the JAVA Virtual Machine Specification, that includes a compiled instruction set. However, for this invention, only a source of virtual machine instructions and related information is needed. The method or technique used to generate the source of virtual machine instructions and related information is not essential to this invention.

Compiled instruction sequence 203 is executable on hardware processor 100 as well as on any computer platform that implements the JAVA virtual machine using, for example, a software interpreter or just-in-time compiler. However, as described above, hardware processor 100 provides significant performance advantages over the software implementations.

In this embodiment, hardware processor 100 (FIG. 1) processes the JAVA virtual machine instructions, which include bytecodes. Hardware processor 100, as explained more completely below, executes directly most of the bytecodes. However, execution of some of the bytecodes is implemented via microcode.

One strategy for selecting virtual machine instructions that are executed directly by hardware processor 100 is described herein by way of an example. Thirty percent of the JAVA virtual machine instructions are pure hardware translations; instructions implemented in this manner include constant loading and simple stack operations. The next 50% of the virtual machine instructions are implemented mostly, but not entirely, in hardware and require some firmware assistance; these include stack based operations and array instructions. The next 10% of the JAVA virtual machine instructions are implemented in hardware, but require significant firmware support as well; these include function invocation and function return. The remaining 10% of the JAVA virtual machine instructions are not supported in hardware, but rather are supported by a firmware trap and/or microcode; these include functions such as exception handlers. Herein, firmware means microcode stored in ROM that when executed controls the operations of hardware processor 100.

In one embodiment, hardware processor 100 includes an I/O bus and memory interface unit 110, an instruction cache unit 120 including instruction cache 125, an instruction decode unit 130, a unified execution unit 140, a stack management unit 150 including stack cache 155, a data cache unit 160 including a data cache 165, and program counter and trap control logic 170. Each of these units is described more completely below.

Also, as illustrated in FIG. 1, each unit includes several elements. For clarity and to avoid distracting from the invention, the interconnections between elements within a unit are not shown in FIG. 1. However, in view of the following description, those of skill in the art will understand the interconnections and cooperation between the elements in a unit and between the various units.

The pipeline stages implemented using the units illustrated in FIG. 1 include fetch, decode, execute, and write-back stages. If desired, extra stages for memory access or exception resolution are provided in hardware processor 100.

Figure 3:
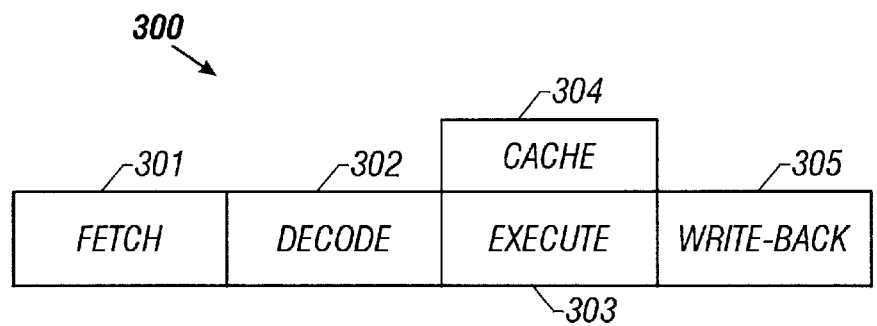
FIG. 3 illustrates an instruction pipeline implemented in the hardware processor of FIG. 1.

FIG. 3 is an illustration of a four stage pipeline for execution of instructions in the exemplary embodiment of processor 100. In fetch stage 301, a virtual machine instruction is fetched and placed in instruction buffer 124 (FIG. 1). The virtual machine instruction is fetched from one of (i) a fixed size cache line from instruction cache 125 or (ii) external memory.

With regard to fetching, aside from instructions tableswitch and lookupswitch, (See Section I.) each virtual machine instruction is between one and five bytes long. Thus, to keep things simple, at least forty bits are required to guarantee that all of a given instruction is contained in the fetch.

Another alternative is to always fetch a predetermined number of bytes, for example, four bytes, starting with the opcode. This is sufficient for 95% of JAVA virtual machine instructions (See Section I). For an instruction requiring more than three bytes of operands, another cycle in the front end must be tolerated if four bytes are fetched. In this case, the instruction execution can be started with the first operands fetched even if the full set of operands is not yet available.

In decode stage 302 (FIG. 3), the virtual machine instruction at the front of instruction buffer 124 (FIG. 1) is decoded and instruction folding is performed if possible. Stack cache 155 is accessed only if needed by the virtual machine instruction. Register OPTOP, that contains a pointer OPTOP to a top of a stack 400 (FIG. 4), is also updated in decode stage 302 (FIG. 3).

Herein, for convenience, the value in a register and the register are assigned the same reference numeral. Further, in the following discussion, use of a register to store a pointer is illustrative only of one embodiment. Depending on the specific implementation of the invention, the pointer may be implemented using a hardware register, a hardware counter, a software counter, a software pointer, or other equivalent embodiments known to those of skill in the art. The particular implementation selected is not essential to the invention, and typically is made based on a price to performance trade-off.

In execute stage 303, the virtual machine instruction is executed for one or more cycles.

Typically, in execute stage 303, an ALU in integer unit 142 (FIG. 1) is used either to do an arithmetic computation or to calculate the address of a load or store from data cache unit (DCU) 160. If necessary, traps are prioritized and taken at the end of execute stage 303 (FIG. 3). For control flow instructions, the branch address is calculated in execute stage 303, as well as the condition upon which the branch is dependent.

Cache stage 304 is a non-pipelined stage. Data cache 165 (FIG. 1) is accessed if needed during execution stage 303 (FIG. 3). The reason that stage 304 is non-pipelined is because hardware processor 100 is a stack-based machine. Thus, the instruction following a load is almost always dependent on the value returned by the load. Consequently, in this embodiment, the pipeline is held for one cycle for a data cache access. This reduces the pipeline stages, and the die area taken by the pipeline for the extra registers and bypasses.

Write-back stage 305 is the last stage in the pipeline. In stage 305, the calculated data is written back to stack cache 155.

Hardware processor 100, in this embodiment, directly implements a stack 400 (FIG. 4A) that supports the JAVA virtual machine stack-based architecture (See Section I). Sixty-four entries on stack 400 are contained on stack cache 155 in stack management unit 150. Some entries in stack 400 may be duplicated on stack cache 150. Operations on data are performed through stack cache 155.

Stack 400 of hardware processor 100 is primarily used as a repository of information for methods. At any point in time, hardware processor 100 is executing a single method.

Each method has memory space, i.e., a method frame on stack 400, allocated for a set of local variables, an operand stack, and an execution environment structure.

A new method frame, e.g., method frame two 410, is allocated by hardware processor 100 upon a method invocation in execution stage 303 (FIG. 3) and becomes the current frame, i.e., the frame of the current method. Current frame 410 (FIG. 4A), as well as the other method frames, may contain a part of or all of the following six entities, depending on various method invoking situations:

Object reference;
Incoming arguments;
Local variables;
Invoker's method context;
Operand stack; and
Return value from method.

Figure 4A:
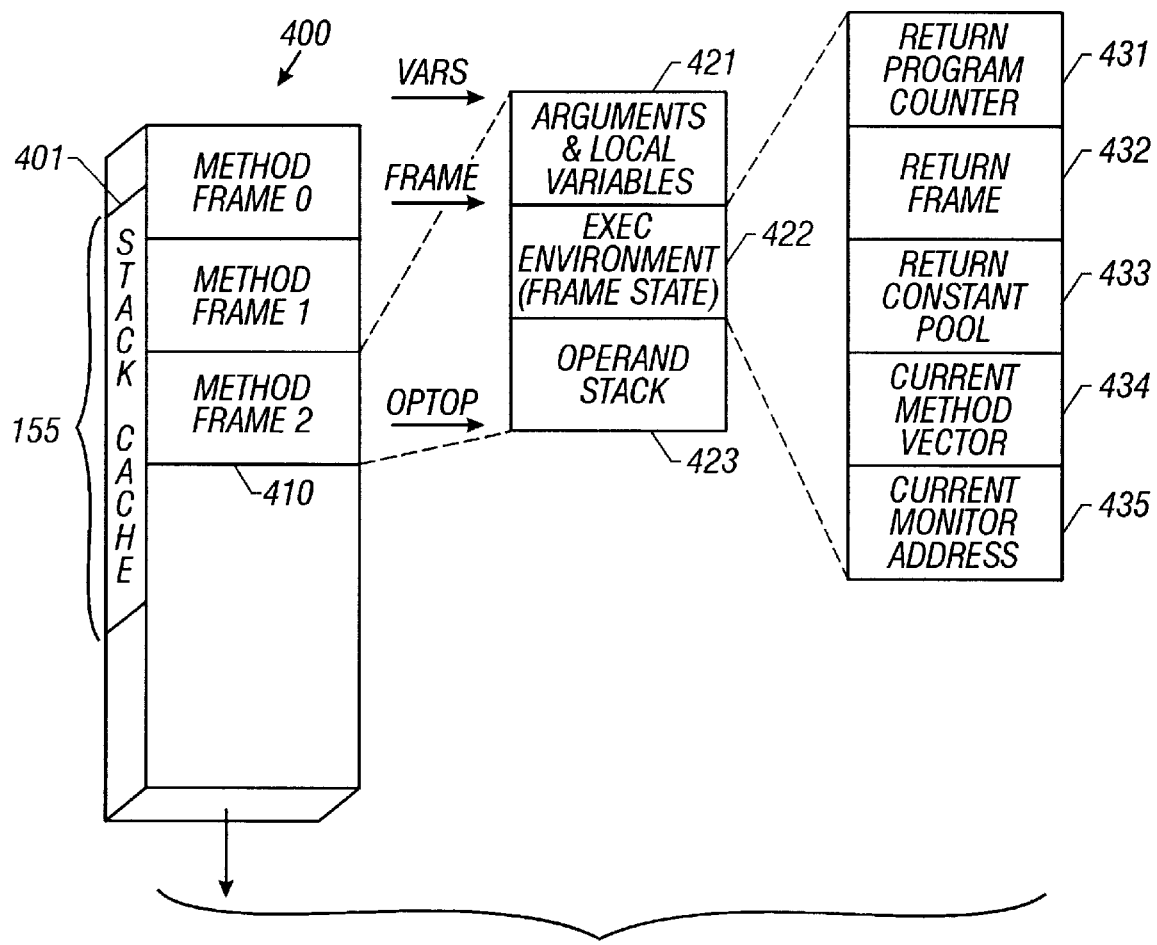
FIG. 4A is an illustration of the one embodiment of the logical organization of a stack structure where each method frame includes a local variable storage area, an environment storage area, and an operand stack utilized by the hardware processor of FIG. 1.

In FIG. 4A, object reference, incoming arguments, and local variables are included in arguments and local variables area 421. The invoker's method context is included in execution environment 422, sometimes called frame state, that in turn includes: a return program counter value 431 that is the address of the virtual machine instruction, e.g., JAVA opcode, next to the method invoke instruction; a return frame 432 that is the location of the calling method's frame; a return constant pool pointer 433 that is a pointer to the calling method's constant pool table; a current method vector 434 that is the base address of the current method's vector table; and a current monitor address 435 that is the address of the current method's monitor.

The object reference is an indirect pointer to an object-storage representing the object being targeted for the method invocation. JAVA compiler JAVAC (See FIG. 2.) generates an instruction to push this pointer onto operand stack 423 prior to generating an invoke instruction. This object reference is accessible as local variable zero during the execution of the method. This indirect pointer is not available for a static method invocation as there is no target-object defined for a static method invocation.

The list of incoming arguments transfers information from the calling method to the invoked method. Like the object reference, the incoming arguments are pushed onto stack 400 by JAVA compiler generated instructions and may be accessed as local variables. JAVA compiler JAVAC (See FIG. 2.) statically generates a list of arguments for current method 410 (FIG. 4A), and hardware processor 100 determines the number of arguments from the list. When the object reference is present in the frame for a non-static method invocation, the first argument is accessible as local variable one. For a static method invocation, the first argument becomes local variable zero.

For 64-bit arguments, as well as 64-bit entities in general, the upper 32-bits, i.e., the 32 most significant bits, of a 64-bit entity are placed on the upper location of stack 400, i.e., pushed on the stack last. For example, when a 64-bit entity is on the top of stack 400, the upper 32-bit portion of the 64-bit entity is on the top of the stack, and the lower 32-bit portion of the 64-bit entity is in the storage location immediately adjacent to the top of stack 400.

The local variable area on stack 400 (FIG. 4A) for current method 410 represents temporary variable storage space which is allocated and remains effective during invocation of method 410. JAVA compiler JAVAC (FIG. 2) statically determines the required number of local variables and hardware processor 100 allocates temporary variable storage space accordingly.

When a method is executing on hardware processor 100, the local variables typically reside in stack cache 155 and are addressed as offsets from pointer VARS (FIGS. 1 and 4A), which points to the position of the local variable zero. Instructions are provided to load the values of local variables onto operand stack 423 and store values from operand stack into local variables area 421.

The information in execution environment 422 includes the invoker's method context. When a new frame is built for the current method, hardware processor 100 pushes the invoker's method context onto newly allocated frame 410, and later utilizes the information to restore the invoker's method context before returning. Pointer FRAME (FIGS. 1 and 4A) is a pointer to the execution environment of the current method. In the exemplary embodiment, each register in register set 144 (FIG. 1) is 32-bits wide.

Operand stack 423 is allocated to support the execution of the virtual machine instructions within the current method. Program counter register PC (FIG. 1) contains the address of the next instruction, e.g., opcode, to be executed. Locations on operand stack 423 (FIG. 4A) are used to store the operands of virtual machine instructions, providing both source and target storage locations for instruction execution. The size of operand stack 423 is statically determined by JAVA compiler JAVAC (FIG. 2) and hardware processor 100 allocates space for operand stack 423 accordingly. Register OPTOP (FIGS. 1 and 4A) holds a pointer to a top of operand stack 423.

The invoked method may return its execution result onto the invoker's top of stack, so that the invoker can access the return value with operand stack references. The return value is placed on the area where an object reference or an argument is pushed before a method invocation.

Simulation results on the JAVA virtual machine indicate that method invocation consumes a significant portion of the execution time (20–40%). Given this attractive target for accelerating execution of virtual machine instructions, hardware support for method invocation is included in hardware processor 100, as described more completely below.

The beginning of the stack frame of a newly invoked method, i.e., the object reference and the arguments passed by the caller, are already stored on stack 400 since the object reference and the incoming arguments come from the top of the stack of the caller. As explained above, following these items on stack 400, the local variables are loaded and then the execution environment is loaded.

One way to speed up this process is for hardware processor 100 to load the execution environment in the background and indicate what has been loaded so far, e.g., simple one bit scoreboarding. Hardware processor 100 tries to execute the bytecodes of the called method as soon as possible, even though stack 400 is not completely loaded. If accesses are made to variables already loaded, overlapping of execution with loading of stack 400 is achieved, otherwise a hardware interlock occurs and hardware processor 100 just waits for the variable or variables in the execution environment to be loaded.

Figure 4B:
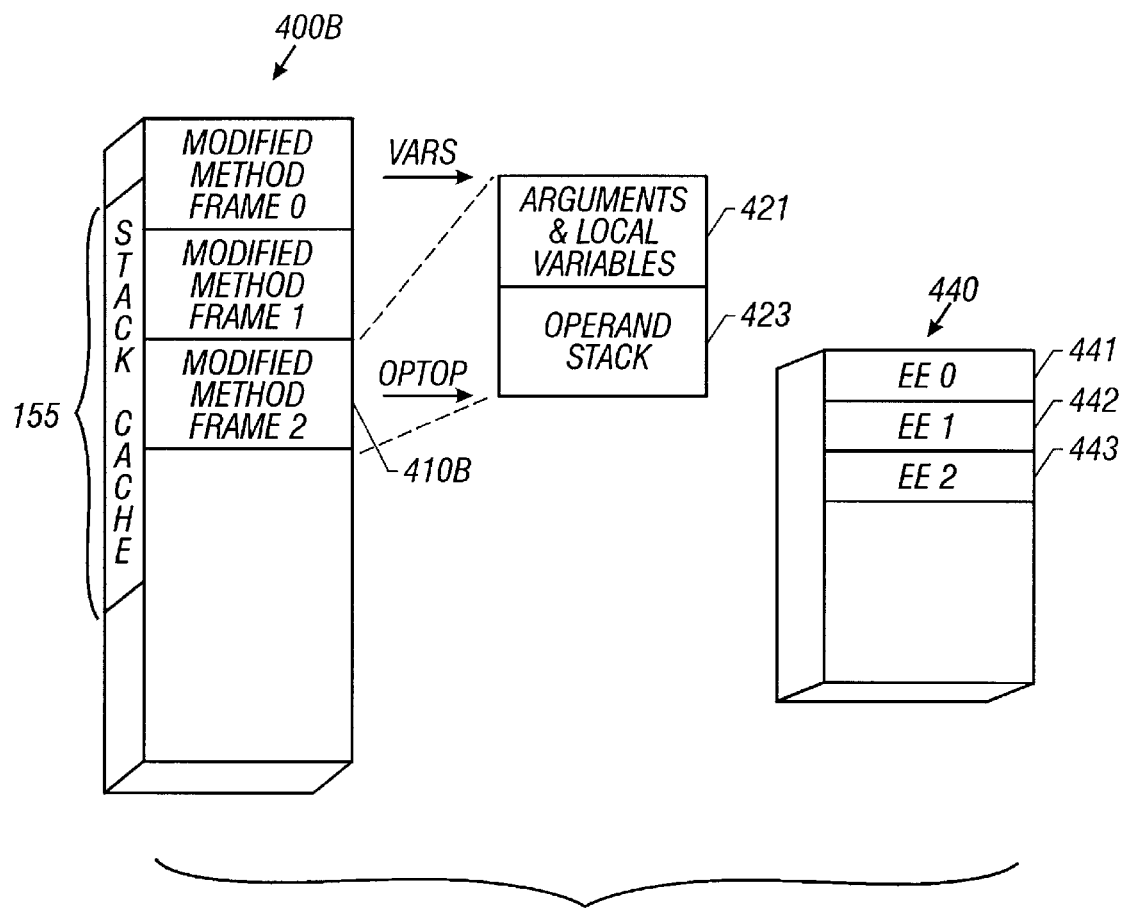
FIG. 4B is an illustration of an alternative embodiment of the logical organization of a stack structure where each method frame includes a local variable storage area and an operand stack on the stack, and an environment storage area for the method frame is included on a separate execution environment stack.

FIG. 4B illustrates another way to accelerate method invocation. Instead of storing the entire method frame in stack 400, the execution environment of each method frame is stored separately from the local variable area and the operand stack of the method frame. Thus, in this embodiment, stack 400B contains modified method frames, e.g. modified method frame 410B having only local variable area 421 and operand stack 423. Execution environment 422 of the method frame is stored in an execution environment memory 440. Storing the execution environment in execution environment memory 440 reduces the amount of data in stack cache 155. Therefore, the size of stack cache 155 can be reduced. Furthermore, execution environment memory 440 and stack cache 155 can be accessed simultaneously. Thus, method invocation can be accelerated by loading or storing the execution environment in parallel with loading or storing data onto stack 400B.

In one embodiment of stack management unit 150, the memory architecture of execution environment memory 440 is also a stack. As modified method frames are pushed onto stack 400B through stack cache 155, corresponding execution environments are pushed onto execution environment memory 440. For example, since modified method frames 0 to 2, as shown in FIG. 4B, are in stack 400B, execution environments (EE) 0 to 2, respectively, are stored in execution environment memory circuit 440.

To further enhance method invocation, an execution environment cache can be added to improve the speed of saving and retrieving the execution environment during method invocation. The architecture described more completely below for stack cache 155, dribbler manager unit 151, and stack control unit 152 for caching stack 400, can also be applied to caching execution environment memory 440.

Figure 4C:
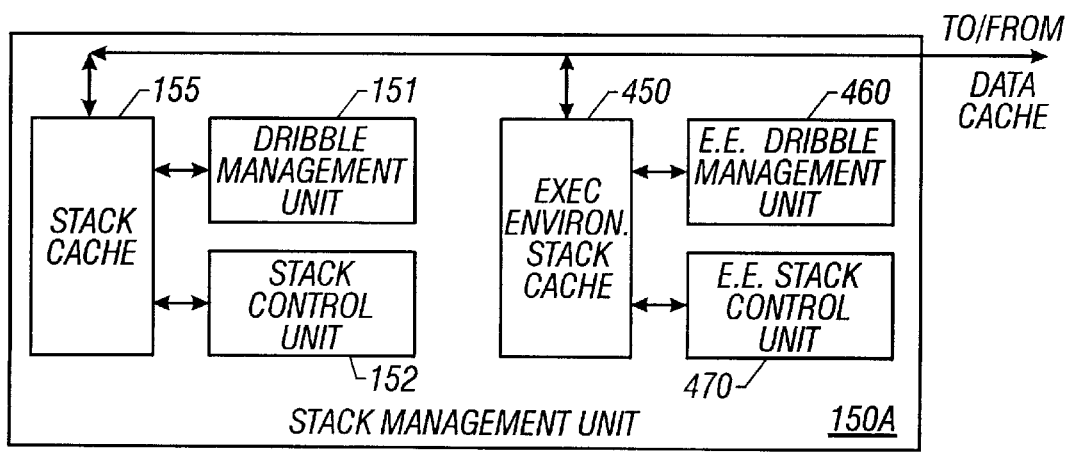
FIG. 4C is an illustration of an alternative embodiment of the stack management unit for the stack and execution environment stack of FIG. 4B.

FIG. 4C illustrates an embodiment of stack management unit 150 modified to support both stack 400B and execution environment memory 440. Specifically, the embodiment of stack management unit 150 in FIG. 4C adds an execution environment stack cache 450, an execution environment dribble manager unit 460, and an execution environment stack control unit 470. Typically, execution dribble manager unit 460 transfers an entire execution environment between execution environment cache 450 and execution environment memory 440 during a spill operation or a fill operation.

I/O Bus and Memory Interface Unit

I/O bus and memory interface unit 110 (FIG. 1), sometimes called interface unit 110, implements an interface between hardware processor 100 and a memory hierarchy which in an exemplary embodiment includes external memory and may optionally include memory storage and/or interfaces on the same die as hardware processor 100. In this embodiment, I/O controller 111 interfaces with external I/O devices and memory controller 112 interfaces with external memory. Herein, external memory means memory external to hardware processor 100. However, external memory either may be included on the same die as hardware processor 100, may be external to the die containing hardware processor 100, or may include both on- and off-die portions.

In another embodiment, requests to I/O devices go through memory controller 112 which maintains an address map of the entire system including hardware processor 100. On the memory bus of this embodiment, hardware processor 100 is the only master and does not have to arbitrate to use the memory bus.

Hence, alternatives for the input/output bus that interfaces with I/O bus and memory interface unit 110 include supporting memory-mapped schemes, providing direct support for PCI, PCMCIA, or other standard busses. Fast graphics (w/VIS or other technology) may optionally be included on the die with hardware processor 100.

I/O bus and memory interface unit 110 generates read and write requests to external memory. Specifically, interface unit 110 provides an interface for instruction cache and data cache controllers 121 and 161 to the external memory. Interface unit 110 includes arbitration logic for internal requests from instruction cache controller 121 and data cache controller 161 to access external memory and in response to a request initiates either a read or a write request on the memory bus to the external memory. A request from data cache controller 121 is always treated as higher priority relative to a request from instruction cache controller 161.

Interface unit 110 provides an acknowledgment signal to the requesting instruction cache controller 121, or data cache controller 161 on read cycles so that the requesting controller can latch the data. On write cycles, the acknowledgment signal from interface unit 110 is used for flow control so that the requesting instruction cache controller 121 or data cache controller 161 does not generate a new request when there is one pending. Interface unit 110 also handles errors generated on the memory bus to the external memory.

Instruction Cache Unit

Instruction cache unit (ICU) 120 (FIG. 1) fetches virtual machine instructions from instruction cache 125 and provides the instructions to instruction decode unit 130. In this embodiment, upon a instruction cache hit, instruction cache controller 121, in one cycle, transfers an instruction from instruction cache 125 to instruction buffer 124 where the instruction is held until integer execution unit IEU, that is described more completely below, is ready to process the instruction. This separates the rest of pipeline 300 (FIG. 3) in hardware processor 100 from fetch stage 301. If it is undesirable to incur the complexity of supporting an instruction-buffer type of arrangement, a temporary one instruction register is sufficient for most purposes. However, instruction fetching, caching, and buffering should provide sufficient instruction bandwidth to support instruction folding as described below.

The front end of hardware processor 100 is largely separate from the rest of hardware processor 100. Ideally, one instruction per cycle is delivered to the execution pipeline.

The instructions are aligned on an arbitrary eight-bit boundary by byte aligner circuit 122 in response to a signal from instruction decode unit 130. Thus, the front end of hardware processor 100 efficiently deals with fetching from any byte position. Also, hardware processor 100 deals with the problems of instructions that span multiple cache lines of cache 125. In this case, since the opcode is the first byte, the design is able to tolerate an extra cycle of fetch latency for the operands. Thus, a very simple de-coupling between the fetching and execution of the bytecodes is possible.

In case of an instruction cache miss, instruction cache controller 121 generates an external memory request for the missed instruction to I/O bus and memory interface unit 110. If instruction buffer 124 is empty, or nearly empty, when there is an instruction cache miss, instruction decode unit 130 is stalled, i.e., pipeline 300 is stalled. Specifically, instruction cache controller 121 generates a stall signal upon a cache miss which is used along with an instruction buffer empty signal to determine whether to stall pipeline 300. Instruction cache 125 can be invalidated to accommodate self-modifying code, e.g., instruction cache controller 121 can invalidate a particular line in instruction cache 125.

Thus, instruction cache controller 121 determines the next instruction to be fetched, i.e., which instruction in instruction cache 125 needs to accessed, and generates address, data and control signals for data and tag RAMs in instruction cache 125. On a cache hit, four bytes of data are fetched from instruction cache 125 in a single cycle, and a maximum of four bytes can be written into instruction buffer 124.

Byte aligner circuit 122 aligns the data out of the instruction cache RAM and feeds the aligned data to instruction buffer 124. As explained more completely below, the first two bytes in instruction buffer 124 are decoded to determine the length of the virtual machine instruction. Instruction buffer 124 tracks the valid instructions in the queue and updates the entries, as explained more completely below.

Instruction cache controller 121 also provides the data path and control for handling instruction cache misses. On an instruction cache miss, instruction cache controller 121 generates a cache fill request to I/O bus and memory interface unit 110.

On receiving data from external memory, instruction cache controller 121 writes the data into instruction cache 125 and the data are also bypassed into instruction buffer 124. Data are bypassed to instruction buffer 124 as soon as the data are available from external memory, and before the completion of the cache fill.

Instruction cache controller 121 continues fetching sequential data until instruction buffer 124 is full or a branch or trap has taken place. In one embodiment, instruction buffer 124 is considered full if there are more than eight bytes of valid entries in buffer 124. Thus, typically, eight bytes of data are written into instruction cache 125 from external memory in response to the cache fill request sent to interface unit 110 by instruction cache unit 120. If there is a branch or trap taken while processing an instruction cache miss, only after the completion of the miss processing is the trap or branch executed.

When an error is generated during an instruction cache fill transaction, a fault indication is generated and stored into instruction buffer 124 along with the virtual machine instruction, i.e., a fault bit is set. The line is not written into instruction cache 125. Thus, the erroneous cache fill transaction acts like a non-cacheable transaction except that a fault bit is set. When the instruction is decoded, a trap is taken.

Instruction cache controller 121 also services non-cacheable instruction reads. An instruction cache enable (ICE) bit, in a processor status register in register set 144, is used to define whether a load can be cached. If the instruction cache enable bit is cleared, instruction cache unit 120 treats all loads as non-cacheable loads. Instruction cache controller 121 issues a non-cacheable request to interface unit 110 for non-cacheable instructions. When the data are available on a cache fill bus for the non-cacheable instruction, the data are bypassed into instruction buffer 124 and are not written into instruction cache 125.

In this embodiment, instruction cache 125 is a direct-mapped, eight-byte line size cache. Instruction cache 125 has a single cycle latency. The cache size is configurable to 0K, 1K, 2K, 4K, 8K and 16K byte sizes where K means kilo. The default size is 4K bytes. Each line has a cache tag entry associated with the line. Each cache tag contains a twenty bit address tag field and one valid bit for the default 4K byte size.

Instruction buffer 124, which, in an exemplary embodiment, is a twelve-byte deep first-in, first-out (FIFO) buffer, de-links fetch stage 301 (FIG. 3) from the rest of pipeline 300 for performance reasons. Each instruction in buffer 124 (FIG. 1) has an associated valid bit and an error bit. When the valid bit is set, the instruction associated with that valid bit is a valid instruction. When the error bit is set, the fetch of the instruction associated with that error bit was an erroneous transaction. Instruction buffer 124 includes an instruction buffer control circuit (not shown) that generates signals to pass data to and from instruction buffer 124 and that keeps track of the valid entries in instruction buffer 124, i.e., those with valid bits set.

In an exemplary embodiment, four bytes can be received into instruction buffer 124 in a given cycle. Up to five bytes, representing up to two virtual machine instructions, can be read out of instruction buffer 124 in a given cycle. Alternative embodiments, particularly those providing folding of multi-byte virtual machine instructions and/or those providing folding of more than two virtual machine instructions, provide higher input and output bandwidth. Persons of ordinary skill in the art will recognize a variety of suitable instruction buffer designs including, for example, alignment logic, circular buffer design, etc. When a branch or trap is taken, all the entries in instruction buffer 124 are nullified and the branch/trap data moves to the top of instruction buffer 124.

In the embodiment of FIG. 1, a unified execution unit 140 is shown. However, in another embodiment, instruction decode unit 120, integer unit 142, and stack management unit 150 are considered a single integer execution unit, and floating point execution unit 143 is a separate optional unit. In still other embodiments, the various elements in the execution unit may be implemented using the execution unit of another processor. In general the various elements included in the various units of FIG. 1 are exemplary only of one embodiment. Each unit could be implemented with all or some of the elements shown. Again, the decision is largely dependent upon a price vs. performance trade-off.

Instruction Decode Unit

As explained above, virtual machine instructions are decoded in decode stage 302 (FIG. 3) of pipeline 300. In an exemplary embodiment, two bytes, that can correspond to two virtual machine instructions, are fetched from instruction buffer 124 (FIG. 1). The two bytes are decoded in parallel to determine if the two bytes correspond to two virtual machine instructions, e.g., a first load top of stack instruction and a second add top two stack entries instruction, that can be folded into a single equivalent operation. Folding refers to supplying a single equivalent operation corresponding to two or more virtual machine instructions.

In an exemplary hardware processor 100 embodiment, a single-byte first instruction can be folded with a second instruction. However, alternative embodiments provide folding of more than two virtual machine instructions, e.g., two to four virtual machine instructions, and of multi-byte virtual machine instructions, though at the cost of instruction decoder complexity and increased instruction bandwidth. See U.S. patent application Ser. No. 08/786,351, entitled "INSTRUCTION FOLDING FOR A STACK-BASED MACHINE" naming Marc Tremblay and James Michael O'Connor as inventors, assigned to the assignee of this application, and filed on even date herewith which is incorporated herein by reference in its entirety. In the exemplary processor 100 embodiment, if the first byte, which corresponds to the first virtual machine instruction, is a multi-byte instruction, the first and second instructions are not folded.

An optional current object loader folder 132 exploits instruction folding, such as that described above, and in greater detail in U.S. patent application Ser. No. 08/786,351, entitled "INSTRUCTION FOLDING FOR A STACK-BASED MACHINE" naming Marc Tremblay and James Michael O'Connor as inventors, assigned to the assignee of this application, and filed on even date herewith, which is incorporated herein by reference in its entirety, in virtual machine instruction sequences which simulation results have shown to be particularly frequent and therefore a desirable target for optimization. In particular, method invocations typically load an object reference for the corresponding object onto the operand stack and fetch a field from the object. Instruction folding allow this extremely common virtual machine instruction sequence to be executed using an equivalent folded operation.

Quick variants are not part of the virtual machine instruction set (See Chapter 3 of Section I), and are invisible outside of a JAVA virtual machine implementation.

However, inside a virtual machine implementation, quick variants have proven to be an effective optimization. (See Section A in Appendix I;

which is an integral part of this specification.) Supporting writes for updates of various instructions to quick variants in a non-quick to quick translator cache 131 changes the normal virtual machine instruction to a quick virtual machine instruction to take advantage of the large benefits bought from the quick variants. In particular, as described below, when the information required to initiate execution of an instruction has been assembled for the first time, the information is stored in a cache along with the value of program counter PC as tag in non-quick to quick translator cache 131 and the instruction is identified as a quick-variant. In one embodiment, this is done with self-modifying code.

Upon a subsequent call of that instruction, instruction decode unit 130 detects that the instruction is identified as a quick-variant and simply retrieves the information needed to initiate execution of the instruction from non-quick to quick translator cache 131. Non-quick to quick translator cache is an optional feature of hardware processor 100.

With regard to branching, a very short pipe with quick branch resolution is sufficient for most implementations. However, an appropriate simple branch prediction mechanism can alternatively be introduced, e.g., branch predictor circuit 133. Implementations for branch predictor circuit 133 include branching based on opcode, branching based on offset, or branching based on a two-bit counter mechanism.

The JAVA virtual machine specification defines an instruction invokenonvirtual, opcode 183, which, upon execution, invokes methods. The opcode is followed by an index byte one and an index byte two. (See Section I.) Operand stack 423 contains a reference to an object and some number of arguments when this instruction is executed.

Index bytes one and two are used to generate an index into the constant pool of the current class. The item in the constant pool at that index points to a complete method signature and class. Signatures are defined in Section I and that description is incorporated herein by reference.

The method signature, a short, unique identifier for each method, is looked up in a method table of the class indicated. The result of the lookup is a method block that indicates the type of method and the number of arguments for the method. The object reference and arguments are popped off this method's stack and become initial values of the local variables of the new method. The execution then resumes with the first instruction of the new method. Upon execution, instructions invokevirtual, opcode 182, and invokestatic, opcode 184, invoke processes similar to that just described. In each case, a pointer is used to lookup a method block.

A method argument cache 134, that also is an optional feature of hardware processor 100, is used, in a first embodiment, to store the method block of a method for use after the first call to the method, along with the pointer to the method block as a tag. Instruction decode unit 130 uses index bytes one and two to generate the pointer and then uses the pointer to retrieve the method block for that pointer in cache 134. This permits building the stack frame for the newly invoked method more rapidly in the background in subsequent invocations of the method. Alternative embodiments may use a program counter or method identifier as a reference into cache 134. If there is a cache miss, the instruction is executed in the normal fashion and cache 134 is updated accordingly. The particular process used to determine which cache entry is overwritten is not an essential aspect of this invention. A least-recently used criterion could be implemented, for example.

In an alternative embodiment, method argument cache 134 is used to store the pointer to the method block, for use after the first call to the method, along with the value of program counter PC of the method as a tag. Instruction decode unit 130 uses the value of program counter PC to access cache 134. If the value of program counter PC is equal to one of the tags in cache 134, cache 134 supplies the pointer stored with that tag to instruction decode unit 130. Instruction decode unit 139 uses the supplied pointer to retrieve the method block for the method. In view of these two embodiments, other alternative embodiments will be apparent to those of skill in the art.

Wide index forwarder 136, which is an optional element of hardware processor 100, is a specific embodiment of instruction folding for instruction wide. Wide index forwarder 136 handles an opcode encoding an extension of an index operand for an immediately subsequent virtual machine instruction. In this way, wide index forwarder 136 allows instruction decode unit 130 to provide indices into local variable storage 421 when the number of local variables exceeds that addressable with a single byte index without incurring a separate execution cycle for instruction wide.

Aspects of instruction decoder 135, particularly instruction folding, non-quick to quick translator cache 131, current object loader folder 132, branch predictor 133, method argument cache 134, and wide index forwarder 136 are also useful in implementations that utilize a software interpreter or just-in-time compiler, since these elements can be used to accelerate the operation of the software interpreter or just-in-time compiler. In such an implementation, typically, the virtual machine instructions are translated to an instruction for the processor executing the interpreter or compiler, e.g., any one of a Sun processor, a DEC processor, an Intel processor, or a Motorola processor, for example, and the operation of the elements is modified to support execution on that processor. The translation from the virtual machine instruction to the other processor instruction can be done either with a translator in a ROM or a simple software translator. For additional examples of dual instruction set processors, see U.S. patent application Ser. No. 08/643,104, now abandoned, entitled "A PROCESSOR FOR EXECUTING INSTRUCTION SETS RECEIVED FROM A NETWORK OR FROM A LOCAL MEMORY" naming Marc Tremblay and James Michael O'Connor as inventors, assigned to the assignee of this application, and filed on even date herewith, which is incorporated herein by reference in its entirety Integer Execution Unit Integer execution unit IEU, that includes instruction decode unit 130, integer unit 142, and stack management unit 150, is responsible for the execution of all the virtual machine instructions except the floating point related instructions. The floating point related instructions are executed in floating point unit 143.

Integer execution unit IEU interacts at the front end with instructions cache unit 120 to fetch instructions, with floating point unit (FPU) 143 to execute floating point instructions, and finally with data cache unit (DCU) 160 to execute load and store related instructions. Integer execution unit IEU also contains microcode ROM 141 which contains instructions to execute certain virtual machine instructions associated with integer operations.

Integer execution unit IEU includes a cached portion of stack 400, i.e., stack cache 155. Stack cache 155 provides fast storage for operand stack and local variable entries associated with a current method, e.g., operand stack 423 and local variable storage 421 entries. Although, stack cache 155 may provide sufficient storage for all operand stack and local variable entries associated with a current method, depending on the number of operand stack and local variable entries, less than all of local variable entries or less than all of both local variable entries and operand stack entries may be represented in stack cache 155. Similarly, additional entries, e.g., operand stack and or local variable entries for a calling method, may be represented in stack cache 155 if space allows.

Stack cache 155 is a sixty-four entry thirty-two-bit wide array of registers that is physically implemented as a register file in one embodiment. Stack cache 155 has three read ports, two of which are dedicated to integer execution unit IEU and one to dribble manager unit 151. Stack cache 155 also has two write ports, one dedicated to integer execution unit IEU and one to dribble manager unit 151.

Integer unit 142 maintains the various pointers which are used to access variables, such as local variables, and operand stack values, in stack cache 155. Integer unit 142 also maintains pointers to detect whether a stack cache hit has taken place. Runtime exceptions are caught and dealt with by exception handlers that are implemented using information in microcode ROM 141 and circuit 170.

Integer unit 142 contains a 32-bit ALU to support arithmetic operations. The operations supported by the ALU include: add, subtract, shift, and, or, exclusive or, compare, greater than, less than, and bypass. The ALU is also used to determine the address of conditional branches while a separate comparator determines the outcome of the branch instruction.

The most common set of instructions which executes cleanly through the pipeline is the group of ALU instructions. The ALU instructions read the operands from the top of stack 400 in decode stage 302 and use the ALU in execution stage 303 to compute the result. The result is written back to stack 400 in write-back stage 305. There are two levels of bypass which may be needed if consecutive ALU operations are accessing stack cache 155.

Since the stack cache ports are 32-bits wide in this embodiment, double precision and long data operations take two cycles. A shifter is also present as part of the ALU. If the operands are not available for the instruction in decode stage 302, or at a maximum at the beginning of execution stage 303, an interlock holds the pipeline stages before execution stage 303.

The instruction cache unit interface of integer execution unit IEU is a valid/accept interface, where instruction cache unit 120 delivers instructions to integer decode unit 130 in fixed fields along with valid bits. Instruction decoder 135 responds by signaling how much byte aligner circuit 122 needs to shift, or how many bytes instruction decode unit 130 could consume in decode stage 302. The instruction cache unit interface also signals to instruction cache unit 120 the branch mis-predict condition, and the branch address in execution stage 303. Traps, when taken, are also similarly indicated to instruction cache unit 120. Instruction cache unit 120 can hold integer unit 142 by not asserting any of the valid bits to instruction decode unit 130. Instruction decode unit 130 can hold instruction cache unit 120 by not asserting the shift signal to byte aligner circuit 122.

The data cache interface of integer execution unit IEU also is a valid-accept interface, where integer unit 142 signals, in execution stage 303, a load or store operation along with its attributes, e.g., non-cached, special stores etc., to data cache controller 161 in data cache unit 160. Data cache unit 160 can return the data on a load, and control integer unit 142 using a data control unit hold signal. On a data cache hit, data cache unit 160 returns the requested data, and then releases the pipeline.

On store operations, integer unit 142 also supplies the data along with the address in execution stage 303. Data cache unit 165 can hold the pipeline in cache stage 304 if data cache unit 165 is busy, e.g., doing a line fill etc.

Floating point operations are dealt with specially by integer execution unit IEU. Instruction decoder 135 fetches and decodes floating point unit 143 related instructions. Instruction decoder 135 sends the floating point operation operands for execution to floating point unit 142 in decode state 302. While floating point unit 143 is busy executing the floating point operation, integer unit 142 halts the pipeline and waits until floating point unit 143 signals to integer unit 142 that the result is available.

A floating point ready signal from floating point unit 143 indicates that execution stage 303 of the floating point operation has concluded. In response to the floating point ready signal, the result is written back into stack cache 155 by integer unit 142. Floating point load and stores are entirely handled by integer execution unit IEU, since the operands for both floating point unit 143 and integer unit 142 are found in stack cache 155.

Stack Management Unit

A stack management unit 150 stores information, and provides operands to execution unit 140. Stack management unit 150 also takes care of overflow and underflow conditions of stack cache 155.

In one embodiment, stack management unit 150 includes stack cache 155 that, as described above, is a three read port, two write port register file in one embodiment; a stack control unit 152 which provides the necessary control signals for two read ports and one write port that are used to retrieve operands for execution unit 140 and for storing data back from a write-back register or data cache 165 into stack cache 155; and a dribble manager 151 which speculatively dribbles data in and out of stack cache 155 into memory whenever there is an overflow or underflow in stack cache 155. In the exemplary embodiment of FIG. 1, memory includes data cache 165 and any memory storage interfaced by memory interface unit 110. In general, memory includes any suitable memory hierarchy including caches, addressable read/write memory storage, secondary storage, etc. Dribble manager 151 also provides the necessary control signals for a single read port and a single write port of stack cache 155 which are used exclusively for background dribbling purposes.

In one embodiment, stack cache 155 is managed as a circular buffer which ensures that the stack grows and shrinks in a predictable manner to avoid overflows or overwrites. The saving and restoring of values to and from data cache 165 is controlled by dribbler manager 151 using high- and low-water marks, in one embodiment.

Stack management unit 150 provides execution unit 140 with two 32-bit operands in a given cycle. Stack management unit 150 can store a single 32-bit result in a given cycle.

Dribble manager 151 handles spills and fills of stack cache 155 by speculatively dribbling the data in and out of stack cache 155 from and to data cache 165. Dribble manager 151 generates a pipeline stall signal to stall the pipeline when a stack overflow or underflow condition is detected. Dribble manager 151 also keeps track of requests sent to data cache unit 160. A single request to data cache unit 160 is a 32-bit consecutive load or store request.

The hardware organization of stack cache 155 is such that, except for long operands (long integers and double precision floating-point numbers), implicit operand fetches for opcodes do not add latency to the execution of the opcodes. The number of entries in operand stack 423 (FIG. 4A) and local variable storage 422 that are maintained in stack cache 155 represents a hardware/performance tradeoff. At least a few operand stack 423 and local variable storage 422 entries are required to get good performance. In the exemplary embodiment of FIG. 1, at least the top three entries of operand stack 423 and the first four local variable storage 422 entries are preferably represented in stack cache 155.

One key function provided by stack cache 155 (FIG. 1) is to emulate a register file where access to the top two registers is always possible without extra cycles. A small hardware stack is sufficient if the proper intelligence is provided to load/store values from/to memory in the background, therefore preparing stack cache 155 for incoming virtual machine instructions.

As indicated above, all items on stack 400 (regardless of size) are placed into a 32-bit word. This tends to waste space if many small data items are used, but it also keeps things relatively simple and free of lots of tagging or muxing. An entry in stack 400 thus represents a value and not a number of bytes. Long integer and double precision floating-point numbers require two entries. To keep the number of read and write ports low, two cycles to read two long integers or two double precision floating point numbers are required.

The mechanism for filling and spilling the operand stack from stack cache 155 out to memory by dribble manager 151 can assume one of several alternative forms. One register at a time can be filled or spilled, or a block of several registers filled or spilled at once. A simple scoreboarded method is appropriate for stack management. In its simplest form, a single bit indicates if the register in stack cache 155 is currently valid. In addition, some embodiments of stack cache 155 use a single bit to indicate whether the data content of the register is saved to stack 400, i.e., whether the register is dirty. In one embodiment, a high-water mark/low-water mark heuristic determines when entries are saved to and restored from stack 400, respectively (FIG. 4A). Alternatively, when the top-of-the-stack becomes close to bottom 401 of stack cache 155 by a fixed, or alternatively, a programmable number of entries, the hardware starts loading registers from stack 400 into stack cache 155. For other embodiments of stack management unit 150 and dribble manager unit 151 see U.S. patent application Ser. No. 08/787,736, entitled "METHODS AND APPARATI FOR STACK CACHING" naming Marc Tremblay and James Michael O'Connor as inventors, assigned to the assignee of this application, and filed on even date herewith, which is incorporated herein by reference in its entirety, and see also U.S. patent application Ser. No. 08/787,617, entitled "METHOD FRAME STORAGE USING MULTIPLE MEMORY CIRCUITS" naming Marc Tremblay and James Michael O'Connor as inventors, assigned to the assignee of this application, and filed on even date herewith, which also is incorporated herein by reference in its entirety.

In one embodiment, stack management unit 150 also includes an optional local variable look-aside cache 153. Cache 153 is most important in applications where both the local variables and operand stack 423 (FIG. 4A) for a method are not located on stack cache 155. In such instances when cache 153 is not included in hardware processor 100, there is a miss on stack cache 155 when a local variable is accessed, and execution unit 140 accesses data cache unit 160, which in turn slows down execution. In contrast, with cache 153, the local variable is retrieved from cache 153 and there is no delay in execution.

Figure 4D:
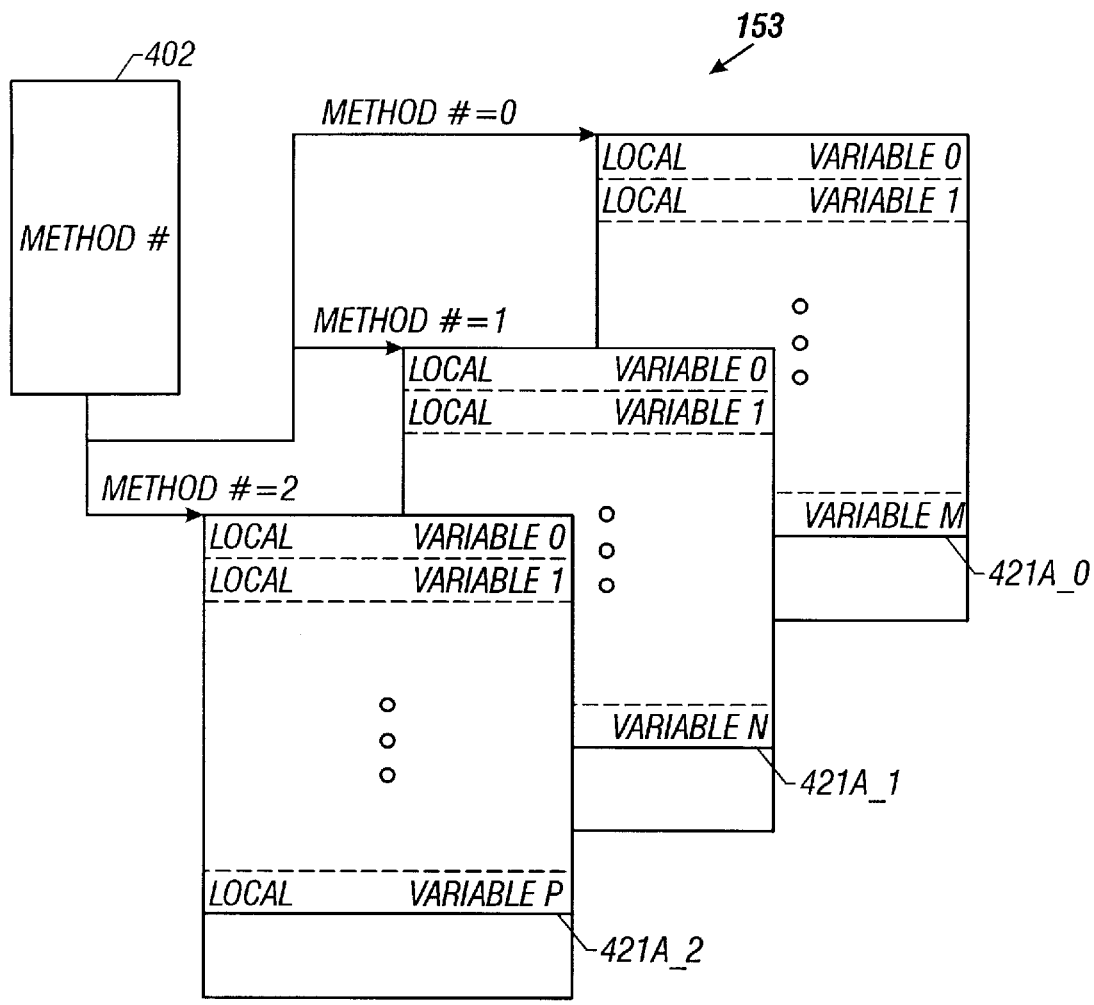
FIG. 4D is an illustration of one embodiment of the local variables look-aside cache in the stack management unit of FIG. 1.

One embodiment of local variable look-aside cache 153 is illustrated in FIG. 4D for method 0 to 2 on stack 400. Local variables zero to M, where M is an integer, for method 0 are stored in plane 421A_0 of cache 153 and plane 421A_0 is accessed when method number 402 is zero. Local variables zero to N, where N is an integer, for method 1 are stored in plane 421A_1 of cache 153 and plane 421A_1 is accessed when method number 402 is one. Local variables zero to P, where P is an integer, for method 1 are stored in plane 421A_2 of cache 153 and plane 421A_2 is accessed when method number 402 is two. Notice that the various planes of cache 153 may be different sizes, but typically each plane of the cache has a fixed size that is empirically determined.

When a new method is invoked, e.g, method 2, a new plane 421A_2 in cache 153 is loaded with the local variables for that method, and method number register 402, which in one embodiment is a counter, is changed, e.g., incremented, to point to the plane of cache 153 containing the local variables for the new method. Notice that the local variables are ordered within a plane of cache 153 so that cache 153 is effectively a direct-mapped cache. Thus, when a local variable is needed for the current method, the variable is accessed directly from the most recent plane in cache 153, i.e., the plane identified by method number 402. When the current method returns, e.g., method 2, method number register 402 is changed, e.g., decremented, to point at previous plane 421A-1 of cache 153. Cache 153 can be made as wide and as deep as necessary.

Data Cache Unit

Data cache unit 160 (DCU) manages all requests for data in data cache 165. Data cache requests can come from dribbling manager 151 or execution unit 140. Data cache controller 161 arbitrates between these requests giving priority to the execution unit requests. In response to a request, data cache controller 161 generates address, data and control signals for the data and tags RAMs in data cache 165. For a data cache hit, data cache controller 161 reorders the data RAM output to provide the right data.

Data cache controller 161 also generates requests to I/O bus and memory interface unit 110 in case of data cache misses, and in case of non-cacheable loads and stores. Data cache controller 161 provides the data path and control logic for processing non-cacheable requests, and the data path and data path control functions for handling cache misses.

For data cache hits, data cache unit 160 returns data to execution unit 140 in one cycle for loads. Data cache unit 160 also takes one cycle for write hits. In case of a cache miss, data cache unit 160 stalls the pipeline until the requested data is available from the external memory. For both non-cacheable loads and stores, data cache 161 is bypassed and requests are sent to I/O bus and memory interface unit 110. Non-aligned loads and stores to data cache 165 trap in software.

Data cache 165 is a two-way set associative, write back, write allocate, 16-byte line cache. The cache size is configurable to 0, 1, 2, 4, 8, 16 Kbyte sizes. The default size is 8 Kbytes. Each line has a cache tag store entry associated with the line. On a cache miss, 16 bytes of data are written into cache 165 from external memory.

Each data cache tag contains a 20-bit address tag field, one valid bit, and one dirty bit. Each cache tag is also associated with a least recently used bit that is used for replacement policy. To support multiple cache sizes, the width of the tag fields also can be varied. If a cache enable bit in processor service register is not set, loads and stores are treated like non-cacheable instructions by data cache controller 161.

A single sixteen-byte write back buffer is provided for writing back dirty cache lines which need to be replaced. Data cache unit 160 can provide a maximum of four bytes on a read and a maximum of four bytes of data can be written into cache 161 in a single cycle. Diagnostic reads and writes can be done on the caches.

Memory Allocation Accelerator

In one embodiment, data cache unit 165 includes a memory allocation accelerator 166. Typically, when a new object is created, fields for the object are fetched from external memory, stored in data cache 165 and then the field is cleared to zero. This is a time consuming process that is eliminated by memory allocation accelerator 166. When a new object is created, no fields are retrieved from external memory. Rather, memory allocation accelerator 160 simply stores a line of zeros in data cache 165 and marks that line of data cache 165 as dirty. Memory allocation accelerator 166 is particularly advantageous with a write-back cache. Since memory allocation accelerator 166 eliminates the external memory access each time a new object is created, the performance of hardware processor 100 is enhanced.

Floating Point Unit

Floating point unit (FPU) 143 includes a microcode sequencer, input/output section with input/output registers, a floating point adder, i.e., an ALU, and a floating point multiply/divide unit. The microcode sequencer controls the microcode flow and microcode branches. The input/output section provides the control for input/output data transactions, and provides the input data loading and output data unloading registers. These registers also provide intermediate result storage.

The floating point adder-ALU includes the combinatorial logic used to perform the floating point adds, floating point subtracts, and conversion operations. The floating point multiply/divide unit contains the hardware for performing multiply/divide and remainder.

Floating point unit 143 is organized as a microcoded engine with a 32-bit data path. This data path is often reused many times during the computation of the result. Double precision operations require approximately two to four times the number of cycles as single precision operations. The floating point ready signal is asserted one-cycle prior to the completion of a given floating point operation. This allows integer unit 142 to read the floating point unit output registers without any wasted interface cycles. Thus, output data is available for reading one cycle after the floating point ready signal is asserted.

Execution Unit Accelerators

Since the JAVA Virtual Machine Specification of Section I is hardware independent, the virtual machine instructions are not optimized for a particular general type of processor, e.g., a complex instruction set computer (CISC) processor, or a reduced instruction set computer (RISC) processor. In fact, some virtual machine instructions have a CISC nature and others a RISC nature. This dual nature complicates the operation and optimization of hardware processor 100.

For example, the JAVA virtual machine specification defines opcode 171 for an instruction lookupswitch, which is a traditional switch statement. The datastream to instruction cache unit 120 includes an opcode 171, identifying the N-way switch statement, that is followed by zero to three bytes of padding. The number of bytes of padding is selected so that first operand byte begins at an address that is a multiple of four. Herein, datastream is used generically to indicate information that is provided to a particular element, block, component, or unit.

Following the padding bytes in the datastream are a series of pairs of signed four-byte quantities. The first pair is special. A first operand in the first pair is the default offset for the switch statement that is used when the argument, referred to as an integer key, or alternatively, a current match value, of the switch statement is not equal to any of the values of the matches in the switch statement. The second operand in the first pair defines the number of pairs that follow in the datastream.

Each subsequent operand pair in the datastream has a first operand that is a match value, and a second operand that is an offset. If the integer key is equal to one of the match values, the offset in the pair is added to the address of the switch statement to define the address to which execution branches. Conversely, if the integer key is unequal to any of the match values, the default offset in the first pair is added to the address of the switch statement to define the address to which execution branches. Direct execution of this virtual machine instruction requires many cycles.

To enhance the performance of hardware processor 100, a look-up switch accelerator 145 is included in hardware processor 100. Look-up switch accelerator 145 includes an associative memory which stores information associated with one or more lookup switch statements. For each lookup switch statement, i.e., each instruction lookupswitch, this information includes a lookup switch identifier value, i.e., the program counter value associated with the lookup switch statement, a plurality of match values and a corresponding plurality of jump offset values.

Lookup switch accelerator 145 determines whether a current instruction received by hardware processor 100 corresponds to a lookup switch statement stored in the associative memory. Lookup switch accelerator 145 further determines whether a current match value associated with the current instruction corresponds with one of the match values stored in the associative memory. Lookup switch accelerator 145 accesses a jump offset value from the associative memory when the current instruction corresponds to a lookup switch statement stored in the memory and the current match value corresponds with one of the match values stored in the memory wherein the accessed jump offset value corresponds with the current match value.

Lookup switch accelerator 145 further includes circuitry for retrieving match and jump offset values associated with a current lookup switch statement when the associative memory does not already contain the match and jump offset values associated with the current lookup switch statement. Lookup switch accelerator 145 is described in more detail in U.S. patent application Ser. No. 08/788,811, entitled "LOOK-UP SWITCH ACCELERATOR AND METHOD OF OPERATING SAME" naming Marc Tremblay and James Michael O'Connor as inventors, assigned to the assignee of this application, and filed on even date herewith, which is incorporated herein by reference in its entirety.

In the process of initiating execution of a method of an object, execution unit 140 accesses a method vector to retrieve one of the method pointers in the method vector, i.e., one level of indirection. Execution unit 140 then uses the accessed method pointer to access a corresponding method, i.e., a second level of indirection.

To reduce the levels of indirection within execution unit 140, each object is provided with a dedicated copy of each of the methods to be accessed by the object. Execution unit 140 then accesses the methods using a single level of indirection. That is, each method is directly accessed by a pointer which is derived from the object. This eliminates a level of indirection which was previously introduced by the method pointers. By reducing the levels of indirection, the operation of execution unit 140 can be accelerated. The acceleration of execution unit 140 by reducing the levels of indirection experienced by execution unit 140 is described in more detail in U.S. patent application Ser. No. 08/787,846, now U.S. Pat. No. 5,970,242 entitled "REPLICATING CODE TO ELIMINATE A LEVEL OF INDIRECTION DURING EXECUTION OF AN OBJECT ORIENTED COMPUTER PROGRAM" naming Marc Tremblay and James Michael O'Connor as inventors, assigned to the assignee of this application, and filed on even date herewith, which is incorporated herein by reference in its entirety.

Getfield-putfield Accelerator

Other specific functional units and various translation lookaside buffer (TLB) types of structures may optionally be included in hardware processor 100 to accelerate accesses to the constant pool. For example, the JAVA virtual machine specification defines an instruction putfield, opcode 181, that upon execution sets a field in an object and an instruction getfield, opcode 180, that upon execution fetches a field from an object. In both of these instructions, the opcode is followed by an index byte one and an index byte two. Operand stack 423 contains a reference to an object followed by a value for instruction putfield, but only a reference to an object for instruction getfield.

Index bytes one and two are used to generate an index into the constant pool of the current class. The item in the constant pool at that index is a field reference to a class name and a field name. The item is resolved to a field block pointer which has both the field width, in bytes, and the field offset, in bytes.

An optional getfield-putfield accelerator 146 in execution unit 140 stores the field block pointer for instruction getfield or instruction putfield in a cache, for use after the first invocation of the instruction, along with the index used to identify the item in the constant pool that was resolved into the field block pointer as a tag. Subsequently, execution unit 140 uses index bytes one and two to generate the index and supplies the index to getfield-putfield accelerator 146. If the index matches one of the indexes stored as a tag, i.e., there is a hit, the field block pointer associated with that tag is retrieved and used by execution unit 140. Conversely, if a match is not found, execution unit 140 performs the operations described above. Getfield-putfield accelerator 146 is implemented without using self-modifying code that was used in one embodiment of the quick instruction translation described above.

In one embodiment, getfield-putfield accelerator 146 includes an associative memory that has a first section that holds the indices that function as tags, and a second section that holds the field block pointers. When an index is applied through an input section to the first section of the associative memory, and there is a match with one of the stored indices, the field block pointer associated with the stored index that matched in input index is output from the second section of the associative memory.

Bounds Check Unit

Bounds check unit 147 (FIG. 1) in execution unit 140 is an optional hardware circuit that checks each access to an element of an array to determine whether the access is to a location within the array. When the access is to a location outside the array, bounds check unit 147 issues an active array bound exception signal to execution unit 140. In response to the active array bound exception signal, execution unit 140 initiates execution of an exception handler stored in microcode ROM 141 that handles the out of bounds array access.

In one embodiment, bounds check unit 147 includes an associative memory element in which is stored an array identifier for an array, e.g., a program counter value, and a maximum value and a minimum value for the array. When an array is accessed, i.e, the array identifier for that array is applied to the associative memory element, and assuming the array is represented in the associative memory element, the stored minimum value is a first input signal to a first comparator element, sometimes called a comparison element, and the stored maximum value is a first input signal to a second comparator element, sometimes also called a comparison element. A second input signal to the first and second comparator elements is the value associated with the access of the array's element.

If the value associated with the access of the array's element is less than or equal to the stored maximum value and greater than or equal to the stored minimum value, neither comparator element generates an output signal. However, if either of these conditions is false, the appropriate comparator element generates the active array bound exception signal. A more detailed description of one embodiment of bounds check unit 147 is provided in U.S. patent application Ser. No. 08/642,248, now abandoned, entitled "PROCESSOR WITH ACCELERATED ARRAY ACCESS BOUNDS CHECKING" naming Marc Tremblay, James Michael O'Connor, and William N. Joy as inventors, assigned to the assignee of this application, and filed on even date herewith which is incorporated herein by reference in its entirety.

The JAVA Virtual Machine Specification defines that certain instructions can cause certain exceptions. The checks for these exception conditions are implemented, and a hardware/software mechanism for dealing with them is provided in hardware processor 100 by information in microcode ROM 141 and program counter and trap control logic 170. The alternatives include having a trap vector style or a single trap target and pushing the trap type on the stack so that the dedicated trap handler routine determines the appropriate action.

No external cache is required for the architecture of hardware processor 100. No translation lookaside buffers need be supported.

Figure 5:
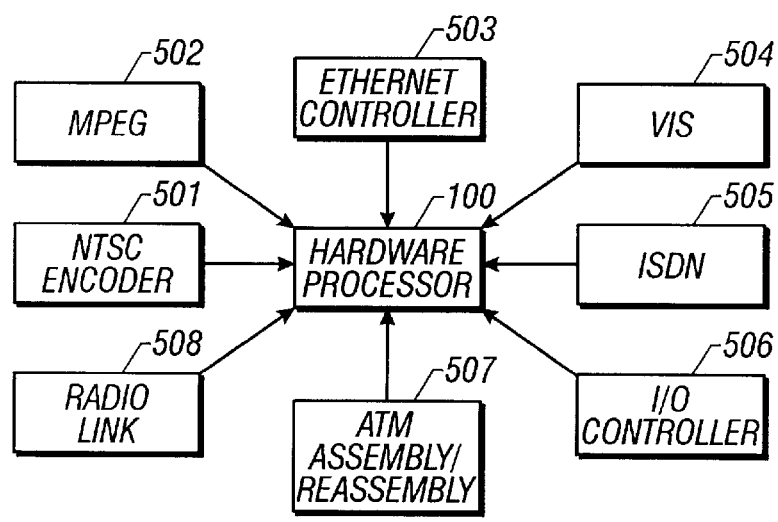
FIG. 5 illustrates several possible add-ons to the hardware processor of FIG. 1.

FIG. 5 illustrates several possible add-ons to hardware processor 100 to create a unique system. Circuits supporting any of the eight functions shown, i.e., NTSC encoder 501, MPEG 502, Ethernet controller 503, VIS 504, ISDN 505, I/O controller 506, ATM assembly/reassembly 507, and radio link 508 can be integrated into the same chip as hardware processor 100 of this invention.

Non-quick to quick translator cache

Figure 6:
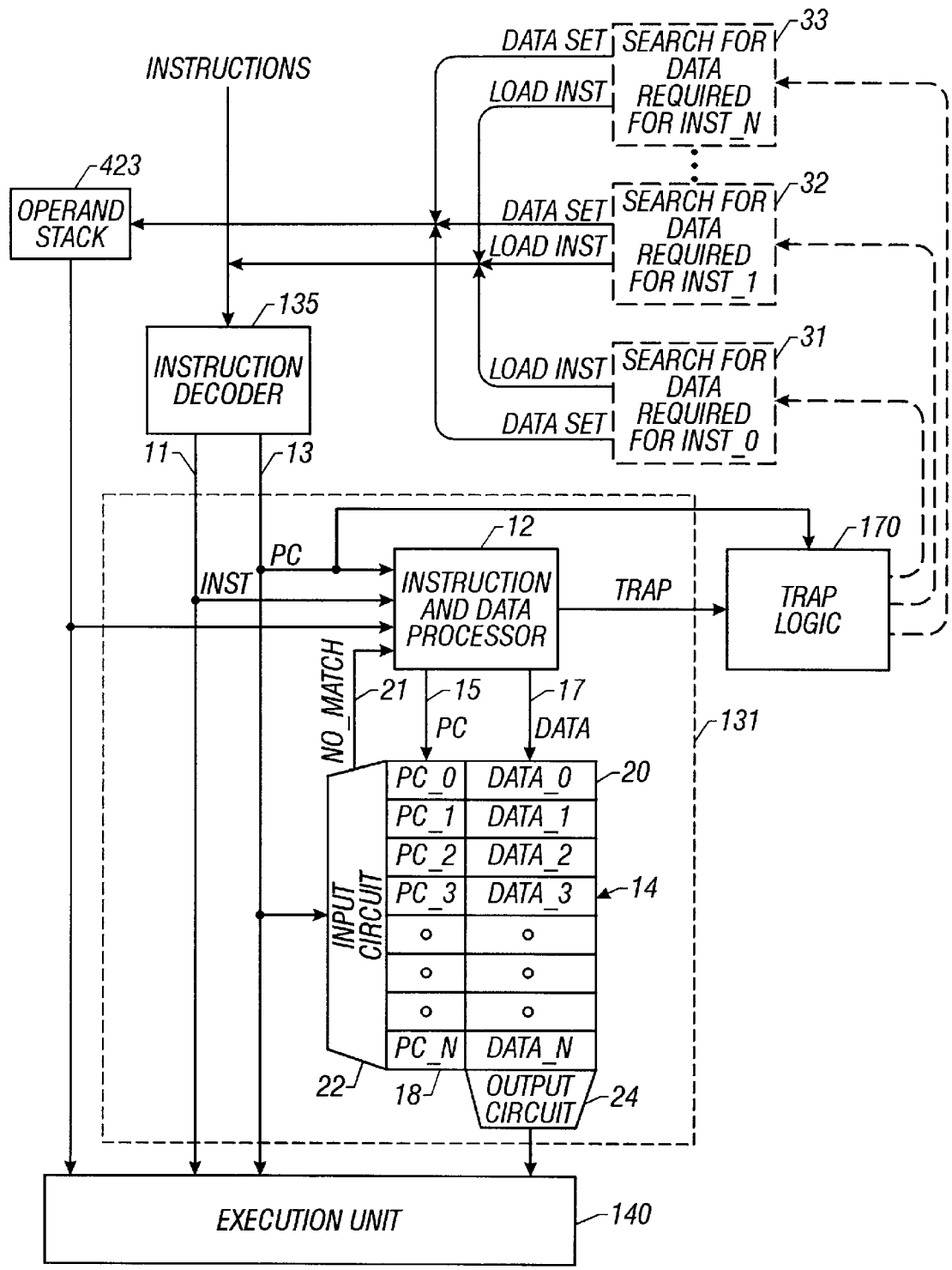
FIG. 6 is a block diagram of a portion of a computer system which includes an operand stack, an instruction decoder, a non-quick to quick translator cache (i.e., instruction accelerator), a trap logic circuit, software code and an execution unit in accordance with one embodiment of the present invention.

FIG. 6 is a block diagram of a portion of a computer system 1 which includes operand stack 423, instruction decoder 135, non-quick to quick translator cache 131, trap logic circuit 170, software search code 31, 32 and 33 and execution unit 140 in accordance with one embodiment of the present invention. In the described embodiment, instruction decoder 135 and non-quick to quick translator cache 131 are found in instruction decode unit 130 (FIG. 1). Non-quick to quick translator cache 131 includes instruction and data processor 12 and associative memory 14. Associative memory 14, in turn, includes instruction identifier memory section 18, data set memory section 20, input circuit 22 and output circuit 24. As described in more detail below, non-quick to quick translator cache 131 stores data sets which are readily accessible to enable the execution of selected non-quick instructions to be greatly accelerated. That is, non-quick to quick translator cache 131 functions as an instruction accelerator.

Instruction decoder 135 is coupled to receive a stream of instructions, such as JAVA byte codes, from instruction cache unit 120. Although the present invention is described in connection with JAVA instructions, the present invention can be applied to accelerate other types of instructions.

In response to the received instructions, instruction decoder 135 provides decoded instructions on bus 11 and program counter (PC) values corresponding to the decoded instructions on bus 13. These instructions and PC values are provided to execution unit 140 and to instruction and data processor 12. In addition, the PC values are provided to input circuit 22 of associative memory 14. In general, each of the PC values uniquely identifies a corresponding instruction. The top entry of operand stack 423 is provided to instruction and data processor 12.

Within associative memory 14, instruction identifier memory section 18 includes a plurality (N) of entries. Each of these N entries is capable of storing a corresponding instruction identifier value, such as instruction identifier values PC_0, PC_1, PC_2, PC_3, ... PC_N. Each of the instruction identifier values stored in instruction identifier memory section 18 corresponds to a unique PC value. Thus, the width of instruction identifier memory section 18 is selected to correspond with the width of the program counter.

Data set memory section 20 includes the same number of entries (N) as instruction identifier memory section 18. Thus, each entry in instruction identifier section 18 has an associated entry in data set section 20. Each of the N entries of data set memory section 20 is capable of storing a data set, such as data sets DATA_0, DATA_1, DATA_2, DATA_3, ... DATA_N. As described in more detail below, each of the data sets stored in data set memory section 20 includes the data which is required to execute a non-quick instruction. In the described embodiment, data set memory section 20 has a width of four 32-bit words. However, data set memory section 20 can have other widths in other embodiments.

The number of entries (N) present in instruction identifier memory section 18 and data set memory section 20 is selected in view of the particular application, and can be any integer greater than zero. In general, the number of entries (N) is selected to correspond with the number of non-quick instructions which are to be accelerated. The number of non-quick instructions to be accelerated can be determined by performing simulations which determine the performance achieved for different numbers of entries.

In the described embodiment, associative memory 14 is a content addressable memory which operates as follows. Input circuit 22 is coupled to receive the PC value provided by instruction decoder 135. If the PC value provided to input circuit 22 matches one of the instruction identifier values PC_0, PC_1, PC_2, PC_3, ... PC_N stored in instruction identifier memory section 18, then the associated data set DATA_0, DATA_1, DATA_2, DATA_3, ... DATA_N stored in data set memory section 20 is provided to output circuit 24. For example, if the PC value provided to input circuit 22 matches instruction identifier value PC_2, then data set DATA_2 will be routed through output circuit 24 to execution unit 140. If the PC value provided to input circuit 22 does not match any of the entries of instruction identifier memory section 18, then input circuit 22 asserts a NO_MATCH signal. The NO_MATCH signal is provided to instruction and data processor 12 on line 21. Although the present invention is described in connection with a content addressable memory, it is understood that in other embodiments, other types of memories can be used to implement the present invention.

Instruction and data processor 12 monitors each of the instructions provided on bus 11, and determines whether the current instruction on bus 11 is a non-quick instruction which is capable of being executed in an accelerated manner if a corresponding data set is readily accessible. Non-quick instructions which are capable of accelerated execution if a corresponding data set is readily accessible are hereinafter referred to as non-quick instructions having quick variants. Non-quick instructions having quick variants form a subset of the instructions provided by instruction decoder 135. Instruction and data processor 12 can determine whether the current instruction is a non-quick instruction having a quick variant by decoding an identifying portion (or portions) of the current instruction. In the described example, there are a plurality of non-quick instructions which have quick variants, namely, instructions INST_0, INST_1 ... INST_N. The JAVA virtual machine specification describes the following non-quick instructions which have quick variants: anewarray, checkcast, getfield, getstatic, instanceof, invokeinterface, invokespecial, invokestatic, invokevirtual, ldc, ldc_w, ldc2_w, multianewarray, new, putfield, and putstatic. These instructions are described in more detail in the JAVA virtual machine specification, which is attached hereto as Section I (See Appendix A of Section I).

Non-quick to quick translator cache 131 operates as follows in response to a current instruction having a current PC value. Instruction decoder 135 provides the current PC value and the decoded current instruction to execution unit 140 and to instruction and data processor 12. Instruction and data processor 12 is only activated when the decoded instruction is a non-quick instruction having a quick variant, a quick variant load instruction, or a retry instruction. The quick variant load and retry instructions are described in more detail below. If the current instruction provided by instruction decoder 135 on bus 11 is not a non-quick instruction having a quick variant, a quick variant load instruction or a retry instruction, then instruction and data processor 12 does nothing in response to this instruction. In this case, the current instruction and current PC value are provided to execution unit 140, which executes the current instruction.

However, when the current instruction is a non-quick instruction having a quick variant (e.g., INST_0, INST_1 ... INST_N), instruction and data processor 12 is activated in response to the current instruction. Upon being activated, instruction and data processor 12 determines the status of the NO_MATCH signal present on line 21. Initially, the instruction identifier values PC_0, PC_1, PC_2, PC_3, ... PC_N stored in instruction identifier memory section 18 are set to invalid values. Alternatively, 'valid' bits associated with the instruction identifier values PC_0, PC_1, PC_2, PC_3, ... PC_N can be cleared. As a result, the current PC value provided to input circuit 22 will not initially match any of the instruction identifier values stored in instruction identifier memory section 18. Consequently, the NO_MATCH signal is asserted. The absence of a match between the current PC value and the instruction identifier values PC_0, PC_1, PC_2, PC_3 ... PC_N indicates that the data set required to execute the current instruction is not stored in associative memory 14. As a result, instruction and data processor 12 must initially locate and retrieve this data set before the execution of the non-quick instruction can be accelerated.

In response to the asserted NO_MATCH signal and the determination that the current instruction is a non-quick instruction having a quick variant, instruction and data processor 12 asserts a control signal, TRAP. The control signal TRAP is provided to trap logic 170. In response to the control signal TRAP, trap logic 170 temporarily suspends the operation of execution unit 140, and causes a corresponding software code portion 31, 32, 33 to be accessed. The software code portion accessed is dependent upon the non-quick instruction which caused the control signal TRAP to be asserted.

In a particular embodiment, trap logic 170 accesses instruction cache unit 120 using the current PC value to identify the instruction which caused the control signal TRAP to be asserted. A switch statement is then implemented in software to direct execution to the appropriate software code portion (in response to the identified instruction). In alternative embodiments, other methods, such as a trap vector, can be used to direct execution to the appropriate software code portion. Table 1 defines a switch statement which is used in the described embodiment.

TABLE 1

SWITCH (IDENTIFIED INSTRUCTION)

| INST_0: | BEGIN |
| | ACCESS SOFTWARE PORTION 31 |
| | END |
| INST_1: | BEGIN |
| | ACCESS SOFTWARE PORTION 32 |
| | END |
| . | |
| . | |
| INST_N: | BEGIN |
| | ACCESS SOFTWARE PORTION 33 |
| | END |

Thus, when the identified instruction corresponds with INST_0, the switch statement causes software code portion 31 to be accessed. Similarly, when the identified instruction corresponds with INST_1, the switch statement causes software code portion 32 to be accessed. When the identified instruction corresponds with INST_N, the switch statement causes software code portion 33 to be accessed. In the described example, the value N of instruction INST_N is any integer greater than 1. That is, non-quick to quick translator cache 131 can be used to accelerate the execution of any number of non-quick instructions having quick variants. Instructions INST_0, INST_1, . . . INST_N are non-quick instructions having quick variants whose execution is to be accelerated by non-quick to quick translator cache 131.

Software code portions 31, 32, and 33 locate and retrieve the data sets required to execute instructions INST_0, INST_1 and INST_N, respectively. Stated another way, software code portions 31, 32 and 33 resolve the constant pool entries for instructions INST_0, INST_1 and INST_N, respectively.

Software code portions 31, 32 and 33 further cause the retrieved data sets to be loaded into operand stack 423. Software code portions 31, 32, and 33 provide quick variant load instructions to instruction decoder 135 after the retrieved data sets are loaded into operand stack 423. Instruction decoder 135 decodes the received quick variant load instructions. The decoded quick variant load instructions are provided to instruction and data processor 12 on bus 11. Instruction and data processor 12 identifies each quick variant load instruction present on bus 11, and in response, retrieves a corresponding data set which was previously loaded into operand stack 423.

Instruction and data processor 12 then loads the current PC value and the retrieved data set into associative memory 14. In one example, the current PC value is written to the first entry of instruction identifier memory section 18 as instruction identifier value PC_0, and the corresponding retrieved data set is written to the first entry of data set section 20 as data set DATA_0. The current PC value is routed from instruction and data processor 12 to memory section 18 on bus 15. The data set is routed from instruction and data processor 12 to data set memory section 20 on bus 17. The method used to select the particular entry within memory 14 can be, for example, random, a least recently used (LRU) algorithm or a first in, first out (FIFO) algorithm.

After the current PC value and the retrieved data set have been written to memory 14, instruction and data processor 12 causes the software code to retry the non-quick instruction which caused the control signal TRAP to be asserted. At this time, the current PC value, which is again provided to input circuit 22, matches an instruction identifier value (i.e., PC_0) stored within the instruction identifier memory section 18. As a result, the NO_MATCH signal is not asserted. Consequently, instruction and data processor 12 does not attempt to locate and retrieve a corresponding data set via trap logic 170 and software code portions 31, 32 and 33.

Because the current PC value matches the instruction identifier value PC_0, output circuit 24 passes the corresponding data set DATA_0 to execution unit 140. Consequently, execution unit 40 receives the current PC value and the current instruction from instruction decoder 135, as well as the associated data set DATA_0 from non-quick to quick translator cache 131. In response, execution unit 40 executes the non-quick instruction.

Once the PC value and the data set associated with a non-quick instruction having a quick variant have been loaded into associative memory 14, the non-quick instruction having a quick variant can be subsequently executed without having to access the software code. As a result, the non-quick instruction can be executed much faster than in the prior art (i.e., in a single cycle). Moreover, because the non-quick instruction is not overwritten, the non-quick instruction remains available in its original form. In addition, because the non-quick instruction is not overwritten, the non-quick instruction can be stored in read only memory.

The following example will further clarify the operation of computer system 1. In this example, instruction decoder 135 initially receives non-quick instruction having a quick variant INST_1, which has a corresponding PC value of 100. Because the instruction identifier memory section 18 is initially loaded with invalid PC values (or cleared 'valid' bits), the current PC value of 100 causes input circuit 22 to assert the NO_MATCH signal. In response to the NO_MATCH signal and the determination that instruction INST_1 is a non-quick instruction having a quick variant, instruction and data processor 12 asserts the TRAP control signal. Trap logic 170 uses the PC value to identify the current instruction as instruction INST_1. In response to the current instruction being identified as instruction INST_1, a software switch statement directs execution to software code portion 32. Software code portion 32 then retrieves the data set required to execute instruction INST_1, and loads this data set into operand stack 423. Software code portion 32 then provides a quick variant load instruction to instruction decoder 135. In response, instruction decoder 135 provides a decoded quick variant load instruction to instruction and data processor 12. In response, instruction and data processor 12 retrieves the data set from operand stack 423 and loads this data set into the first entry of data set memory section 20 as data set DATA_0. Instruction and data processor 12 further loads the current PC value of 100 into the first entry of instruction identifier memory section 18 as instruction identifier value PC_0. Instruction and data processor 12 then causes non-quick instruction INST_1 and the current PC value of 100 and to be re-asserted on buses 11 and 13, respectively. In one embodiment, instruction and data processor 12 accomplishes this by issuing a RETURN instruction which transfers control back to the instruction that caused the control signal TRAP to be asserted. At this time, input circuit 22 detects a match between the current PC value and instruction identifier value PC_0. In response, associative memory 14 provides the data set associated with instruction identifier value PC_0 (i.e., data set DATA_0) to output circuit 24. Output circuit 24 passes this data set DATA_0 to execution unit 140. Execution unit 140 then executes instruction INST_1.

Other non-quick instructions having quick variants (e.g., instructions INST_0 and INST_N) which are subsequently received by instruction decoder 135 are handled in a similar manner. For example, a non-quick instruction INST_0 having an associated PC value of 200 could result in the PC value of 200 being stored in instruction identifier section 18 as instruction identifier PC_1, and the data set associated with instruction INST_0 being stored in data set memory section 20 as data set DATA_1. Similarly, a non-quick instruction INST_N having an associated PC value of 300 could result in the PC value of 300 being stored in instruction identifier section 18 as instruction identifier PC_2, and the data set associated with instruction INST_N being stored in data set memory section 20 as data set DATA_2.

If a second non-quick instruction INST_1 having an associated PC value which is some value other than 100 is received by instruction decoder 135, this second non-quick instruction INST_1 is treated in a similar manner as the first non-quick instruction INST_1. For example, a second non-quick instruction INST_1 having an associated PC value of 400 could result in the PC value of 400 being stored in instruction identifier section 18 as instruction identifier PC_3, and the data set associated with the second non-quick instruction INST_1 being stored in data set memory section 20 as data set DATA_3. Note that the data set associated with the first non-quick instruction INST_1 (e.g., data set DATA_0) may not be the same as the data set associated with the second non-quick instruction INST_1 (e.g, data set DATA_3).

Although the invention has been described in connection with several embodiments, it is understood that this invention is not limited to the embodiments disclosed, but is capable of various modifications which would be apparent to a person skilled in the art. For example, if the number of entries in associative memory 14 is less than the number of non-quick instructions having quick variants, then a replacement algorithm can be used to determine which of the non-quick-instructions are to be accelerated by storing associated data sets in the associative memory 14. This replacement algorithm can be random, least recently used (LRU) or first in, first out (FIFO). Moreover, although the present invention has been described in connection with a control signal TRAP, it is understood that in other embodiments, the control signal TRAP can be replaced with a plurality of control signals, with each control signal corresponding to a non-quick instruction having a quick variant. Thus, the invention is limited only by the following claims.

Section I

The JAVA Virtual Machine Specification

©1993, 1994, 1995 Sun Microsystems, Inc.
2550 Garcia Avenue, Mountain View, California
94043-1100 U.S.A.

All rights reserved. This BETA quality release and related documentation are protected by copyright and distributed under licenses restricting its use, copying, distribution, and decompilation. No part of this release or related documentation may be reproduced in any form by any means without prior written authorization of Sun and its licensors, if any.

Portions of this product may be derived from the UNIX® and Berkeley 4.3 BSD systems, licensed from UNIX System Laboratories, Inc. and the University of California, respectively. Third-party font software in this release is protected by copyright and licensed from Sun's Font Suppliers.

RESTRICTED RIGHTS LEGEND: Use, duplication, or disclosure by the United States Government is subject to the restrictions set forth in DFARS 252.227-7013 (c)(1)(ii) and FAR 52.227-19.

The release described in this manual may be protected by one or more U.S. patents, foreign patents, or pending applications.

TRADEMARKS

Sun, Sun Microsystems, Sun Microsystems Computer Corporation, the Sun logo, the Sun Microsystems Computer Corporation logo, WebRunner, JAVA, FirstPerson and the FirstPerson logo and agent are trademarks or registered trademarks of Sun Microsystems, Inc. The "Duke" character is a trademark of Sun Microsystems, Inc. and Copyright (c) 1992-1995 Sun Microsystems, Inc. All Rights Reserved. UNIX® is a registered trademark in the United States and other countries, exclusively licensed through X/Open Company, Ltd. OPEN LOOK is a registered trademark of Novell, Inc. All other product names mentioned herein are the trademarks of their
respective owners.

All SPARC trademarks, including the SCD Compliant
Logo, are trademarks or registered trademarks of SPARC
International, Inc. SPARCstation, SPARCserver,
SPARCengine, SPARCworks, and SPARCompiler are licensed
exclusively to Sun Microsystems, Inc. Products bearing
SPARC trademarks are based upon an architecture
developed by Sun Microsystems, Inc.

The OPEN LOOK® and Sun™ Graphical User Interfaces
were developed by Sun Microsystems, Inc. for its users
and licensees. Sun acknowledges the pioneering efforts
of Xerox in researching and developing the concept of
visual or graphical user interfaces for the computer
industry. Sun holds a non-exclusive license from Xerox
to the Xerox Graphical User Interface, which license
also covers Sun's licensees who implement OPEN LOOK
GUIs and otherwise comply with Sun's written license
agreements.

X Window System is a trademark and product of the
Massachusetts Institute of Technology.

THIS PUBLICATION IS PROVIDED "AS IS" WITHOUT
WARRANTY OF ANY KIND, EITHER EXPRESS OR IMPLIED,
INCLUDING, BUT NOT LIMITED TO, THE IMPLIED WARRANTIES
OF MERCHANTABILITY, FITNESS FOR A PARTICULAR PURPOSE,
OR NON-INFRINGEMENT.

THIS PUBLICATION COULD INCLUDE TECHNICAL INACCURACIES
OR TYPOGRAPHICAL ERRORS. CHANGES ARE PERIODICALLY
ADDED TO THE INFORMATION HEREIN; THESE CHANGES WILL BE
INCORPORATED IN NEW EDITIONS OF THE PUBLICATION. SUN
MICROSYSTEMS, INC. MAY MAKE IMPROVEMENTS AND/OR CHANGES
IN THE PRODUCT(S) AND/OR THE PROGRAM(S) DESCRIBED IN
THIS PUBLICATION AT ANY TIME.

Preface

This document describes version 1.0 of the JAVA Virtual Machine and its instruction set. We have written this document to act as a specification for both compiler writers, who wish to target the machine, and as a specification for others who may wish to implement a compliant JAVA Virtual Machine.

The JAVA Virtual Machine is an imaginary machine that is implemented by emulating it in software on a real machine. Code for the JAVA Virtual Machine is stored in .class files, each of which contains the code for at most one public class.

Simple and efficient emulations of the JAVA Virtual Machine are possible because the machine's format is compact and efficient bytecodes. Implementations whose native code speed approximates that of compiled C are also possible, by translating the bytecodes to machine code, although Sun has not released such implementations at this time.
   The rest of this document is structured as follows:
    Chapter 1 describes the architecture of the JAVA Virtual Machine;
    Chapter 2 describes the .class file format;
       Chapter 3 describes the bytecodes; and
    Appendix A contains some instructions generatedinternally by Sun's implementation of the JAVA Virtual Machine. While not strictly part of the specification we
       describe these here so that this specification can serve as a reference for our implementation. As more implementations of the JAVA Virtual Machine become available, we may remove Appendix A from future
releases.

P:\DMS\8242\M-4722_U\020  .01

Sun will license the JAVA Virtual Machine trademark and logo for use with compliant implementations of this specification. If you are considering constructing your own implementation of the
JAVA Virtual Machine please contact us, at the email address below, so that we can work together to insure 100% compatibility of your implementation.

Send comments on this specification or questions about implementing the JAVA Virtual Machine to our
electronic mail address:JAVA@JAVA.sun.com.

1. JAVA Virtual Machine Architecture
1.1 Supported Data Types

The virtual machine data types include the basic
data types of the JAVA language:

```
byte    // 1-byte signed 2's complement integer
short   // 2-byte signed 2's complement integer
int     // 4-byte signed 2's complement integer
long    // 8-byte signed 2's complement integer
float   // 4-byte IEEE 754 single-precision float
double  // 8-byte IEEE 754 double-precision float
char    // 2-byte unsigned Unicode character
```

Nearly all JAVA type checking is done at compile time. Data of the primitive types shown above need not
be tagged by the hardware to allow execution of JAVA. Instead, the bytecodes that operate on primitive values indicate the types of the operands so that, for example, the iadd, ladd, fadd, and dadd instructions each add two numbers, whose types are int, long, float,
and double, respectively The virtual machine doesn't have separate instructions for boolean types. Instead, integer instructions, including integer returns, are used to operate on boolean values; byte arrays are used for
arrays of boolean.

The virtual machine specifies that floating point be done in IEEE 754 format, with support for gradual underflow. Older computer architectures that do not have support for IEEE format may run JAVA numeric programs very slowly.
Other virtual machine data types include:
object         // 4-byte reference to a JAVA
               object
returnAddress  // 4 bytes, used with
jsr/ret/jsr_w/ret_w instructions
Note: JAVA arrays are treated as objects.

This specification does not require any particular internal structure for objects. In our implementation an object reference is to a handle, which is a pair of pointers: one to a method table for the object, and the other to the data allocated for the object. Other implementations may use inline caching, rather than method table dispatch; such methods are likely to be faster on hardware that is emerging between now and the year 2000.

Programs represented by JAVA Virtual Machine bytecodes are expected to maintain proper type discipline and an implementation may refuse to execute a bytecode program that appears to violate such type discipline.

While the JAVA Virtual Machines would appear to be limited by the bytecode deðnition to running on a 32-bit address space machine, it is possible to build a version of the JAVA Virtual Machine that automatically translates the bytecodes into a 64-bit form. A description of this transformation is beyond the scope of the JAVA Virtual Machine Specification.

1.2 Registers

At any point the virtual machine is executing the code of a single method, and the pc register contains the address of the next bytecode to be executed.

Each method has memory space allocated for it to hold:

a set of local variables, referenced by a vars register;

an operand stack, referenced by an optop register; and a execution environment structure, referenced by a frame register.

All of this space can be allocated at once, since the size of the local variables and operand stack are known at compile time, and the size of the execution environment structure is well-known to the interpreter.

All of these registers are 32 bits wide.

1.3 Local Variables

Each JAVA method uses a fixed-sized set of local variables. They are addressed as word offsets from the vars register. Local variables are all 32 bits wide.

Long integers and double precision floats are considered to take up two local variables but are addressed by the index of the first local variable. (For example, a local variable with index containing a double precision float actually occupies storage at indices n and n+1.) The virtual machine specification does not require 64-bit values in local variables to be 64-bit aligned. Implementors are free to decide the appropriate way to divide long integers and double precision floats into two words.

Instructions are provided to load the values of local variables onto the operand stack and store values from the operand stack into local variables.

1.4 The Operand Stack

The machine instructions all take operands from an operand stack, operate on them, and return results to the stack. We chose a stack organization so that it would be easy to emulate the machine efficiently on machines with few or irregular registers such as the Intel 486 microprocessor.

The operand stack is 32 bits wide. It is used to pass parameters to methods and receive method results, as well as to supply parameters for operations and save operation results.

For example, execution of instruction iadd adds two integers together. It expects that the two integers are the top two words on the operand stack, and were pushed there by previous instructions. Both integers are popped from the stack, added, and their sum pushed back onto the operand stack. Subcomputations may be nested on the operand stack, and result in a single operand that can be used by the nesting computation.

Each primitive data type has specialized instructions that know how to operate on operands of that type. Each operand requires a single location on the stack, except for long and double operands, which require two locations.

Operands must be operated on by operators appropriate to their type. It is illegal, for example, to push two integers and then treat them as a long. This restriction is enforced, in the Sun implementation, by the bytecode verifier. However, a small number of operations (the dup opcodes and swap) operate on runtime data areas as raw values of a given width without regard to type.

In our description of the virtual machine instructions below, the effect of an instruction's execution on the operand stack is represented textually, with the stack growing from left to right, and each 32-bit word separately represented. Thus:

Stack: ..., value1, value2 ⇒ ..., value3 shows an operation that begins by having value2 on top of the stack with value1 just beneath it. As a result of the execution of the instruction, value1 and value2 are popped from the stack and replaced by value3, which has been calculated by the instruction. The remainder of the stack, represented by an ellipsis, is unaffected by the instruction's execution.

The types long and double take two 32-bit words on the operand stack:

Stack: ... ⇒ ..., value-word1, value-word2

This specification does not say how the two words are selected from the 64-bit long or double value; it is only necessary that a particular implementation be internally consistent.

1.5 Execution Environment

The information contained in the execution environment is used to do dynamic linking, normal method returns, and exception propagation.

1.5.1 Dynamic Linking

The execution environment contains references to the interpreter symbol table for the current method and current class, in support of dynamic linking of the method code. The class file code for a method refers to methods to be called and variables to be accessed symbolically. Dynamic linking translates these symbolic method calls into actual method calls, loading classes as necessary to resolve as-yet-undefined symbols, and translates variable accesses into appropriate offsets in storage structures associated with the runtime location of these variables.

This late binding of the methods and variables makes changes in other classes that a method uses less likely to break this code.

1.5.2 Normal Method Returns

If execution of the current method completes normally, then a value is returned to the calling method. This occurs when the calling method executes a return instruction appropriate to the return type.

The execution environment is used in this case to restore the registers of the caller, with the program counter of the caller appropriately incremented to skip the method call instruction. Execution then continues in the calling method's execution environment.

1.5.3 Exception and Error Propagation

An exceptional condition, known in JAVA as an Error or Exception, which are subclasses of Throwable, may arise in a program because of:

- a dynamic linkage failure, such as a failure to find a needed class file;
- a run-time error, such as a reference through a null pointer;
- an asynchronous event, such as is thrown by Thread.stop, from another thread; and
- the program using a throw statement.

When an exception occurs:

A list of catch clauses associated with the current method is examined. Each catch clause describes the instruction range for which it is active, describes the type of exception that it is to handle, and has the address of the code to handle it.

An exception matches a catch clause if the instruction that caused the exception is in the appropriate instruction range, and the exception type is a subtype of the type of exception that the catch clause handles. If a matching catch clause is found, the system branches to the specified handler. If no handler is found, the process is repeated until all the nested catch clauses of the current method have been exhausted.

The order of the catch clauses in the list is important. The virtual machine execution continues at the first matching catch clause. Because JAVA code is structured, it is always possible to sort all the exception handlers for one method into a single list that, for any possible program counter value, can be searched in linear order to find the proper (innermost containing applicable) exception handler for an exception occurring at that program counter value.

If there is no matching catch clause then the current method is said to have as its outcome the uncaught exception. The execution state of the method that called this method is restored from the execution environment, and the propagation of the exception continues, as though the exception had just occurred in this caller.

1.5.4 Additional Information

The execution environment may be extended with additional implementation-specified information, such as debugging information.

1.6 Garbage Collected Heap

The JAVA heap is the runtime data area from which class instances (objects) are allocated. The JAVA language is designed to be garbage collected - it does not give the programmer the ability to deallocate objects explicitly. The JAVA language does not presuppose any particular kind of garbage collection;

various algorithms may be used depending on system requirements.

1.7 Method Area

The method area is analogous to the store for compiled code in conventional languages or the text segment in a UNIX process. It stores method code (compiled JAVA code) and symbol tables. In the current JAVA implementation, method code is not part of the garbage-collected heap, although this is planned for a future release.

1.8 The JAVA Instruction Set

An instruction in the JAVA instruction set consists of a one-byte opcode specifying the operation to be performed, and zero or more operands supplying parameters or data that will be used by the operation. Many instructions have no operands and consist only of an opcode.

The inner loop of the virtual machine execution is effectively:

```
do {
    fetch an opcode byte
    execute an action depending on the value of
    the opcode
} while (there is more to do);
```

The number and size of the additional operands is determined by the opcode. If an additional operand is more than one byte in size, then it is stored in big-endian order - high order byte first. For example, a 16-bit parameter is stored as two bytes whose value is:

first_byte * 256 + second_byte

The bytecode instruction stream is only byte-aligned, with the exception being the tableswitch and lookupswitch instructions, which force alignment to a 4-byte boundary within their instructions.

These decisions keep the virtual machine code for a compiled JAVA program compact and reflect a conscious bias in favor of compactness at some possible cost in performance.

1.9 Limitations

The per-class constant pool has a maximum of 65535 entries. This acts as an internal limit on the total complexity of a single class.

The amount of code per method is limited to 65535 bytes by the sizes of the indices in the code in the exception table, the line number table, and the local variable table.

Besides this limit, the only other limitation of note is that the number of words of arguments in a method call is limited to 255.

2. Class File Format

This chapter documents the JAVA class (.class) file format.

Each class file contains the compiled version of either a JAVA class or a JAVA interface. Compliant JAVA interpreters must be capable of dealing with all class files that conform to the following specification.

A JAVA class file consists of a stream of 8-bit bytes. All 16-bit and 32-bit quantities are constructed by reading in two or four 8-bit bytes, respectively. The bytes are joined together in network (big-endian) order, where the high bytes come first. This format is supported by the JAVA JAVA.io.DataInput and JAVA.io.DataOutput interfaces, and classes such as JAVA.io.DataInputStream and JAVA.io.DataOutputStream.

The class file format is described here using a structure notation.  Successive fields in the structure appear in the external representation without padding or alignment.  Variable size arrays, often of variable sized elements, are called tables and are commonplace in these structures.

The types u1, u2, and u4 mean an unsigned one-, two-, or four-byte quantity, respectively, which are read by method such as readUnsignedByte, readUnsignedShort and readInt of the JAVA.io.DataInput interface.

2.1 Format

The following pseudo-structure gives a top-level description of the format of a class file:

```
ClassFile {
    u4 magic;
    u2 minor_version;
    u2 major_version;
    u2 constant_pool_count;
    cp_info constant_pool[constant_pool_count - 1];
    u2 access_flags;
    u2 this_class;
    u2 super_class;
    u2 interfaces_count;
    u2 interfaces[interfaces_count];
    u2 fields_count;
    field_info fields[fields_count];
    u2 methods_count;
    method_info methods[methods_count];
    u2 attributes_count;
    attribute_info attributes[attribute_count];
}
``` magic

This field must have the value 0xCAFEBABE.

minor_version, major_version

These fields contain the version number of the
JAVA compiler that produced this class file. An
implementation of the virtual machine will normally
support some range of minor version numbers 0-n of a
particular major version number. If the minor version
number is incremented the new code won't run on the old
virtual machines, but it is possible to make a new
virtual machine which can run versions up to n+1.

A change of the major version number indicates a
major incompatible change, one that requires a
different virtual machine that may not support the old
major version in any way.

The current major version number is 45; the
current minor version number is 3.

constant_pool_count

This field indicates the number of entries in the
constant pool in the class file.

constant_pool

The constant pool is a table of values. These
values are the various string constants, class names,
field names, and others that are referred to by the
class structure or by the code.

constant_pool[0] is always unused by the compiler,
and may be used by an implementation for any purpose.

Each of the constant_pool entries 1 through
constant_pool_count-1 is a variable-length entry, whose
format is given by the first "tag" byte, as described
in section 2.3.

access_flags

This field contains a mask of up to sixteen
modifiers used with class, method, and field
declarations. The same encoding is used on similar
fields in field_info and method_info as described
below. Here is the encoding:

| Flag Name | Value | Meaning | Used By |

| | | | |
|---|---|---|---|
| ACC_PUBLIC | 0x0001 | Visible to everyone | Class, Method, Variable |
| ACC_PRIVATE | 0x0002 | Visible only to the defining class | Method, Variable |
| ACC_PROTECTED | 0x0004 | Visible to subclasses | Method, Variable |
| ACC_STATIC | 0x0008 | Variable or method is static | Method, Variable |
| ACC_FINAL | 0x0010 | No further subclassing, overriding, or assignment after initialization | Class, Method, Variable |
| ACC_SYNCHRONIZED | 0x0020 | Wrap use in monitor lock | Method |
| ACC_VOLATILE | 0x0040 | Can't cache | Variable |
| ACC_TRANSIENT | 0x0080 | Not to be written or read by a persistent object manager | Variable |
| ACC_NATIVE | 0x0100 | Implemented in a language other than JAVA | Method |
| ACC_INTERFACE | 0x0200 | Is an interface | Class |
| ACC_ABSTRACT | 0x0400 | No body provided | Class, Method | this_class

This field is an index into the constant pool; constant_pool [this_class] must be a CONSTANT_class.

super_class

This field is an index into the constant pool. If the value of super_class is nonzero, then constant_pool [super_class] must be a class, and gives the index of this class's superclass in the constant pool.

If the value of super_class is zero, then the class being defined must be JAVA.lang.Object, and it has no superclass.

interfaces_count

This field gives the number of interfaces that this class implements.

interfaces

Each value in this table is an index into the constant pool. If a table value is nonzero (interfaces[i] != 0, where 0 <= i <interfaces_count), then constant_pool [interfaces[i]] must be an interface that this class implements.

fields_count

This field gives the number of instance variables, both static and dynamic, defined by this class. The fields table includes only those variables that are defined explicitly by this class. It does not include those instance variables that are accessible from this class but are inherited from superclasses.

fields

Each value in this table is a more complete description of a field in the class. See section 2.4 for more information on the field_info structure.

methods_count

This field indicates the number of methods, both static and dynamic, defined by this class. This table only includes those methods that are explicitly defined by this class. It does not include inherited methods.

methods

Each value in this table is a more complete description of a method in the class. See section 2.5 for more information on the method_info structure.

attributes_count

This field indicates the number of additional attributes about this class.

attributes

A class can have any number of optional attributes associated with it. Currently, the only class attribute recognized is the "SourceFile" attribute, which indicates the name of the source file from which this class file was compiled. See section 2.6 for more information on the attribute_info structure.

2.2 Signatures

A signature is a string representing a type of a method, field or array.

The field signature represents the value of an argument to a function or the value of a variable. It is a series of bytes generated by the following grammar:

```
<field_signature> ::= <field_type>
<field_type>      ::=<base_type>|<object_type>|
                     <array_type>
<base_type>       ::= B|C|D|F|I|J|S|Z
<object_type>     ::= L<fullclassname>;
<array_type>      ::=[<optional_size><field_type>
<optional_size>   ::= [0-9]
```

The meaning of the base types is as follows:

B          byte          signed byte

```
            C           char            character
            D           double          double
                                        precision IEEE
                                        float
            F           float           single
                                        precision IEEE
                                        float
            I           int             integer
            J           long            long integer
            L<fullclassname>;  ...      an object of
                                        the given
                                        class
            S           short           signed short
            Z           boolean         true or false
            [<field sig>   ...          array
```

A return-type signature represents the return value from a method. It is a series of bytes in the following grammar:

<return_signature>  ::= <field_type> | V

The character V indicates that the method returns no value. Otherwise, the signature indicates the type of the return value.

An argument signature represents an argument passed to a method:

<argument_signature>  ::= <field_type>

A method signature represents the arguments that the method expects, and the value that it returns.

```
<method_signature>    ::= (<arguments_signature>)
                          <return_signature>
<arguments_signature>    ::= <argument_signature>*
```

2.3 Constant Pool

Each item in the constant pool begins with a 1-byte tag:. The table below lists the valid tags and their values.

| Constant Type | Value |
|---|---|
| CONSTANT_Class | 7 |
| CONSTANT_Fieldref | 9 |
| CONSTANT_Methodref | 10 |
| CONSTANT_InterfaceMethodref | 11 |
| CONSTANT_String | 8 |
| CONSTANT_Integer | 3 |
| CONSTANT_Float | 4 |
| CONSTANT_Long | 5 |
| CONSTANT_Double | 6 |
| CONSTANT_NameAndType | 12 |
| CONSTANT_Utf8 | 1 |
| CONSTANT_Unicode | 2 |

Each tag byte is then followed by one or more bytes giving more information about the specific constant.

2.3.1   CONSTANT_Class

CONSTANT_Class is used to represent a class or an interface.

```
CONSTANT_Class_info {
    u1 tag;
    u2 name_index;
}
```
tag

The tag will have the value CONSTANT_Class name_index constant_pool[name_index] is a CONSTANT_Utf8
giving the string name of the class.
Because arrays are objects, the opcodes anewarray
and multianewarray can reference array "classes" via
CONSTANT_Class items in the constant pool. In this
case, the name of the class is its signature. For
example, the class name for
    int[][]
is
    [[I
The class name for
    Thread[]
is
    "[LJAVA.lang.Thread;"

2.3.2 CONSTANT_{Fieldref,Methodref, InterfaceMethodref}

Fields, methods, and interface methods are
represented by similar structures.

```
CONSTANT_Fieldref_info {
    u1 tag;
    u2 class_index;
    u2 name_and_type_index;
}
CONSTANT_Methodref_info {
    u1 tag;
    u2 class_index;
    u2 name_and_type_index;
}
CONSTANT_InterfaceMethodref_info {
    u1 tag;
    u2 class_index;
    u2 name_and_type_index;
}
``` tag

The tag will have the value CONSTANT_Fieldref,
CONSTANT_Methodref, or CONSTANT_InterfaceMethodref.

class_index constant_pool[class_index] will be an entry of type CONSTANT_Class giving the name of the class or interface containing the field or method.

For CONSTANT_Fieldref and CONSTANT_Methodref, the CONSTANT_Class item must be an actual class. For CONSTANT_InterfaceMethodref, the item must be an interface which purports to implement the given method.

name_and_type_index constant_pool [name_and_type_index] will be an entry of type CONSTANT_NameAndType. This constant pool entry indicates the name and signature of the field or method.

2.3.3 CONSTANT_String

CONSTANT_String is used to represent constant objects of the built-in type String.

```
CONSTANT_String_info {
    u1 tag;
    u2 string_index;
}
``` tag

The tag will have the value CONSTANT_String string_index constant_pool [string_index] is a CONSTANT_Utf8 string giving the value to which the String object is initialized.

2.3.4 CONSTANT_Integer and CONSTANT_Float

CONSTANT_Integer andCONSTANT_Float represent four-byte constants.

```
CONSTANT_Integer_info {
    u1 tag;
    u4 bytes;
}
CONSTANT_Float_info {
```

```
            u1 tag;
            u4 bytes;
        }
    tag
        The tag will have the value CONSTANT_Integer or
        CONSTANT_Float
    bytes
        For integers, the four bytes are the integer
        value. For floats, they are the IEEE 754 standard
        representation of the floating point value. These
        bytes are in network (high byte first) order.

2.3.5    CONSTANT_Long and CONSTANT_Double
        CONSTANT_Long andCONSTANT_Double represent
    eight-byte constants.
        CONSTANT_Long_info {
            u1 tag;
            u4 high_bytes;
            u4 low_bytes;
        }
        CONSTANT_Double_info {
            u1 tag;
            u4 high_bytes;
            u4 low_bytes;
        }
        All eight-byte constants take up two spots in the
    constant pool. If this is the n^th item in the constant
    pool, then the next item will be numbered n+2.
    tag
        The tag will have the value CONSTANT_Long or
        CONSTANT_Double.
    high_bytes, low_bytes
        For CONSTANT_Long, the 64-bit value is (high_bytes
    << 32) +low_bytes.
        For CONSTANT_Double, the 64-bit value,high_bytes
        and low_bytes together represent the standard IEEE 754
``` representation of the double-precision floating point number.

2.3.6 CONSTANT_NameAndType

CONSTANT_NameAndType is used to represent a field or method, without indicating which class it belongs to.

```
CONSTANT_NameAndType_info {
    u1 tag;
    u2 name_index;
    u2 signature_index;
}
```
tag

The tag will have the valueCONSTANT_NameAndType.

name_index constant_pool [name_index] is a CONSTANT_Utf8 string giving the name of the field or method.

signature_index constant_pool [signature_index] is a CONSTANT_Utf8 string giving the signature of the field or method.

2.3.7 CONSTANT_Utf8 and CONSTANT_Unicode

CONSTANT_Utf8 andCONSTANT_Unicode are used to represent constant string values.

CONSTANT_Utf8 strings are "encoded" so that strings containing only non-null ASCII characters, can be represented using only one byte per character, but characters of up to 16 bits can be represented:

All characters in the range 0x0001 to 0x007F are represented by a single byte:

```
+-+-+-+-+-+-+-+-+
|0|7bits of data|
+-+-+-+-+-+-+-+-+
```

The null character (0x0000) and characters in the range 0x0080 to 0x07FF are represented by a pair of two bytes:

```
+-+-+-+-+-+-+-+-+ +-+-+-+-+-+-+-+-+
|1|1|0| 5 bits | |1|0| 6 bits    |
+-+-+-+-+-+-+-+-+ +-+-+-+-+-+-+-+-+
```

Characters in the range 0x0800 to 0xFFFF are represented by three bytes:

```
+-+-+-+-+-+-+-+-+ +-+-+-+-+-+-+-+-+ +-+-+-+-+-+-+-+-+
|1|1|1|0|4 bits | |1|0| 6 bits    | |1|0| 6 bits    |
+-+-+-+-+-+-+-+-+ +-+-+-+-+-+-+-+-+ +-+-+-+-+-+-+-+-+
```

There are two differences between this format and the "standard" UTF-8 format. First, the null byte (0x00) is encoded in two-byte format rather than one-byte, so that our strings never have embedded nulls. Second, only the one-byte, two-byte, and three-byte formats are used. We do not recognize the longer formats.

```
CONSTANT_Utf8_info {
    u1 tag;
    u2 length;
    u1 bytes[length];
}
CONSTANT_Unicode_info {
    u1 tag;
    u2 length;
    u2 bytes [length];
}
``` tag

The tag will have the value CONSTANT_Utf8 or CONSTANT_Unicode.

length

The number of bytes in the string. These strings are not null terminated.

bytes

The actual bytes of the string.

2.4 Fields

The information for each field immediately follows the field_count field in the class file. Each field is described by a variable length field_info structure. The format of this structure is as follows:

```
field_info {
    u2 access_flags;
    u2 name_index;
    u2 signature_index;
    u2 attributes_count;
    attribute_info attributes[attribute_count];
}
``` access_flags

This is a set of sixteen flags used by classes, methods, and fields to describe various properties and how they many be accessed by methods in other classes. See the table "Access Flags" which indicates the meaning of the bits in this field.

The possible fields that can be set for a field are ACC_PUBLIC, ACC_PRIVATE, ACC_PROTECTED, ACC_STATIC, ACC_FINAL, ACC_VOLATILE, and ACC_TRANSIENT.

At most one of ACC_PUBLIC, ACC_PROTECTED, and ACC_PRIVATE can be set for any method.

name_index constant_pool [name_index] is a CONSTANT_Utf8 string which is the name of the field.

signature_index constant_pool [signature_index] is a CONSTANT_Utf8 string which is the signature of the field. See the section "Signatures" for more information on signatures.

attributes_count

This value indicates the number of additional attributes about this field.

attributes

A field can have any number of optional attributes associated with it. Currently, the only field attribute recognized is the "ConstantValue" attribute, which indicates that this field is a static numeric constant, and indicates the constant value of that field.

Any other attributes are skipped.

2.5 Methods

The information for each method immediately follows the method_count field in the class file. Each method is described by a variable length method_info structure. The structure has the following format:

```
method_info {
    u2 access_flags;
    u2 name_index;
    u2 signature_index;
    u2 attributes_count;
    attribute_info attributes [attribute_count];
}
``` access_flags

This is a set of sixteen flags used by classes, methods, and fields to describe various properties and how they many be accessed by methods in other classes. See the table "Access Flags" which gives the various bits in this field.

The possible fields that can be set for a method are ACC_PUBLIC, ACC_PRIVATE, ACC_PROTECTED, ACC_STATIC, ACC_FINAL, ACC_SYNCHRONIZED, ACC_NATIVE, and ACC_ABSTRACT.

At most one of ACC_PUBLIC, ACC_PROTECTED, and ACC_PRIVATE can be set for any method.

name_index constant_pool[name_index] is a CONSTANT_Utf8 string giving the name of the method.

signature_index constant_pool [signature_index] is a CONSTANT_Utf8 string giving the signature of the field. See the section "Signatures" for more information on signatures.

attributes_count

This value indicates the number of additional attributes about this field.

attributes

A field can have any number of optional attributes associated with it. Each attribute has a name, and other additional information. Currently, the only field attributes recognized are the "Code" and "Exceptions" attributes, which describe the bytecodes that are executed to perform this method, and the JAVA Exceptions which are declared to result from the execution of the method, respectively.

Any other attributes are skipped.

2.6 Attributes

Attributes are used at several different places in the class format. All attributes have the following format:

```
GenericAttribute_info {
    u2 attribute_name;
    u4 attribute_length;
    u1 info[attribute_length];
}
```

The attribute_name is a 16-bit index into the class's constant pool; the value of constant_pool [attribute_name] is a CONSTANT_Utf8 string giving the name of the attribute. The field attribute_length indicates the length of the subsequent information in bytes. This length does not include the six bytes of the attribute_name and attribute_length.

In the following text, whenever we allow attributes, we give the name of the attributes that are currently understood. In the future, more attributes will be added. Class file readers are expected to skip over and ignore the information in any attribute they
do not understand.

2.6.1  SourceFile
The "SourceFile" attribute has the following
format:
```
SourceFile_attribute {
    u2 attribute_name_index;
    u4 attribute_length;
    u2 sourcefile_index;
}
```
attribute_name_index
   constant_pool [attribute_name_index] is the
CONSTANT_Utf8 string "SourceFile".
attribute_length
   The length of a SourceFile_attribute must be 2.
sourcefile_index
   constant_pool [sourcefile_index] is a
CONSTANT_Utf8 string giving the source file from which
this class file was compiled.

2.6.2  ConstantValue
The "ConstantValue" attribute has the following
format:
```
ConstantValue_attribute {
    u2 attribute_name_index;
    u4 attribute_length;
    u2 constantvalue_index;
}
```
attribute_name_index
   constant_pool [attribute_name_index] is the
CONSTANT_Utf8 string "ConstantValue".
attribute_length
   The length of a ConstantValue_attribute must be 2.
constantvalue_index constant_pool [constantvalue_index] gives the constant value for this field.

The constant pool entry must be of a type appropriate to the field, as shown by the following table:

| long | CONSTANT_Long |
|------|---------------|
| float | CONSTANT_Float |
| double | CONSTANT_Double |
| int, short, char, byte, boolean | CONSTANT_Integer |

2.6.3 Code

The "Code" attribute has the following format:
```
Code_attribute {
        u2 attribute_name_index;
        u4 attribute_length;
        u2 max_stack;
        u2 max_locals;
        u4 code_length;
        u1 code[code_length];
        u2 exception_table_length;
        {   u2   start_pc;
            u2   end_pc;
            u2   handler_pc;
            u2   catch_type;
        } exception_table[exception_table_length];
        u2 attributes_count;
        attribute_info attributes [attribute_count];
}
``` attribute_name_index constant_pool [attribute_name_index] is the CONSTANT_Utf8 string "Code".

attribute_length

This field indicates the total length of the "Code" attribute, excluding the initial six bytes.

max_stack

Maximum number of entries on the operand stack that will be used during execution of this method. See the other chapters in this spec for more information on the operand stack.

max_locals

Number of local variable slots used by this method. See the other chapters in this spec for more information on the local variables.

code_length

The number of bytes in the virtual machine code for this method.

code

These are the actual bytes of the virtual machine code that implement the method. When read into memory, if the first byte of code is aligned onto a multiple-of-four boundary the tableswitch and tablelookup opcode entries will be aligned; see their description for more information on alignment requirements.

exception_table_length

The number of entries in the following exception table.

exception_table

Each entry in the exception table describes one exception handler in the code.

start_pc, end_pc

The two fieldsstart_pc and end_pc indicate the ranges in the code at which the exception handler is active. The values of both fields are offsets from the start of the code.start_pc is inclusive.end_pc is exclusive.

handler_pc

This field indicates the starting address of the exception handler. The value of the field is an offset from the start of the code.

catch_type

If catch_type is nonzero, then constant_pool [catch_type] will be the class of exceptions that this exception handler is designated to catch. This exception handler should only be called if the thrown exception is an instance of the given class.

If catch_type is zero, this exception handler should be called for all exceptions.

attributes_count

This field indicates the number of additional attributes about code. The "Code" attribute can itself have attributes.

attributes

A "Code" attribute can have any number of optional attributes associated with it. Each attribute has a name, and other additional information. Currently, the only code attributes
defined are the "LineNumberTable" and "LocalVariableTable," both of which contain debugging information.

2.6.4 Exceptions Table

This table is used by compilers which indicate which Exceptions a method is declared to throw:

```
Exceptions_attribute {
    u2 attribute_name_index;
    u4 attribute_length;
    u2 number_of_exceptions;
    u2 exception_index_table [number_of_ex-
    ceptions];
}
``` attribute_name_index constant_pool [attribute_name_index] will be the CONSTANT_Utf8 string "Exceptions".

attribute_length

This field indicates the total length of the Exceptions_attribute, excluding the initial six bytes.

number_of_exceptions

This field indicates the number of entries in the following exception index table.

exception_index_table

Each value in this table is an index into the constant pool. For each table element (exception_index_table [i] != 0, where 0 <= i <number_of_exceptions), then constant_pool [exception_index+table [i]] is a Exception that this class is declared to throw.

2.6.5 LineNumberTable

This attribute is used by debuggers and the exception handler to determine which part of the virtual machine code corresponds to a given location in the source. The LineNumberTable_attribute has the following format:

```
LineNumberTable_attribute {
    u2        attribute_name_index;
    u4        attribute_length;
    u2        line_number_table_length;
    { u2      start_pc;
      u2          line_number;
    }         line_number_table[line_
              number_table_length];
}
``` attribute_name_index constant_pool [attribute_name_index] will be the CONSTANT_Utf8 string "LineNumberTable".

attribute_length

This field indicates the total length of the LineNumberTable_attribute, excluding the initial six bytes.

line_number_table_length

This field indicates the number of entries in the following line number table.

line_number_table

Each entry in the line number table indicates that the line number in the source file changes at a given point in the code.

start_pc

This field indicates the place in the code at which the code for a new line in the source begins. source_pc <<SHOULD THAT BEstart_pc?>> is an offset from the beginning of the code.

line_number

The line number that begins at the given location in the file.

2.6.6 LocalVariableTable

This attribute is used by debuggers to determine the value of a given local variable during the dynamic execution of a method. The format of the LocalVariableTable_attribute is as follows:

```
LocalVariableTable_attribute {
    u2  attribute_name_index;
    u4  attribute_length;
    u2  local_variable_table_length;
    {   u2  start_pc;
        u2  length;
        u2  name_index;
        u2  signature_index;
        u2  slot;
    }   local_variable_table[local_
        variable_table_length];
}
``` attribute_name_index constant_pool [attribute_name_index] will be the CONSTANT_Utf8 string "LocalVariableTable".

attribute_length

This field indicates the total length of the LineNumberTable_attribute, excluding the initial six bytes.

local_variable_table_length

This field indicates the number of entries in the following local variable table.

local_variable_table

Each entry in the local variable table indicates a code range during which a local variable has a value. It also indicates where on the stack the value of that variable can be found.

start_pc, length

The given local variable will have a value at the code between start_pc andstart_pc + length. The two values are both offsets from the beginning of the code.

name_index, signature_index constant_pool[name_index] and constant_pool[signature_index] are CONSTANT_Utf8 strings giving the name and signature of the local variable.

slot

The given variable will be the slot$^{th}$ local variable in the method's frame.

3. The Virtual Machine Instruction Set
3.1 Format for the Instructions

JAVA Virtual Machine instructions are represented in this document by an entry of the following form.

instruction name

Short description of the instruction

Syntax:

| opcode=number |
|---|
| operand1 |
| operand2 |
| ... |

Stack: ...., value1, value2 ⇒ ..., value3

A longer description that explains the functions of the instruction and indicates any exceptions that might be thrown during execution.

Each line in the syntax table represents a single 8-bit byte.

Operations of the JAVA Virtual Machine most often take their operands from the stack and put their results back on the stack. As a convention, the descriptions do not usually mention when the stack is the source or destination of an operation, but will always mention when it is not. For instance, instruction iload has the short description "Load integer from local variable." Implicitly, the integer is loaded onto the stack. Instruction iadd is described as "Integer add"; both its source and destination are the stack.

Instructions that do not affect the control flow of a computation may be assumed to always advance the virtual machine program counter to the opcode of the following instruction. Only instructions that do affect control flow will explicitly mention the effect they have on the program counter.

3.2 Pushing Constants onto the Stack bipush

Push one-byte signed integer
Syntax:

| bipush=16 |
|-----------|
| byte1     |

Stack: ...=> ..., value byte1 is interpreted as a signed 8-bitvalue. This value is expanded to an integer and pushed onto the operand stack.

-97- sipush
   Push two-byte signed integer
   Syntax:

| sipush=17 |
   |-----------|
   | byte1     |
   | byte2     |

Stack:   ...=> ..., item
   byte1 and byte2 are assembled into a signed 16-bit
   value. This value is expanded to an integer and pushed
   onto the operand stack.

ldc1
   Push item from constant pool
   Syntax:

| ldc1=18    |
   |------------|
   | indexbyte1 |

Stack:   ...=> ..., item
   indexbyte1 is used as an unsigned 8-bit index into
   the constant pool of the current class. The item at
   that index is resolved and pushed onto the stack. If a
   String is being pushed and there isn't enough memory to
   allocate space for it then an OutOfMemoryError is
   thrown.
   Note: A String push results in a reference to an
   object.

ldc2
   Push item from constant pool
   Syntax:

| ldc2=19    |
   |------------|
   | indexbyte1 |
   | indexbyte2 |

Stack:   ...=> ..., item indexbyte1 and indexbyte2 are used to construct an unsigned 16-bit index into the constant pool of the current class. The item at that index is resolved and pushed onto the stack. If a String is being pushed and there isn't enough memory to allocate space for it then an OutOfMemoryError is thrown.

Note: A String push results in a reference to an object.

ldc2w

Push long or double from constant pool

Syntax:

| ldc2w=20 |
| --- |
| indexbyte1 |
| indexbyte2 |

Stack:   ...=> ..., constant-word1, constant-word2 indexbyte1 and indexbyte2 are used to construct an unsigned 16-bit index into the constant pool of the current class. The two-word constant that index is resolved and pushed onto the stack.

aconst_null

Push null object reference

Syntax:

| aconst_null=1 |
| --- |

Stack:   ...=> ...,null

Push the null object reference onto the stack.

iconst_m1

Push integer constant -1

Syntax:

| iconst_m1=2 |
| --- |

Stack:   ...=> ..., 1

Push the integer -1 onto the stack.

```
    iconst_<n>
        Push integer constant
        Syntax:
                    ┌─────────────┐
                    │ iconst_,<n> │
                    └─────────────┘
5
        Stack:   ...=> ..., <n>
        Forms: iconst_0 = 3, iconst_1 = 4, iconst_2 = 5,
    iconst_3 = 6, iconst_4 = 7, iconst_5 = 8
        Push the integer <n> onto the stack.
    lconst_<l>
        Push long integer constant
        Syntax:
                    ┌─────────────┐
                    │ lconst_<l>  │
                    └─────────────┘
        Stack:   ...=> ..., <l>-word1, <l>-word2
        Forms: lconst_0 = 9, lconst_1 = 10
        Push the long integer <l> onto the stack.

    fconst_<f>
        Push single float
        Syntax:
                    ┌─────────────┐
                    │ fconst_<f>  │
                    └─────────────┘
25      Stack:   ...=> ..., <f>
        Forms: fconst_0 = 11, fconst_1 = 12, fconst_2 = 13
        Push the single-precision floating point number
    <f> onto the stack.

    dconst_<d>
        Push double float
        Syntax:
                    ┌─────────────┐
                    │ dconst_<d>  │
                    └─────────────┘
        Stack:   ...=> ..., <d>-word1, <d>-word2
        Forms: dconst_0 = 14, dconst_1 = 15
```

Push the double-precision floating point number
<d> onto the stack.

3.3 Loading Local Variables Onto the Stack lload

Load integer from local variable
Syntax:

| iload=21 |
|----------|
| vindex   |

Stack:   ...=> ..., value

The value of the local variable at vindex in the current JAVA frame is pushed onto the operand stack.

iload_<n>

Load integer from local variable
Syntax:

| iload_<n> |
|-----------|

Stack:   ...=> ..., value

Forms:   iload_0 = 26, iload_1 = 27, iload_2 = 28, iload_3 = 29

The value of the local variable at <n> in the current JAVA frame is pushed onto the operand stack.

This instruction is the same as iload with a vindex of <n>, except that the operand <n> is implicit.

iload

Load long integer from local variable
Syntax:

| iload = 22 |
|------------|
| vindex     |

Stack:   ... => ..., value-word1, value-work2

The value of the local variables at vindex and vindex+1 in the current JAVA frame is pushed onto the operand stack.

lload_<n>
   Load long integer from local variable
   Syntax:
   | iload_<n> |

Stack:  ...=> ..., value-word1, value-word2
   Forms: lload_0 = 30, lload_1 = 31, lload_2 = 32, lload_3 = 33
   The value of the local variables at <n> and <n>+1 in the current JAVA frame is pushed onto the operand stack.
   This instruction is the same as lload with a vindex of <n>, except that the operand <n> is implicit.

fload
   Load single float from local variable
   Syntax:
   | fload = 23 |
   | vindex |

Stack:  ...=> ..., value
   The value of the local variable at vindex in the current JAVA frame is pushed onto the opera and stack.

fload_<n>
   Load single float from local variable
   Syntax:
   | fload_<n> |

Stack:  ...=> ...,value
   Forms: fload_0 = 34, fload_1 = 35, fload_2 = 36, fload_3 = 37

The value of the local variable at <n> in the
current JAVA frame is pushed onto the operand stack.
This instruction is the same as fload with a
vindex of <n>, except that the operand <n> is implicit.

dload

Load double float from local variable
Syntax:

| dload = 24 |
|---|
| vindex |

Stack:   ...=> ..., value-word1, value-word2

The value of the local variables at vindex and
vindex+1 in the current JAVA frame is pushed onto the
operand stack.

dload_<n>

Load double float from local variable
Syntax:

| dload_<n> |
|---|

Stack:   ...=> ..., value-word1, value-word2
Forms:   dload_0 = 38, dload_1 = 39, dload_2 = 40,
dload_3 = 41

The value of the local variables at <n> and <n>+1
in the current JAVA frame is pushed onto the operand
stack.

This instruction is the same as dload with a
vindex of <n>, except that the operand <n> is implicit.

aload

Load object reference from local variable
Syntax:

| aload = 25 |
|---|
| vindex |

Stack:   ...=> ..., value

-103-

The value of the local variable at vindex in the current JAVA frame is pushed onto the operand stack.

aload_<n>
Load object reference from local variable
Syntax:
| aload_<n> |

Stack: ...=> ..., value
Forms: aload_0 = 42, aload_1 = 43, aload_2 = 44, aload_3 = 45

The value of the local variable at <n> in the current JAVA frame is pushed onto the operand stack.

This instruction is the same as aload with a vindex of <n>, except that the operand <n> is implicit.

3.4 Storing Stack Values into Local Variables istore
Store integer into local variable
Syntax:
| istore = 54 |
| vindex |

Stack: ..., value => ...
value must be an integer. Local variable vindex in the current JAVA frame is set to value.

istore_<n>
Store integer into local variable
Syntax:
| istore_<n> |

Stack: ..., value => ...
Forms: istore_0 = 59, istore_1 = 60, istore_2 = 61, istore_3 = 62 value must be an integer. Local variable <n> in the current JAVA frame is set to value.
This instruction is the same as istore with a vindex of <n>, except that the operand <n> is implicit.

lstore
Store long integer into local variable
Syntax:

| lstore = 55 |
| vindex |

Stack:   ..., value-word1, value-word2 => ...
value must be a long integer. Local variables vindex+1 in the current JAVA frame are set to value.

lstore_<n>
Store long integer into local variable
Syntax:

| lstore_<n> |

Stack:   ..., value-word1, value-word2 =>
Forms:  lstore_0 = 63, lstore_1 = 64, lstore_2 = 65, lstore_3 = 66
value must be a long integer. Local variables <n> and <n>+1 in the current JAVA frame are set to value.
This instruction is the same as lstore with a vindex of <n>, except that the operand <n> is implicit.

fstore
Store single float into local variable
Syntax:

| fstore =56 |
| vindex |

Stack:   ..., value => ...

value must be a single-precision floating point
number. Local variable vindex in the current JAVA
frame is set to value.

    fstore_<n>
    Store single float into local variable
    Syntax:

| fstore_<n> |

    Stack:  ..., value => ...
    Forms:  fstore_0 = 67, fstore_1 = 68, fstore_2 =
    69, fstore_3 = 70
    value must be a single-precision floating point
    number. Local variable <n> in the current JAVA frame
    is set to value.
    This instruction is the same as fstore with a
    vindex of <n>, except that the operand <n> is implicit.

dstore
    Store double float into local variable
    Syntax:

| dstore = 57 |
    | vindex |

    Stack:  ..., value-word1, value-word2 => ...
    value must be a double-precision floating point
    number. Local variables vindex and vindex+1 in the
    current JAVA frame are set to value.

    dstore_<n>
    Store double float into local variable
    Syntax:

| dstore_<n> |

    Stack:  ..., value-word1, value-word2 => ...
    Forms:  dstore_0 = 71, dstore_1 = 72, dstore_2 =
    73, dstore_3 = 74 value must be a double-precision floating point
number. Local variables <n> and <n>+1 in the current
JAVA frame are set to value.
This instruction is the same as dstore with a
vindex of <n>, except that the operand <n> is implicit.
astore
Store object reference into local variable
Syntax:

| astore = 58 |
|---|
| vindex |

Stack: ..., value => ...
value must be a return address or a reference to
an object. Local variable vindex in the current JAVA
frame is set to value.

astore_<n>
Store object reference into local variable
Syntax:

| astore_<n> |
|---|

Stack: ..., value => ...
Forms: astore_0 = 75, astore_1 = 76, astore_2 = 77, astore_3 = 78
value must be a return address or a reference to
an object. Local variable <n> in the current JAVA
frame is set to value.
This instruction is the same as astore with a
vindex of <n>, except that the operand <n> is implicit.

iinc
Increment local variable by constant

Syntax:

| iinc = 132 |
|---|
| vindex |

-107-

| const |
|---|

Stack: no change

Local variable vindex in the current JAVA frame must contain an integer. Its value is incremented by the value const, where const is treated as a signed 8-bit quantity.

3.5 Wider index for Loading, Storing and Incrementing wide

Wider index for accessing local variables in load, store and increment.

Syntax:

| wide = 196 |
|---|
| vindex2 |

Stack: no change

This bytecode must precede one of the following bytecodes: iload, lload, fload, dload, aload, istore, lstore, fstore, dstore, astore, iinc. The vindex of the following bytecode and vindex2 from this bytecode are assembled into an unsigned 16-bit index to a local variable in the current JAVA frame. The following bytecode operates as normal except for the use of this wider index.

3.6 Managing Arrays newarray

Allocate new array

Syntax:

| newarray = 188 |
|---|
| atype |

Stack: ..., size => result

-108- size must be an integer. It represents the number of elements in the new array.

atype is an internal code that indicates the type of array to allocate. Possible values for atype are as follows:

|         |    |
|---------|----|
| T_BOOLEAN | 4  |
| T_CHAR    | 5  |
| T_FLOAT   | 6  |
| T_DOUBLE  | 7  |
| T_BYTE    | 8  |
| T_SHORT   | 9  |
| T_INT     | 10 |
| T_LONG    | 11 |

A new array of atype, capable of holding size elements, is allocated, and result is a reference to this new object. Allocation of an array large enough to contain size items of atype is attempted. All elements of the array are initialized to zero.

If size is less than zero, a NegativeArraySizeException is thrown. If there is not enough memory to allocate the array, anOutOfMemoryError is thrown.

anewarray

Allocate new array of references to objects
Syntax:

| anewarray = 189 |
|-----------------|
| indexbyte1      |
| indexbyte2      |

Stack: ..., size => result size must be an integer. It represents the number of elements in the new array.

indexbyte1 and indexbyte2 are used to construct an index into the constant pool of the current class. The item at that index is resolved.  The resulting entry
must be a class.
   A new array of the indicated class type and
capable of holding size elements is allocated, and
result is a reference to this new object.  Allocation
of an array large enough to contain size items of the
given class type is attempted.  All elements of the
array are initialized to null.
   If size is less than zero, a
NegativeArraySizeException is thrown.  If there is not
enough memory to allocate the array, an
OutOfMemoryError is thrown.
   anewarray is used to create a single dimension of
an array of object references.  For example, to create
        new Thread[7]
    the following code is used:
        bipush 7
        anewarray <Class "JAVA.lang.Thread">
    anewarray can also be used to create the first
dimension of a multi-dimensional array.  For example,
the following array declaration:
        new int[6][]
    is created with the following code:
        bipush 6
        anewarray <Class "[I">
   See CONSTANT_Class in the "Class File Format"
chapter for information on array class names.

multianewarray
   Allocate new multi-dimensional array
   Syntax:

| multianewarray = 197 |
| --- |
| indexbyte1 |
| indexbyte2 |
| dimensions |

-110-

Stack: ..., size1 size2...sizen => result

Each size must be an integer. Each represents the number of elements in a dimension of the array.

indexbyte1 and indexbyte2 are used to construct an index into the constant pool of the current class. The item at that index is resolved. The resulting entry must be an array class of one or more dimensions.

dimensions has the following aspects:

It must be an integer ≥ 1.

It represents the number of dimensions being created. It must be ≤ the number of dimensions of the array class.

It represents the number of elements that are popped off the stack. All must be integers greater than or equal to zero.

These are used as the sizes of the dimension. For example, to create new int[6][3][]

the following code is used:

bipush 6
    bipush 3
    multianewarray <Class "[[[I"> 2

If any of the size arguments on the stack is less than zero, a NegativeArraySizeException is thrown. If there is not enough memory to allocate the array, an OutOfMemoryError is thrown.

The result is a reference to the new array object.

Note: It is more efficient to use newarray or anewarray when creating a single dimension.

See CONSTANT_Class in the "Class File Format" chapter for information on array class names.

arraylength

Get length of array

Syntax:

| arraylength = 190 |

-111-

Stack: ..., objectref => ..., length objectref must be a reference to an array object. The length of the array is determined and replaces objectref on the top of the stack.

If the objectref is null, a NullPointerException is thrown.

iaload

Load integer from array

Syntax:

| iaload = 46 |

Stack: ..., arrayref, index => ..., value arrayref must be a reference to an array of integers. index must be an integer. The integer value at position number index in the array is retrieved and pushed onto the top of the stack.

If arrayref is null a NullPointerException is thrown. If index is not within the bounds of the array an ArrayIndexOutOfBoundsException is thrown.

laload

Load long integer from array

Syntax:

| laoad = 47 |

Stack: ..., arrayref, index => ..., value-word1, value-word2 arrayref must be a reference to an array of long integers. index must be an integer. The long integer value at position number index in the array is retrieved and pushed onto the top of the stack.

If arrayref is null a NullPointerException is thrown. If index is not within the bounds of the array an ArrayIndexOutOfBoundsException is thrown.

faload

Load single float from array
Syntax:

| faload = 48 |

       Stack:   ..., arrayref, index => ..., value
       arrayref must be a reference to an array of
single-precision floating point numbers. index must be
an integer. The single-precision floating point number
value at position number index in the array is
    retrieved and pushed onto the top of the stack.
       If arrayref is null a NullPointerException is
thrown. If index is not within the bounds of the array
an ArrayIndexOutOfBoundsException is thrown.

    daload
       Load double float from array
       Syntax:

| daload = 49 |

Stack:   ..., arrayref, index => ..., **value-word1,
value-word2**
       arrayref must be a reference to an array of
double-precision floating point numbers. index must be
an integer. The double-precision floating point number
25  value at position number index in the array is
retrieved and pushed onto the top of the stack.
       If arrayref is null a NullPointerException is
thrown. If index is not within the bounds of the array
an ArrayIndexOutOfBoundsException is thrown.
    aaload
       Load object reference from array
       Syntax:

| aaload = 50 |

       Stack:   ..., arrayref, index => ..., value

-113- arrayref must be a reference to an array of references to objects. index must be an integer. The object reference at position number index in the array is retrieved and pushed onto the top of the stack.

If arrayref is null a NullPointerException is thrown. If index is not within the bounds of the array an ArrayIndexOutOfBoundsException is thrown.

baload

Load signed byte from array.
Syntax:

> baload = 51

Stack: ..., arrayref, index => ..., value arrayref must be a reference to an array of signed bytes. index must be an integer. The signed byte value at position number index in the array is retrieved, expanded to an integer, and pushed onto the top of the stack.

If arrayref is null a NullPointerException is thrown. If index is not within the bounds of the array an ArrayIndexOutOfBoundsException is thrown.

caload

Load character from array
Syntax:

> caload = 52

Stack: ..., arrayref, index => ...,value arrayref must be a reference to an array of characters. index must be an integer. The character value at position number index in the array is retrieved, zero-extended to an integer, and pushed onto the top of the stack.

If arrayref is null a NullPointerException is thrown. If index is not within the bounds of the array an ArrayIndexOutOfBoundsException is thrown.

saload
> Load short from array
> Syntax:
> > saload = 53

Stack: ..., arrayref, index => ..., value
arrayref must be a reference to an array of short integers. index must be an integer. The ;signed short integer value at position number index in the array is retrieved, expanded to an integer, and pushed onto the top of the stack.

If arrayref is null, a NullPointerException is thrown. If index is not within the bounds of the array an ArrayIndexOutOfBoundsException is thrown.

iastore
> Store into integer array
> Syntax:
> > iastore = 79

Stack: ..., arrayref, index, value => ...
arrayref must be a reference to an array of integers, index must be an integer, and value an integer. The integer value is stored at position index in the array.

If arrayref is null, a NullPointerException is thrown. If index is not within the bounds of the array an ArrayIndexOutOfBoundsException is thrown.

lastore
> Store into long integer array
> Syntax:
> > lastore = 80

Stack: ..., arrayref, index, value-word1, value-word2 => ...

arrayref must be a reference to an array of long integers, index must be an integer, and value a long integer. The long integer value is stored at position index in the array.

If arrayref is null, a NullPointerException is thrown. If index is not within the bounds of the array, an ArrayIndexOutOfBoundsException is thrown.

fastore

Store into single float array
Syntax:

| fastore = 81 |

Stack: ..., arrayref, index, value => ...

arrayref must be an array of single-precision floating point numbers, index must be an integer, and value a single-precision floating point number. The single float value is stored at position index in the array.

If arrayref is null, a NullPointerException is thrown. If index is not within the bounds of the array an ArrayIndexOutOfBoundsException is thrown.

dastore

Store into double float array
Syntax:

| dastore = 82 |

Stack: ..., arrayref, index, value-word1, value-word2 => ...

arrayref must be a reference to an array of double-precision floating point numbers, index must be an integer, and value a double-precision floating point number. The double float value is stored at position index in the array.

If arrayref is null, a NullPointerException is thrown. If index is not within the bounds of the array an ArrayIndexOutOfBoundsException is thrown.

aastore
   Store into object reference array
   Syntax:

| aastore = 83 |

Stack:   ..., arrayref, index, value => ...
   arrayref must be a reference to an array of references to objects, index must be an integer, and value a reference to an object. The object reference value is stored at position index in the array.
   If arrayref is null, a NullPointerException is thrown. If index is not within the bounds of the array, an ArrayIndexOutOfBoundsException is thrown.
   The actual type of value must be conformable with the actual type of the elements of the array. For example, it is legal to store an instance of class Thread in an array of class Object, but not vice versa. An ArrayStoreException is thrown if an attempt is made to store an incompatible object reference.

bastore
   Store into signed byte array
   Syntax:

| bastore = 84 |

Stack:   ..., arrayref, index, value => ...
   arrayref must be a reference to an array of signed bytes, index must be an integer, and value an integer. The integer value is stored at position index in the array. If value is too large to be a signed byte, it is truncated.

If arrayref is null, a NullPointerException is thrown. If index is not within the bounds of the array an ArrayIndexOutOfBoundsException is thrown.

castore
   Store into character array
   Syntax:

| castore = 85 |

Stack:   ..., arrayref, index, value => ...
   arrayref must be an array of characters, index must be an integer, and value an integer. The integer value is stored at position index in the array. If value is too large to be a character, it is truncated.
   If arrayref is null, a NullPointerException is thrown. If index is not within the bounds of [the array an ArrayIndexOutOfBoundsException is thrown.

sastore
   Store into short array
   Syntax:

| sastore = 86 |

Stack:   ..., array, index, value => ...
   arrayref must be an array of shorts, index must be an integer, and value an integer. The integer value is stored at position index in the array. If value is too large to be an short, it is truncated.
   If arrayref is null, a NullPointerException is thrown. If index is not within the bounds of the array an ArrayIndexOutOfBoundsException is thrown.

3.7 Stack Instructions nop
   Do nothing
   Syntax:

```
        nop = 0

Stack:  no change
    Do nothing.

pop
    Pop top stack word
    Syntax:
        pop = 87

Stack:   ..., any => ...
    Pop the top word from the stack.

pop2
    Pop top two stack words
    Syntax:
        pop2 = 89

Stack:   ..., any2, any1 => ...
    Pop the top two words from the stack.

dup
    Duplicate top stack word
    Syntax:
        dup = 89

Stack:   ..., any => ..., any,any
    Duplicate the top word on the stack.

dup2
    Duplicate top two stack words
    Syntax:
        dup2 = 92

Stack:..., any2,any1 => ..., any2, any1,any2, any1
    Duplicate the top two words on the stack.
``` dup_x1
   Duplicate top stack word and put two down

Syntax:

| dup_x1 = 90 |

Stack: ..., any2, any1 =>..., any1, any2, any1
   Duplicate the top word on the stack and insert the copy two words down in the stack.

dup2_x1
   Duplicate top two stack words and put two down
   Syntax:

| dup_x1 = 93 |

Stack: ..., any3, any2, any1 => ..., any2, any1, any3, any2, any1
   Duplicate the top two words on the stack and insert the copies two words down in the stack.

dup_x2
   Duplicate top stack word and put three down
   Syntax:

| dup_x2 = 91 |

Stack: ..., any3, any2, any1 => ..., any1, any3, any2, any1
   Duplicate the top word on the stack and insert the copy three words down in the stack.

dup2_x2
   Duplicate top two stack words and put three down
   Syntax:

| dup2_x2 = 94 |

Stack: ..., any4, any3, any2, any1 => ..., any2, any1, any4, any3, any2, any1

Duplicate the top two words on the stack and insert the copies three words down in the stack.

swap
Swap top two stack words
Syntax:

> swap = 95

Stack: ..., any2, any1 => ..., any2, any1
Swap the top two elements on the stack.

3.8 Arithmetic Instructions iadd
Integer add
Syntax:

> iadd = 96

Stack: ..., value1, value2 => ..., result
value1 and value 2 must be integers. The values are added and are replaced on the stack by their integer sum.

ladd
Long integer add
Syntax:

> ladd = 97

Stack: ..., value1-word1, value1-word2, value2-word1, value2-word2 => ..., result-word1, result-word2
value1 and value 2 must be long integers. The values are added and are replaced on the stack by their long integer sum.

fadd

-121-

Single floats add
Syntax:

| fadd = 98 |

        Stack:   ..., value1, value2 => ..., result
        value1 and value 2 must be single-precision
floating point numbers.  The values are added and are
replaced on the stack by their single-precision
floating point sum.
dadd
        Double floats add Syntax:
        | dadd = 99 |

Stack:   ..., **value1-word1, value1-word2,
value2-word1, value2-word2 => ..., result-word1,
result-word2**
value1 and value 2 must be double-precision
floating point numbers.  The values are added and are
replaced on the stack by their double-precision
floating point sum.

    isub
        Integer subtract
        Syntax:
        | isub = 100 |

        Stack:   ..., value1, value2 => ..., result
        value1 and value 2 must be integers.  value2 is
subtracted from value1, and both values are replaced on
the stack by their integer difference.

    lsub
        Long integer subtract
        Syntax:

> lsub = 101

Stack: ..., value1-word1, value1-word2, value2-word1, value2-word2 => ..., result-word1, result-word2 value1 and value 2 must be long integers. value2 is subtracted from value1, and both values are replaced on the stack by their long integer difference.

fsub

Single float subtract
Syntax:

> fsub = 102

Stack: ..., value1, value2 => ..., result value1 and value 2 must be single-precision floating point numbers. value2 is subtracted from value1, and both values are replaced on the stack by their single-precision floating point difference.

dsub

Double float subtract
Syntax:

> dsub = 103

Stack: ..., value1-word1, value1-word2, value2-word1, value2-word2 => ..., result-word1, result-word2 value1 and value 2 must be double-precision floating point numbers. value2 is subtracted from value1, and both values are replaced on the stack by their double-precision floating point difference.

imul

Integer multiply
Syntax:

> imul = 104

-123-

Stack:   ..., value1, value2 => ..., result
value1 and value 2 must be integers.  Both values are replaced on the stack by their integer product.

lmul
   Long integer multiply
   Syntax:
   ```
   imul = 105
   ```

Stack:   ..., value1-word1, value1-word2, value2-word1, value2-word2 => ..., result-word1, result-word2
   value1 and value 2 must be long integers.  Both values are replaced on the stack by their long integer product.

fmul
   Single float multiply
   Syntax:
   ```
   fmul = 106
   ```

Stack:   ..., value1, value2 => ..., result
   value1 and value 2 must be single-precision floating point numbers.  Both values are replaced on the stack by their single-precision floating point product.

dmul
   Double float multiply
   Syntax:
   ```
   dmul = 107
   ```

Stack:   ..., value1-word1, value1-word2, value2-word1, value2-word2 => ..., result-word1, result-word2
   value1 and value 2 must be double-precision floating point numbers.  Both values are replaced on the stack by their double-precision floating point
product.

idiv
Integer divide
Syntax:

> idiv = 108

Stack: ..., value1, value2 => ..., result
value1 and value 2 must be integers. value1 is
divided by value2, and both values are replaced on the
stack by their integer quotient.

The result is truncated to the nearest integer
that is between it and 0. An attempt to divide by zero
results in a "/ by zero" ArithmeticException being
thrown.

ldiv
Long integer divide
Syntax:

> ldiv = 109

Stack: ..., **value1-word1, value1-word2,
value2-word1, value2-word2 => ..., result-word1,
result-word2**
value1 and value 2 must be long integers. value1
is divided by value2, and both values are replaced on
the stack by their long integer quotient.

The result is truncated to the nearest integer
that is between it and 0. An attempt to divide by zero
results in a "/ by zero" ArithmeticException being
thrown.

fdiv
Single float divide
Syntax:

> fdiv = 110

-125-

Stack: ..., value1, value2 => ..., result value1 and value 2 must be single-precision floating point numbers. value1 is divided by value2, and both values are replaced on the stack by their
single-precision floating point quotient.

Divide by zero results in the quotient being NaN.

ddiv

Double float divide

Syntax:

> ddiv = 111

Stack: ..., value1-word1, value1-word2, value2-word1, value2-word2 => ..., result-word1,
result-word2 value1 and value 2 must be double-precision floating point numbers. value1 is divided by value2, and both values are replaced on the stack by their double-precision floating point quotient.

Divide by zero results in the quotient being NaN.

irem

Integer remainder

Syntax:

> irem = 112

Stack: ..., value1, value2 => ..., result value1 and value 2 must both be integers. value1 is divided by value2, and both values are replaced on
the stack by their integer remainder.

An attempt to divide by zero results in a "/ by zero" ArithmeticException being thrown.

lrem

Long integer remainder

Syntax:

> lrem = 113

Stack: ..., value1-word1, value1-word2, value2-word1, value2-word2 => ..., result-word1, result-word2 value1 and value 2 must both be long integers. value1 is divided by value2, and both values are replaced on the stack by their long integer remainder.

An attempt to divide by zero results in a "/ by zero" ArithmeticException being thrown.

frem

Single float remainder
Syntax:

| *frem = 114* |

Stack: ..., value1, value2 => ..., result value1 and value 2 must both be single-precision floating point numbers. value1 is divided by value2, and the quotient is truncated to an integer, and then multiplied by value2. The product is subtracted from value1. The result, as a single-precision floating point number, replaces both values on the stack.
result = value1 - (integral_part(value1/value2) \*value2), where integral_part() rounds to the nearest integer, with a tie going to the even number.

An attempt to divide by zero results in NaN.

drem

Double float remainder
Syntax:

| drem = 115 |

Stack: ..., value1-word1, value1-word2, value2-word1, value2-word2 => ..., result-word1, result-word2 value1 and value 2 must both be double-precision floating point numbers. value1 is divided by value2, and the quotient is truncated to an integer, and then multiplied by value2. The product is subtracted from value1. The result, as a double-precision floating point number, replaces both values on the stack.
result = value1 - (integral_part(value1/value2) * value2), where integral_part() rounds to the nearest integer, with a tie going to the even number.

An attempt to divide by zero results in NaN.

ineg
Integer negate
Syntax:

| ineg = 116 |

Stack: ..., value => ..., result
value must be an integer. It is replaced on the stack by its arithmetic negation.

lneg
Long integer negate
Syntax:

| lneg = 117 |

Stack: ..., value-word1, value-word2 => ..., result-word1, result-word2
value must be a long integer. It is replaced on the stack by its arithmetic negation.

fneg
Single float negate
Syntax:

| fneg = 118 |

Stack: ..., value=> ..., result
value must be a single-precision floating point number. It is replaced on the stack by its arithmetic negation.

dneg
    Double float negate
    Syntax:

| dneg = 119 |

Stack: ..., value-word1, value-word2 => ..., result-word1, result-word2 value must be a double-precision floating point number. It is replaced on the stack by its arithmetic negation.

3.9 Logical Instructions ishl
    Integer shift left
    Syntax:

| ishl = 120 |

Stack: ...,value1, value2 => ..., result value1 and value 2 must be integers. value1 is shifted left by the amount indicated by the low five bits of value2. The integer result replaces both values on the stack.

ishr
    Integer arithmetic shift right
    Syntax:

| ishr = 122 |

Stack: ..., value1, value2 => ..., result value1 and value 2 must be integers. value1 is shifted right arithmetically (with sign extension) by the amount indicated by the low five bits of value2. The integer result replaces both values on the stack.

iushr
    Integer logical shift right

Syntax:

> iushr = 124

Stack: ..., value1, value2 => ..., result value1 and value 2 must be integers. value1 is shifted right logically (with no sign extension) by the amount indicated by the low five bits of value2. The integer result replaces both values on the stack.

lshl

Long integer shift left
Syntax:

> lshl = 121

Stack: ..., value1-word1, value1-word2, value2 => ..., result-word1, result-word2 value1 must be a long integer and value 2 must be an integer. value1 is shifted left by the amount indicated by the low six bits of value2. The long integer result replaces both values on the stack.

lshr

Long integer arithmetic shift right
Syntax:

> lshr = 123

Stack: ..., value1-word1, value1-word2, value2 => ..., result-word1, result-word2 value1 must be a long integer and value 2 must be an integer. value1 is shifted right arithmetically (with sign extension) by the amount indicated by the low six bits of value2. The long integer result replaces both values on the stack.

lushr

Long integer logical shift right
Syntax:

```
lushr = 125
```

Stack:   ..., value1-word1, value1-word2, value2-word1, value2-word2 => ..., result-word1, result-word2 value1 must be a long integer and value 2 must be an integer. value1 is shifted right logically (with no sign extension) by the amount indicated by the low six bits of value2. The long integer result replaces both values on the stack.

iand

Integer boolean AND
Syntax:
```
iand = 126
```

Stack:   ..., value1, value2 => ..., result
value1 and value 2 must both be integers. They are replaced on the stack by their bitwise logical and (conjunction).

land

Long integer boolean AND
Syntax:
```
land = 127
```

Stack:   ..., value1-word1, value1-word2, value2-word1, value2-word2 => ..., result-word1, result-word2 value1 and value 2 must both be long integers. They are replaced on the stack by their bitwise logical and (conjunction).

ior

Integer boolean OR
Syntax:
```
ior = 128
```

Stack: ..., value1, value2 => ..., result value1 and value 2 must both be integers. They are replaced on the stack by their bitwise logical or (disjunction).

lor

Long integer boolean OR
Syntax:

```
lor = 129
```

Stack: ..., value1-word1, value1-word2, value2-word1, value2-word2 => ..., result-word1, result-word2 value1 and value 2 must both be long integers. They are replaced on the stack by their bitwise logical or (disjunction).

ixor

Integer boolean XOR
Syntax:

```
ixor = 130
```

Stack: ..., value1, value2 => ..., result value1 and value 2 must both be integers. They are replaced on the stack by their bitwise exclusive or (exclusive disjunction).

lxor

Long integer boolean XOR
Syntax:

```
lxor = 131
```

Stack: ..., value1-word1, value1-word2, value2-word1, value2-word2 => ..., result-word1, result-word2 value1 and value 2 must both be long integers. They are replaced on the stack by their bitwise exclusive or (exclusive disjunction).

3.10 Conversion Operations i2l

Integer to long integer conversion
Syntax:

i2l = 133

Stack: ..., value => ..., result-word1, result-word2 value must be an integer. It is converted to a long integer. The result replaces value on the stack.

i2f

Integer to single float
Syntax:

i2f = 134

Stack: ..., value => ..., result value must be an integer. It is converted to a single-precision floating point number. The result replaces value on the stack.

i2d

Integer to double float
Syntax:

i2d = 135

Stack: ..., value => ..., result-word1, result-word2 value must be an integer. It is converted to a double-precision floating point number. The result replaces value on the stack.

l2i
Long integer to integer
Syntax:

| l2i = 136 |

Stack: ..., value-word1, value-word2 => ...,
result value must be a long integer. It is converted to an integer by taking the low-order 32 bits. The result replaces value on the stack.

l2f
Long integer to single float
Syntax:

| l2f = 137 |

Stack: ..., value-word1, value-word2 => ...,
result value must be a long integer. It is converted to a single-precision floating point number. The result replaces value on the stack.

l2d
Long integer to double float
Syntax:

| l2d = 138 |

Stack: ..., value-word1, value-word2 => ...,
result-word1, result-word2 value must be a long integer. It is converted to a double-precision floating point number. The result replaces value on the stack.

f2i
Single float to integer
Syntax:

| f2i = 139 |

-134-

Stack: ..., value => ..., result value must be a single-precision floating point number. It is converted to an integer. The result replaces value on the stack.

f2l

Single float to long integer
Syntax:

| f2l = 140 |

Stack: ..., value => ..., result-word1, result-word2 value must be a single-precision floating point number. It is converted to a long integer. The result replaces value on the stack.

f2d

Single float to double float
Syntax:

| *f2d = 141* |

Stack: ..., value => ..., result-word1, result-word2 value must be a single-precision floating point number. It is converted to a double-precision floating point number. The result replaces value on the stack.

d2i

Double float to integer
Syntax:

| 2di = 142 |

Stack: ..., value-word1, value-word2 => ..., result value must be a double-precision floating point number. It is converted to an integer. The result replaces value on the stack.

-135- d2l

Double float to long integer
Syntax:

> d2l = 143

Stack: ..., value-word1, value-word2 => ..., result-word1, result-word2 value must be a double-precision floating point number. It is converted to a long integer. The result replaces value on the stack.

d2f

Double float to single float
Syntax:

> 2df = 144

Stack: ..., value-word1, value-word2 => ..., result value must be a double-precision floating point number. It is converted to a single-precision floating point number. If overflow occurs, the result must be infinity with the same sign as value. The result replaces value on the stack.

int2byte

Integer to signed byte
Syntax:

> int2byte = 157

Stack: ..., value => ..., result value must be an integer. It is truncated to a signed 8-bit result, then sign extended to an integer. The result replaces value on the stack.

int2char

Integer to char
Syntax:

```
int2char = 146
```

Stack: ..., value => ..., result value must be an integer. It is truncated to an unsigned 16-bit result, then zero extended to an integer. The result replaces value on the stack.

int2short

Integer to short

Syntax:

```
int2short = 147
```

Stack: ..., value => ..., result value must be an integer. It is truncated to a signed 16-bit result, then sign extended to an integer. The result replaces value on the stack.

3.11 Control Transfer Instructions ifeq

Branch if equal to 0

Syntax:

```
ifeq = 153
branchbyte1
branchbyte2
```

Stack: ..., value => ...

value must be an integer. It is popped from the stack. If value is zero, branchbyte1 and branchbyte2 are used to construct a signed 16-bit offset. Execution proceeds at that offset from the address of this instruction. Otherwise execution proceeds at the instruction following the ifeq.

ifnull

Branch if null

-137-

Syntax:

| ifnull = 198 |
|---|
| branchbyte1 |
| branchbyte2 |

Stack: ..., value => ...

value must be a reference to an object. It is popped from the stack. If value is null, branchbyte1 and branchbyte2 are used to construct a signed 16-bit offset. Execution proceeds at that offset from the address of this instruction. Otherwise execution proceeds at the instruction following the ifnull.

iflt

Branch if less than 0

Syntax:

| iflt = 155 |
|---|
| branchbyte1 |
| branchbyte2 |

Stack: ..., value => ...

value must be an integer. It is popped from the stack. If value is less than zero, branchbyte1 and branchbyte2 are used to construct a signed 16-bit offset. Execution proceeds at that offset from the address of this instruction. Otherwise execution proceeds at the instruction following the iflt.

ifle

Branch if less than or equal to 0

Syntax:

| ifle=158 |
|---|
| branchbyte1 |
| branchbyte2 |

Stack: ..., value => ...

value must be an integer. It is popped from the
stack. If value is less than or equal to zero,
branchbyte1 and branchbyte2 are used to construct a
signed 16-bit offset. Execution proceeds at that
offset from the address of this instruction. Otherwise
execution proceeds at the instruction following the
ifle.

ifne
Branch if not equal to 0
Syntax:

| ifne=154 |
| branchbyte1 |
| branchbyte2 |

Stack: ..., value => ...
value must be an integer. It is popped from the
stack. If value is not equal to zero, branchbyte1 and
branchbyte2 are used to construct a signed 16-bit
offset. Execution proceeds at that offset from the
address of this instruction. Otherwise execution
proceeds at the instruction following the ifne.

ifnonnull
Branch if not null
Syntax:

| ifnonnull=199 |
| branchbyte1 |
| branchbyte2 |

Stack: ..., value => ...
value must be a reference to an object. It is
popped from the stack. If value is notnull,
branchbyte1 and branchbyte2 are used to construct a
signed 16-bit offset. Execution proceeds at that
offset from the address of this instruction. Otherwise

-139- execution proceeds at the instruction following the ifnonnull.

ifgt
Branch if greater than 0
Syntax:

| ifft=157 |
|---|
| branchbyte1 |
| branchbyte2 |

Stack: ..., value => ...

value must be an integer. It is popped from the stack. If value is greater than zero, branchbyte1 and branchbyte2 are used to construct a signed 16-bit offset. Execution proceeds at that offset from the address of this instruction. Otherwise execution proceeds at the instruction following the ifgt.

ifge
Branch if greater than or equal to 0
Syntax:

| ifge=156 |
|---|
| branchbyte1 |
| branchbyte2 |

Stack: ..., value => ...

value must be an integer. It is popped from the stack. If value is greater than or equal to zero, branchbyte1 and branchbyte2 are used to construct a signed 16-bit offset. Execution proceeds at that offset from the address of this instruction. Otherwise execution proceeds at the instruction following instruction ifge.

if_icmpeq
Branch if integers equal

Syntax:

| if_icmpeq=159 |
|---|
| branchbyte1 |
| branchbyte2 |

Stack: ..., value1, value2 => ...

value1 and value2 must be integers. They are both popped from the stack. If value1 is equal to value2, branchbyte1 and branchbyte2 are used to construct a signed 16-bit offset. Execution proceeds at that offset from the address of this instruction. Otherwise execution proceeds at the instruction following instruction if_icmpeq.

if_icmpne

Branch if integers not equal

Syntax:

| if_icmpne=160 |
|---|
| branchbyte1 |
| branchbyte2 |

Stack: ..., value1, value2 => ...

value1 and value2 must be integers. They are both popped from the stack. If value1 is not equal to value2, branchbyte1 and branchbyte2 are used to construct a signed 16-bit offset. Execution proceeds at that offset from the address of this instruction. Otherwise execution proceeds at the instruction following instruction if_icmpne.

if_icmplt

Branch if integer less than

Syntax:

| if_icmplt=161 |
|---|
| branchbyte1 |
| branchbyte2 |

Stack: ..., value1, value2 => ...

value1 and value2 must be integers. They are both popped from the stack. If value1 is less than value2, branchbyte1 and branchbyte2 are used to construct a signed 16-bit offset. Execution proceeds at that offset from the address of this instruction. Otherwise execution proceeds at the instruction following instruction if_icmplt.

if_icmpgt

Branch if integer greater than

Syntax:

| if_icmpgt=163 |
|---|
| branchbyte1 |
| branchbyte2 |

Stack: ..., value1, value2 => ...

value1 and value2 must be integers. They are both popped from the stack. If value1 is greater than value2, branchbyte1 and branchbyte2 are used to construct a signed 16-bit offset. Execution proceeds at that offset from the address of this instruction. Otherwise execution proceeds at the instruction following instruction if_icmpgt.

if_icmple

Branch if integer less than or equal to

Syntax:

| if_icmple=164 |
|---|
| branchbyte1 |
| branchbyte2 |

Stack: ..., value1, value2 => ...

value1 and value2 must be integers. They are both popped from the stack. If value1 is less than or equal to value2, branchbyte1 and branchbyte2 are used to construct a signed 16-bit offset. Execution proceeds
at that offset from the address of this instruction.
Otherwise execution proceeds at the instruction
following instruction if_icmple.

if_icmpge

Branch if integer greater than or equal to
Syntax:

| if_icmpge=162 |
| --- |
| branchbyte1 |
| branchbyte2 |

Stack:   ..., value1, value2 => ...

value1 and value2 must be integers.  They are both
popped from the stack.  If value1 is greater than or
equal to value2, branchbyte1 and branchbyte2 are used
to construct a signed 16-bit offset.  Execution
proceeds at that offset from the address of this
instruction.  Otherwise execution proceeds at the
instruction following instruction if_icmpge.

lcmp

Long integer compare
Syntax:

| lcmp=148 |
| --- |

Stack:   ..., **value1-word1,
value1-word2, value2-word1, value2-word1 => ..., result** value1 and value2 must be long integers.  They are
both popped from the stack and compared.  If value1 is
greater than value2, the integer value1 is pushed onto
the stack.  If value1 is equal to value2, the value 0
is pushed onto the stack.  If value1 is less than
value2, the value -1 is pushed onto the stack.

fcmpl

Single float compare ( 1 on NaN)
Syntax:

-143-

```
P:\DMS\8242\M-4722_U\0201661
```

> fcmp1=149

Stack: ..., value1, value2=> ...,result
    value1 and value2 must be single-precision
5   floating point numbers. They are both popped from the
stack and compared. If value1 is greater than value2,
the integer value 1 is pushed onto the stack. If
value1 is equal to value2, the value 0 is pushed onto
the stack. If value1 is less than value2, the value -1
10  is pushed onto the stack.
    If either value1 or value2 is NaN, the value -1 is
pushed onto the stack.

fcmpg
      Single float compare (1 on NaN)
    Syntax:

> fcmpg=150

Stack: ...,value1, value2=> ..., result
value1 and value2 must be single-precision
floating point numbers. They are both popped from the
stack and compared. If value1 is greater than value2,
the integer value 1 is pushed onto the stack. If
value1 is equal to value2, the value 0 is pushed onto
25  the stack. If value1 is less than value2, the value -1
is pushed onto the stack.
    If either value1 or value2 is NaN, the value 1 is
pushed onto the stack.

30  dcmp1
    Double float compare (-1 on NaN)
    Syntax:

> dcmp1-151

35  Stack: ..., **value1-word1, value1-word2, value2-word1,
value2-word1=> ..., result** value1 and value2 must be double-precision floating point numbers. They are both popped from the stack and compared. If value1 is greater than value2, the integer value 1 is pushed onto the stack. If value1 is equal to value2, the value 0 is pushed onto the stack. If value1 is less than value2, the value 1 is pushed onto the stack.

If either value1 or value2 is NaN, the value 1 is pushed onto the stack.

dcmpg

Double float compare (1 on NaN)

Syntax:

| dcmpg=152 |
|---|

Stack:  ..., value1-word1, value1-word2, value2-word1, value2-word1 => ..., result value1 and value2 must be double-precision floating point numbers. They are both popped from the stack and compared. If value1 is greater than value2, the integer value 1 is pushed onto the stack. If value1 is equal to value2, the value 0 is pushed onto the stack. If value1 is less than value2, the value -1 is pushed onto the stack.

If either value1 or value2 is NaN, the value 1 is pushed onto the stack.

if_acmpeq

Branch if object references are equal

Syntax:

| if_acmpeq=165 |
|---|
| branchbyte1 |
| branchbyte2 |

Stack:  ...,value1,value2 => ...

value1 and value2 must be references to objects. They are both popped from the stack. If the objects

-145- referenced are not the same, branchbyte1 and branchbyte2 are used to construct a signed 16-bit offset.

Execution proceeds at that offset from the Address of this instruction. Otherwise execution proceeds at the instruction following the if_acmpeq.

if_acmpne

Branch if object references not equal

Syntax:

| if_acmpne=166 |
|---|
| branchbyte1 |
| branchbyte2 |

Stack: ..., value1, value2 => ...

value1 and value2 must be references to objects. They are both popped from the stack. If the objects referenced are not the same, branchbyte1 and branchbyte2 are used to construct a signed 16-bit offset.

Execution proceeds at that offset from the address of this instruction. Otherwise execution proceeds at the instruction following instruction if_acmpne.

goto

Branch always

Syntax:

| goto=167 |
|---|
| branchbyte1 |
| branchbyte2 |

Stack: no change branchbyte1 and branchbyte2 are used to construct a signed 16-bit offset. Execution proceeds at that offset from the address of this instruction.

goto_w

Branch always (wide index)
Syntax:

| goto_w=200 |
|---|
| branchbyte1 |
| branchbyte2 |
| branchbyte3 |
| branchbyte4 |

Stack: no change branchbyte1, branchbyte2, branchbyte3, and branchbyte4 are used to construct a signed 32-bit offset.

Execution proceeds at that offset from the address of this instruction.

jsr

Jump subroutine
Syntax:

| jsr=168 |
|---|
| branchbyte1 |
| branchbyte2 |

Stack: ...=> ..., return-address branchbyte1 and branchbyte2 are used to construct a signed 16-bit offset. The address of the instruction immediately following the jsr is pushed onto the stack. Execution proceeds at the offset from the address of this instruction.

jsr_w

Jump subroutine (wide index)
Syntax:

| jsr_w=201 |
|---|
| branchbyte1 |
| branchbyte2 |
| branchbyte3 |

| branchbyte4 |
|---|

Stack: ...=> ..., return-address branchbyte1, branchbyte2, branchbyte3, and branchbyte4 are used to construct a signed 32-bit offset. The address of the instruction immediately following the jsr_w is pushed onto the stack. Execution proceeds at the offset from the address of this instruction.

ret

Return from subroutine
Syntax:

| ret=169 |
|---|
| vindex |

Stack: no change

Local variable vindex in the current JAVA frame must contain a return address. The contents of the local variable are written into the pc.

Note that jsr pushes the address onto the stack, and ret gets it out of a local variable. This asymmetry is intentional.

ret_w

Return from subroutine (wide index)
Syntax:

| ret_w=209 |
|---|
| vindexbyte1 |
| vindexbyte2 |

Stack: no change vindexbyte1 and vindexbyte2 are assembled into an unsigned 16-bit index to a local variable in the current JAVA frame. That local variable must contain a return address. The contents of the local variable are written into the pc. See the ret instruction for more information.

3.12 Function Return ireturn

Return integer from function
Syntax:

```
ireturn=172
```

Stack: ..., value => [empty]

value must be an integer. The value value is pushed onto the stack of the previous execution environment. Any other values on the operand stack are discarded. The interpreter then returns control to its caller.

lreturn

Return long integer from function
Syntax:

```
lreturn=173
```

Stack: ..., value-word1, value-word2 => [empty]

value must be a long integer. The value value is pushed onto the stack of the previous execution environment. Any other values on the operand stack are discarded. The interpreter then returns control to its caller.

freturn

Return single float from function
Syntax:

```
freturn=174
```

Stack: ..., value=> [empty]

value must be a single-precision floating point number. The value value is pushed onto the stack of the previous execution environment. Any other values
on the operand stack are discarded. The interpreter
then returns control to its caller.

dreturn
Return double float from function
Syntax:

> dreturn=175

Stack:  ..., value-word1, value-word2 => [empty]
value must be a double-precision floating point
number. The value value is pushed onto the stack of
the previous execution environment. Any other values
on the operand stack are discarded. The interpreter
then returns control to its caller.

areturn
Return object reference from function
Syntax:

> areturn=176

Stack:  ..., value => [empty]
value must be a reference to an object. The value
value is pushed onto the stack of the previous
execution environment. Any other values on the operand
stack are discarded. The interpreter then returns
control to its caller.

return
Return (void) from procedure
Syntax:

> return=177

Stack:  ...=> [empty]
All values on the operand stack are discarded.
The interpreter then returns control to its caller.

breakpoint

-150-

Stop and pass control to breakpoint handler
Syntax:

| breakpoint=202 |
|---|

Stack: no change

3.13 Table Jumping tableswitch

Access jump table by index and jump
Syntax:

| tableswitch=170 |
|---|
| ...0-3 byte pad... |
| default-offset1 |
| default-offset2 |
| default-offset3 |
| default-offset4 |
| low1 |
| low2 |
| low3 |
| low4 |
| high1 |
| high2 |
| high3 |
| high4 |
| ...jump offsets... |

Stack: ..., index=> ...

tableswitch is a variable length instruction. Immediately after the tableswitch opcode, between zero and three 0's are inserted as padding so that the next byte begins at an address that is a multiple of four. After the padding follow a series of signed 4-byte quantities: default-offset, low, high, and then high-low+1 further signed 4-byte offsets. The high-low+1 signed 4-byte offsets are treated as a 0-based jump table.

The index must be an integer. If index is less than low or index is greater than high, then default-offset is added to the address of this instruction. Otherwise, low is subtracted from index, and the index-low'th element of the jump table is extracted, and added to the address of this instruction.

lookupswitch

Access jump table by key match and jump
Syntax:

| lookupswitch=171 |
| --- |
| ...0-3 byte pad.. |
| default-offset1 |
| default-offset2 |
| default-offset3 |
| default-offset4 |
| npairs1 |
| npairs2 |
| npairs3 |
| npairs4 |
| ...match-offset pairs... |

Stack: ..., key=> ...

lookupswitch is a variable length instruction. Immediately after the lookupswitch opcode, between zero and three 0's are inserted as padding so that the next byte begins at an address that is a multiple of four.

Immediately after the padding are a series of pairs of signed 4-byte quantities. The first pair is special. The first item of that pair is the default offset, and the second item of that pair gives the number of pairs that follow. Each subsequent pair consists of a match and an offset.

The key must be an integer. The integer key on the stack is compared against each of the matches. If it is equal to one of them, the offset is added to the address of this instruction. If the key does not match any of the matches, the default offset is added to the address of this instruction.

3.14 Manipulating Object Fields putfield

Set field in object
Syntax:

| putfield=181 |
| indexbyte1 |
| indexbyte2 |

Stack:   ..., objectref, value=> ...
    OR
Stack:   ..., objectref, value-word1, value-word2=> ...

indexbyte1 and indexbyte2 are used to construct an index into the constant pool of the current class. The constant pool item will be a field reference to a class name and a field name. The item is resolved to a field block pointer which has both the field width (in bytes) and the field offset (in bytes).

The field at that offset from the start of the object referenced by object refwill be set to the value on the top of the stack.

This instruction deals with both 32-bit and 64-bit wide fields.

If object ref is null, aNullPointerException is generated.

If the specified field is a static field, anIncompatibleClassChangeError is thrown.

getfield

Fetch field from object
Syntax:

| getfield=180 |
|---|
| indexbyte1 |
| indexbyte2 |

Stack: ..., objectref=> ...,value
    OR
Stack: ..., objectref=> ..., value-word1, value-word2 indexbyte1 and indexbyte2 are used to construct an index into the constant pool of the current class. The constant pool item will be a field reference to a class name and a field name. The item is resolved to a field block pointer which has both the field width (in bytes) and the field offset (in bytes).

objectref must be a reference to an object. The value at offset into the object referenced by objectref replaces objectref on the top of the stack.

This instruction deals with both 32-bit and 64-bit wide fields.

If objectref is null, a NullPointerException is generated.

If the specified field is a static field, an IncompatibleClassChangeError is thrown.

putstatic

Set static field in class
Syntax:

| putstatic-179 |
|---|
| indexbyte1 |
| indexbyte2 |

Stack: ..., value=> ...
    OR
Stack: ..., value-word1, value-word2=> ...

indexbyte1 and indexbyte2 are used to construct an
index into the constant pool of the current class. The
constant pool item will be a field reference to a
static field of a class. That field will be set to
have the value on the top of the stack.
This instruction works for both 32-bit and 64-bit
wide fields.
If the specified field is a dynamic field, an
IncompatibleClassChangeError is thrown.

getstatic

Get static field from class
Syntax:

| getstatic=178 |
| --- |
| indexbyte1 |
| indexbyte2 |

Stack: ..., => ..., value
    OR
Stack: ..., => ..., value-word1, value-word2 indexbyte1 and indexbyte2 are used to construct an
index into the constant pool of the current class. The
constant pool item will be a field reference to a
static field of a class.
This instruction deals with both 32-bit and 64-bit
wide fields.
If the specified field is a dynamic field, an
IncompatibleClassChangeError is generated.

3.15 Method Invocation

There are four instructions that implement method
invocation.

invokevirtual    Invoke an instance method of an
                 object, dispatching based on the
                 runtime (virtual) type of the

-155-

|   |   |   |
|---|---|---|
|  | | object. This is the normal method dispatch in JAVA. |
|  | invokenonvirtual | Invoke an instance method of an object, dispatching based on the compile-time (non-virtual) type of the object. This is used, for example, when the keywordsuper or the name of a superclass is used as a method qualifier. |
|  | invokestatic | Invoke a class (static) method in a named class. |
|  | invokeinterface | Invoke a method which is implemented by an interface, searching the methods implemented by the particular run-time object to find the appropriate method. | invokevirtual

Invoke instance method, dispatch based on run-time type

Syntax:

| invokevirtual=182 |
|---|
| indexbyte1 |
| indexbyte2 |

Stack: ..., objectref, [arg1, [arg2 ...]], ...=>
...

The operand stack must contain a reference to an object and some number of arguments.indexbyte1 and indexbyte2 are used to construct an index into the constant pool of the current class. The item at that index in the constant pool contains the complete method signature. A pointer to the object's method table is retrieved from the object reference. The method signature is looked up in the method table. The method signature is guaranteed to exactly match one of the
method signatures in the table.

The result of the lookup is an index into the
method table of the named class, which is used with the
object's dynamic type to look in the method table of
that type, where a pointer to the method block for the
matched method is found. The method block indicates
the type of method (native, synchronized, and so on)
and the number of arguments expected on the operand
stack.

If the method is marked synchronized the monitor
associated with objectref is entered.

The objectref and arguments are popped off this
method's stack and become the initial values of the
local variables of the new method. Execution continues
with the first instruction of the new method.

If the object reference on the operand stack is
null, a NullPointerException is thrown. If during the
method invocation a stack overflow is detected, a
StackOverflowError is thrown.

invokenonvirtual

Invoke instance method, dispatching based on
compile-time type

Syntax:

| invokenonvirtual = 183 |
| indexbyte1 |
| indexbyte2 |

Stack: ..., objectref, [arg1, [arg2 ...]], ... =>
...

The operand stack must contain a reference to an
object and some number of arguments. indexbyte1 and
indexbyte2 are used to construct an index into the
constant pool of the current class. The item at that
index in the constant pool contains a complete method
signature and class. The method signature is looked up in the method table of the class indicated. The method
signature is guaranteed to exactly match one of the
method signatures in the table.

The result of the lookup is a method block. The
method block indicates the type of method (native,
synchronized, and so on) and the number of arguments
(nargs) expected on the operand stack.

If the method is marked synchronized the monitor
associated with objectref is entered.

The objectref and arguments are popped off this
method's stack and become the initial values of the
local variables of the new method. Execution continues
with the first instruction of the new method.

If the object reference on the operand stack is
null, a NullPointerException is thrown. If during the
method invocation a stack overflow is detected, a
StackOverflowError is thrown.

invokestatic

Invoke a class (static) method
Syntax:

| invokestatis = 184 |
|---|
| indexbyte1 |
| indexbyte2 |

Stack: ..., [arg1, [arg2 ...]], ... => ...

The operand stack must contain some number of
arguments.indexbyte1 and indexbyte2 are used to
construct an index into the constant pool of the
current class. The item at that index in the constant
pool contains the complete method signature and class.
The method signature is looked up in the method table
of the class indicated. The method signature is
guaranteed to exactly match one of the method
signatures in the class's method table.

-158-

The result of the lookup is a method block. The method block indicates the type of method (native, synchronized, and so on) and the number of arguments (nargs) expected on the operand stack.

If the method is marked synchronized the monitor associated with the class is entered.

The arguments are popped off this method's stack and become the initial values of the local variables of the new method. Execution continues with the first instruction of the new method.

If during the method invocation a stack overflow is detected, a StackOverflowError is thrown.

invokeinterface

Invoke interface method

Syntax:

| invokeinterface = 185 |
|---|
| indexbyte1 |
| indexbyte2 |
| nargs |
| reserved |

Stack: ..., objectref, [arg1, [arg2 ...]], ... => ...

The operand stack must contain a reference to an object and nargs-1 arguments. indexbyte1 and indexbyte2 are used to construct an index into the constant pool of the current class. The item at that index in the constant pool contains the complete method signature. A pointer to the object's method table is retrieved from the object reference. The method signature is looked up in the method table. The method signature is guaranteed to exactly match one of the method signatures in the table.

The result of the lookup is a method block. The method block indicates the type of method (native, synchronized, and so on) but unlike invokevirtual and invokenonvirtual, the number of available arguments (nargs) is taken from the bytecode.

If the method is markedsynchronized the monitor associated with objectref is entered.

The objectref and arguments are popped off this method's stack and become the initial values of the local variables of the new method. Execution continues with the first instruction of the new method.

If the objectref on the operand stack is null, a NullPointerException is thrown. If during the method invocation a stack overflow is detected, a StackOverflowError is thrown.

3.16 Exception Handling athrow

Throw exception or error

Syntax:

| athrow = 191 |

Stack: ..., objectref => [undefined]

objectref must be a reference to an object which is a subclass of Throwable, which is thrown. The current JAVA stack frame is searched for the most recent catch clause that catches this class or a superclass of this class. If a matching catch list entry is found, the pc is reset to the address indicated by the catch-list entry, and execution continues there.

If no appropriate catch clause is found in the current stack frame, that frame is popped and the object is rethrown. If one is found, it contains the location of the code for this exception. The pc is reset to that location and execution continues. If no appropriate catch is found in the current stack frame, that frame is popped and the objectref is rethrown.

If objectref is null, then a NullPointerException is thrown instead.

3.17 Miscellaneous Object Operations new

Create new object

Syntax:

| new = 187 |
| indexbyte1 |
| indexbyte2 |

Stack: ... => ..., objectref indexbyte1 and indexbyte2 are used to construct an index into the constant pool of the current class. The item at that index must be a class name that can be resolved to a class pointer, class. A new instance of that class is then created and a reference to the object is pushed on the stack.

checkcast

Make sure object is of given type

Syntax:

| checkcast = 192 |
| indexbyte1 |
| indexbyte2 |

Stack: ..., objectref => ..., objectref indexbyte1 and indexbyte2 are used to construct an index into the constant pool of the current class. The string at that index of the constant pool is presumed to be a class name which can be resolved to a class pointer, class. objectref must be a reference to an object.

checkcast determines whether objectref can be cast to be a reference to an object of class class. A null objectref can be cast to any class. Otherwise the
referenced object must be an instance of class or one
of its superclasses. If objectref can be cast to class
execution proceeds at the next instruction, and the
objectref remains on the stack.

If objectref cannot be cast to class, a
ClassCastException is thrown.

instanceof

Determine if an object is of given type
Syntax:

| instanceof = 193 |
| indexbyte1 |
| indexbyte2 |

Stack: ..., objectref => ..., result indexbyte1 and indexbyte2 are used to construct an
index into the constant pool of the current class. The
string at that index of the constant pool is presumed
to be a class name which can be resolved to a class
pointer, class. objectref must be a reference to an
object.

instanceof determines whether objectref can be
cast to be a reference to an object of the class class.
This instruction will overwrite objectref with 1 if
objectref is an instance of class or one of its
superclasses. Otherwise, objectref is overwritten by
0. If objectref is null, it's overwritten by 0.

3.18 Monitors monitorenter

Enter monitored region of code
Syntax:

| monitorenter = 194 |

Stack: ..., objectref => ...

objectref must be a reference to an object.

The interpreter attempts to obtain exclusive access via a lock mechanism to objectref. If another thread already has objectref locked, than the current thread waits until the object is unlocked. If the current thread already has the object locked, then continue execution. If the object is not locked, then obtain an exclusive lock.

If objectref is null, then a NullPointerException is thrown instead.

monitorexit

Exit monitored region of code

Syntax:

| monitorexit = 195 |

Stack: ..., objectref => ...

objectref must be a reference to an object. The lock on the object released. If this is the last lock that this thread has on that object (one thread is allowed to have multiple locks on a single object), then other threads that are waiting for the object to be available are allowed to proceed.

If objectref is null, then a NullPointerException is thrown instead.

Appendix A: An Optimization

The following set of pseudo-instructions suffixed by _quick are variants of JAVA virtual machine instructions. They are used to improve the speed of
interpreting bytecodes. They are not part of the virtual machine specification or instruction set, and are invisible outside of an JAVA virtual machine implementation. However, inside a virtual machine implementation they have proven to be an effective
optimization.

A compiler from JAVA source code to the JAVA virtual machine instruction set emits only non-_quick instructions. If the _quick pseudo-instructions are used, each instance of a non-_quick instruction with a
_quick variant is overwritten on execution by its_quick variant. Subsequent execution of that instruction instance will be of the_quick variant.

In all cases, if an instruction has an alternative version with the suffix_quick, the instruction
references the constant pool. If the_quick optimization is used, each non-_quick instruction with a_quick variant performs the following:

Resolves the specified item in the constant pool;
Signals an error if the item in the constant pool could not be resolved for some reason;

Turns itself into the _quick version of the instruction. The instructions putstatic, getstatic, putfield, and getfield each have two
_quick versions; and Performs its intended operation.

This is identical to the action of the instruction without the _quick optimization, except for the additional step in which the instruction overwrites
itself with its _quick variant.

The _quick variant of an instruction assumes that the item in the constant pool has already been resolved, and that this resolution did not generate any errors. It simply performs the intended operation on the resolved item.

Note: some of the invoke methods only support a single-byte offset into the method table of the object; for objects with 256 or more methods some invocations cannot be "quicked" with only these bytecodes.

This Appendix doesn't give the opcode values of the pseudo-instructions, since they are invisible and subject to change.

A.1 Constant Pool Resolution

When the class is read in, an array constant_pool [] of size n constants is created and assigned to a field in the class.constant_pool [0] is set to point to a dynamically allocated array which indicates which fields in the constant_pool have already been resolved.constant_pool [1] through constant_pool [nconstants - 1] are set to point at the "type" field that corresponds to this constant item.

When an instruction is executed that references the constant pool, an index is generated, and constant_pool[0] is checked to see if the index has already been resolved. If so, the value of constant_pool [index] is returned. If not, the value of constant_pool [index] is resolved to be the actual pointer or data, and overwrites whatever value was already in constant_pool [index].

A.2 Pushing Constants onto the Stack (_quick variants)

ldc1_quick

Push item from constant pool onto stack
Syntax:

| ldc1_quick |
|---|

-165-

|     indexbyte1     |

Stack:   ...=>...,item indexbyte1 is used as an unsigned 8-bit index into the constant pool of the current class. The item at that index is pushed onto the stack.

ldc2_quick

Push item from constant pool onto stack
    Syntax:

|     ldc2_quick     |
|     indexbyte1     |
|     indexbyte2     |

Stack:   ...=>...,item indexbyte1 and indexbyte2 are used to construct an index into the constant pool of the current class. The constant at that index is resolved and the item at that index is pushed onto the stack.

ldc2w_quick

Push long integer or double float from constant pool onto stack
    Syntax:

|     ldc2w_quick    |
|     indexbyte1     |
|     indexbyte2     |

Stack:   ...=>...,constant-word1,constant-word2 indexbyte1 and indexbyte2 are used to construct an index into the constant pool of the current class. The constant at that index is pushed onto the stack.

A.3 Managing Arrays (_quick variants)

anewarray_quick

Allocate new array of references to objects
Syntax:

| anewarray_quick |
|---|
| indexbyte1 |
| indexbyte2 |

Stack: ...,size=>result size must be an integer. It represents the number of elements in the new array.

indexbyte1 and indexbyte2 are used to construct an index into the constant pool of the current class. The entry must be a class.

A new array of the indicated class type and capable of holding size elements is allocated, and result is a reference to this new array. Allocation of an array large enough to contain size items of the given class type is attempted. All elements of the array are initialized to zero.

If size is less than zero, a NegativeArraySizeException is thrown. If there is not enough memory to allocate the array, an OutOfMemoryError is thrown.

multianewarray_quick

Allocate new multi-dimensional array
Syntax:

| multianewarray_quick |
|---|
| indexbyte1 |
| indexbyte2 |
| dimensions |

Stack: ...,size1,size2,...sizen=>result

Each size must be an integer. Each represents the number of elements in a dimension of the array.

-167- indexbyte1 and indexbyte2 are used to construct an index into the constant pool of the current class. The resulting entry must be a class.

dimensions has the following aspects:

It must be an integer ≥1.

It represents the number of dimensions being created. It must be ≤ the number of dimensions of the array class.

It represents the number of elements that are popped off the stack. All must be integers greater than or equal to zero. These are used as the sizes of the dimension.

If any of the size arguments on the stack is less than zero, a NegativeArraySizeException is thrown. If there is not enough memory to allocate the array, an OutOfMemoryError is thrown.

The result is a reference to the new array object.

A.4 Manipulating Object Fields (_quick variants)

putfield_quick

Set field in object

Syntax:

| putfield2_quick |
| offset |
| unused |

Stack:  ...,objectref,value=>...

objectref must be a reference to an object. value must be a value of a type appropriate for the specified field. offset is the offset for the field in that object. value is written at offset into the object. Both objectref and value are popped from the stack.

If objectref is null, a NullPointerException is generated.

putfield2_quick
Set long integer or double float field in object
Syntax:

| putfield2_quick |
|---|
| offset |
| unused |

Stack: ...,objectref,value-word1,value-word2=>...
objectref must be a reference to an object. value must be a value of a type appropriate for the specified field. offset is the offset for the field in that object. value is written at offset into the object. Both objectref and value are popped from the stack.

If objectref is null, a NullPointerException is generated.

getfield_quick
Fetch field from object
Syntax:

| getfield2_quick |
|---|
| offset |
| unused |

Stack: ...,objectref=>...,value
objectref must be a handle to an object. The value at offset into the object referenced by objectref replaces objectref on the top of the stack.

If objectref is null, a NullPointerException is generated.

getfield2_quick
Fetch field from object
Syntax:

| getfield2_quick |
|---|
| offset |
| unused |

-169-

Stack: ...,objectref=>...,value-word1,value-word2 objectref must be a handle to an object. The value at offset into the object referenced by objectref replaces objectref on the top of the stack.

If objectref is null, a NullPointerException is generated.

putstatic_quick

Set static field in class

Syntax:

| putstatic_quick |
| indexbyte1 |
| indexbyte2 |

Stack: ...,value=>...

indexbyte1 and indexbyte2 are used to construct an index into the constant pool of the current class. The constant pool item will be a field reference to a static field of a class.value must be the type appropriate to that field. That field will be set to have the value value.

putstatic2_quick

Set static field in class

Syntax:

| putstatic2_quick |
| indexbyte1 |
| indexbyte2 |

Stack: ...,value-word1,value-word2=>...

indexbyte1 and indexbyte2 are used to construct an index into the constant pool of the current class. The constant pool item will be a field reference to a static field of a class. That field must either be a long integer or a double precision floating point number. value must be the type appropriate to that field. That field will be set to have the value value.

getstatic_quick
Get static field from class
Syntax:

| getstatic_quick |
|---|
| indexbyte1 |
| indexbyte2 |

Stack: ...,=>...,value indexbyte1 and indexbyte2 are used to construct an index into the constant pool of the current class. The constant pool item will be a field reference to a static field of a class. The value of that field will replace handle on the stack.

getstatic2_quick
Get static field from class
Syntax:

| getstatic2_quick |
|---|
| indexbyte1 |
| indexbyte2 |

Stack: ...,=>...,value-word1,value-word2 indexbyte1 and indexbyte2 are used to construct an index into the constant pool of the current class. The constant pool item will be a field reference to a static field of a class. The field must be a long integer or a double precision floating point number. The value of that field will replace handle on the stack

A.5 Method Invocation (_quick variants)

invokevirtual_quick

Invoke instance method, dispatching based on run-time type

Syntax:

| invokevirtual_quick |
|---|
| offset |
| nargs |

Stack: ...,objectref,[arg1,[arg2...]]=>...

The operand stack must contain objectref, a reference to an object and nargs-1 arguments. The method block at offset in the object's method table, as determined by the object's dynamic type, is retrieved. The method block indicates the type of method (native, synchronized, etc.).

If the method is marked synchronized the monitor associated with the object is entered.

The base of the local variables array for the new JAVA stack frame is set to point to objectref on the stack, making objectref and the supplied arguments (arg1,arg2,...) the first nargs local variables of the new frame. The total number of local variables used by the method is determined, and the execution environment of the new frame is pushed after leaving sufficient room for the locals. The base of the operand stack for this method invocation is set to the first word after the execution environment. Finally, execution continues with the first instruction of the matched method.

If objectref is null, a NullPointerException is thrown. If during the method invocation a stack overflow is detected, a StackOverflowError is thrown.

invokevirtualobject_quick

Invoke instance method of class JAVA.lang.Object, specifically for benefit of arrays Syntax:

| invokevirtualobject_quick |
|---|
| offset |
| nargs |

Stack: ...,objectref,[arg1,[arg2...]]=>...

The operand stack must contain objectref, a reference to an object or to an array and nargs-1 arguments. The method block at offset in JAVA.lang.Object's method table is retrieved. The method block indicates the type of method (native, synchronized, etc.).

If the method is marked synchronized the monitor associated with handle is entered.

The base of the local variables array for the new JAVA stack frame is set to point to objectref on the stack, making objectref and the supplied arguments (arg1,arg2,...) the first nargs local variables of the new frame. The total number of local variables used by the method is determined, and the execution environment of the new frame is pushed after leaving sufficient room for the locals. The base of the operand stack for this method invocation is set to the first word after the execution environment. Finally, execution continues with the first instruction of the matched method.

If objectref is null, a NullPointerException is thrown. If during the method invocation a stack overflow is detected, a StackOverflowError is thrown.

invokenonvirtual_quick

Invoke instance method, dispatching based on compile-time type

Syntax:

| invokenonvirtual_quick |
|---|
| indexbyte1 |

| indexbyte2 |
|---|

Stack: ...,objectref,[arg1,[arg2...]]=>...

The operand stack must contain objectref, a reference to an object and some number of arguments. indexbyte1 and indexbyte2 are used to construct an index into the constant pool of the current class. The item at that index in the constant pool contains a method slot index and a pointer to a class. The method block at the method slot index in the indicated class is retrieved. The method block indicates the type of method (native, synchronized, etc.) and the number of arguments (nargs) expected on the operand stack.

If the method is marked synchronized the monitor associated with the object is entered.

The base of the local variables array for the new JAVA stack frame is set to point to objectref on the stack, making objectref and the supplied arguments (arg1, arg2,...) the first nargs local variables of the new frame. The total number of local variables used by the method is determined, and the execution environment of the new frame is pushed after leaving sufficient room for the locals. The base of the operand stack for this method invocation is set to the first word after the execution environment. Finally, execution continues with the first instruction of the matched method.

If objectref is null, a NullPointerException is thrown. If during the method invocation a stack overflow is detected, a StackOverflowError is thrown.

invokestatic_quick

Invoke a class (static) method

Syntax:

| invokestatic_quick |
|---|
| indexbyte1 |

|  indexbyte2  |
| --- |

Stack: ..., [arg1, [arg2...]]=>...

The operand stack must contain some number of
arguments. indexbyte1 and indexbyte2 are used to
construct an index into the constant pool of the
current class. The item at that index in the constant
pool contains a method slot index and a pointer to a
class. The method block at the method slot index in
the indicated class is retrieved. The method block
indicates the type of method (native, synchronized,
etc.) and the number of arguments (nargs) expected on
the operand stack.

If the method is marked synchronized the monitor
associated with the method's class is entered.

The base of the local variables array for the new
JAVA stack frame is set to point to the first argument
on the stack, making the supplied arguments
(arg1,arg2,...) the first nargs local variables of the
new frame. The total number of local variables used by
the method is determined, and the execution environment
of the new frame is pushed after leaving sufficient
room for the locals. The base of the operand stack for
this method invocation is set to the first word after
the execution environment. Finally, execution
continues with the first instruction of the matched
method.

If the object handle on the operand stack is null,
a NullPointerException is thrown. If during the method
invocation a stack overflow is detected, a
StackOverflowError is thrown.

invokeinterface_quick
Invoke interface method
Syntax:

|  invokeinterface_quick  |
| --- |

| |
|---|
| idbyte1 |
| idbyte2 |
| nargs |
| guess |

Stack: ...,objectref,[arg1,[arg2...]]=>...

The operand stack must contain objectref, a reference to an object, and nargs-1 arguments. idbyte1 and idbyte2 are used to construct an index into the constant pool of the current class. The item at that index in the constant pool contains the complete method signature. A pointer to the object's method table is retrieved from the object handle.

The method signature is searched for in the object's method table. As a short-cut, the method signature at slot guess is searched first. If that fails, a complete search of the method table is performed. The method signature is guaranteed to exactly match one of the method signatures in the table.

The result of the lookup is a method block. The method block indicates the type of method (native, synchronized, etc.) but the number of available arguments (nargs) is taken from the bytecode.

If the method is marked synchronized the monitor associated with handle is entered.

The base of the local variables array for the new JAVA stack frame is set to point to handle on the stack, making handle and the supplied arguments (arg1,arg2,...) the first nargs local variables of the new frame. The total number of local variables used by the method is determined, and the execution environment of the new frame is pushed after leaving sufficient room for the locals. The base of the operand stack for this method invocation is set to the first word after the execution environment. Finally, execution

-176-

P:\DMS\8242\M-4722_U\0201661 continues with the first instruction of the matched method.

If objectref is null, a NullPointerException is thrown. If during the method invocation a stack overflow is detected, a StackOverflowError is thrown.

guess is the last guess. Each time through, guess is set to the method offset that was used.

A.6 Miscellaneous Object Operations (_quick variants)
new_quick
Create new object
Syntax:

| new_quick |
|---|
| indexbyte1 |
| indexbyte2 |

Stack: ...=>...,objectref indexbyte1 and indexbyte2 are used to construct an index into the constant pool of the current class. The item at that index must be a class. A new instance of that class is then created and objectref, a reference to that object is pushed on the stack.

checkcast_quick
Make sure object is of given type
Syntax:

| checkcast_quick |
|---|
| indexbyte1 |
| indexbyte2 |

Stack: ...,objectref=>...,objectref objectref must be a reference to an object.
indexbyte1 and indexbyte2 are used to construct an index into the constant pool of the current class. The

-177- object at that index of the constant pool must have already been resolved.

checkcast then determines whether objectref can be cast to a reference to an object of class class. A null reference can be cast to any class, and otherwise the superclasses of objectref's type are searched for class. If class is determined to be a superclass of objectref's type, or if objectref is null, it can be cast to objectref cannot be cast to class, a ClassCastException is thrown.

instanceof_quick

Determine if object is of given type
Syntax:

| instanceof_quick |
| indexbyte1 |
| indexbyte2 |

Stack: ...,objectref=>...,result objectref must be a reference to an object. indexbyte1 and indexbyte2 are used to construct an index into the constant pool of the current class. The item of class class at that index of the constant pool must have already been resolved.

Instance of determines whether objectref can be cast to an object of the class class. A null objectref can be cast to any class, and otherwise the superclasses of objectref's type are searched for class. If class is determined to be a superclass of objectref's type, result is 1 (true). Otherwise, result is 0 (false). If handle is null, result is 0 (false).

We claim:

1. An instruction accelerator comprising:
   a processor for receiving a stream of instructions and a corresponding stream of instruction identifier values each of which uniquely identifies a corresponding instruction in the stream of instructions, wherein the instructions comprise a first non-quick instruction which has a first associated data set which must be accessed prior to executing the first non-quick instruction; and
   a memory coupled to the processor, the memory being adapted to:
      store one or more instruction identifier values, including a first instruction identifier value which identifies the first non-quick instruction;
      store one or more data sets, including the first associated data set;
      receive the stream of instruction identifier values; and
      compare a current instruction identifier value in the stream of instruction identifier values with the one or more instruction identifier values stored in the memory;
   wherein a data set is accessed from the memory when the current instruction identifier value in the stream of instruction identifier values matches an instruction identifier value stored in the memory, and wherein the data set remains in the memory for use by a subsequent non-quick instruction.

2. The instruction accelerator of claim 1, wherein the first instruction identifier value and the first data set are stored in the memory, and wherein the first associated data set is accessed when the current instruction identifier value matches the first instruction identifier value stored in the memory.

3. The instruction accelerator of claim 1, wherein the memory further comprises an input circuit, the input circuit being adapted to receive the stream of instruction identifier values and compare the current instruction identifier value with the one or more instruction identifier values stored in the memory.

4. The instruction accelerator of claim 3, wherein the first instruction identifier value and the first data set are stored in the memory, wherein the input circuit compares the current instruction identifier value with the first instruction identifier value.

5. The instruction accelerator of claim 3, wherein the memory further comprises an output circuit adapted to receive a data set associated with the current instruction identifier value when the input circuit detects that the current instruction identifier value matches an instruction identifier value stored in the memory.

6. The instruction accelerator of claim 5, wherein the first instruction identifier value and the first data set are stored in the memory, wherein the output circuit receives the first data set when the current instruction identifier value matches the first instruction identifier value.

7. The instruction accelerator of claim 1, wherein the memory is a content addressable memory.

8. The instruction accelerator of claim 3, wherein the input circuit causes the processor to locate and retrieve a data set associated with a current instruction associated with the current instruction identifier value from a remote program memory if the current instruction identifier value does not match the instruction identifier values stored in the memory.

9. The instruction accelerator of claim 8, wherein the input circuit causes the processor to locate and retrieve the first data set when the current instruction identifier value is the first instruction identifier value, and the current instruction identifier value does not match the instruction identifier values stored in the memory.

10. The instruction accelerator of claim 8, wherein the processor loads the retrieved data set and the current instruction identifier value into the memory.

11. The instruction accelerator of claim 1 wherein at least one of the data sets includes data from a constant pool entry.

12. The instruction accelerator of claim 11 wherein the at least one of the data sets including data from a constant pool entry is the first associated data set.

13. The instruction accelerator of claim 1 wherein the first associated data set has a known value when the first non-quick instruction is received by the processor.

14. A computer system comprising:
   an instruction decoder which receives a stream of instructions and provides a stream of decoded instructions and a corresponding stream of instruction identifier values each of which uniquely identifies a corresponding instruction in the stream of instructions;
   a processor for receiving the stream of decoded instructions and the stream of instruction identifier values, wherein the decoded instructions comprise a first non-quick instruction which has a first associated data set which must be accessed prior to executing the first non-quick instruction;
   a memory coupled to the processor, the memory being adapted to:
      store one or more instruction identifier values, including a first instruction identifier value which identifies the first non-quick instruction;
      store one or more data sets, including the first associated data set;
      receive the stream of instruction identifier values; and
      compare a current instruction identifier value in the stream of instruction identifier values with the one or more instruction identifier values stored in the memory; and
   an execution unit which is coupled to receive the stream of decoded instructions, the stream of instruction identifier values and the data sets stored in the memory;
   wherein a data set is accessed from the memory when the current instruction identifier value in the stream of instruction identifier values matches an instruction identifier value stored in the memory, and wherein the data set remains in the memory for use by a subsequent non-quick instruction.

15. The computer system of claim 14, wherein the memory further comprises an input circuit, the input circuit being adapted to receive the stream of instruction identifier values and compare the current instruction identifier value with the one or more instruction identifier values stored in the memory.

16. The computer system of claim 15, wherein the memory further comprises an output circuit adapted to receive a data set associated with the current instruction identifier value and provide the data set to the execution unit when the input circuit detects that the current instruction identifier value matches an instruction identifier value stored in the memory.

17. The computer system of claim 14, wherein the memory is a content addressable memory.

18. The computer system of claim 14, wherein the input circuit instructs the processor to locate and retrieve a data set associated with a current instruction associated with the current instruction identifier value from a remote program memory if the current instruction identifier value does not match the instruction identifier values stored in the memory.

19. The computer system of claim 18, further comprising a trap logic circuit coupled to the processor, wherein the trap logic circuit suspends operation of the processor while the data set is located and retrieved.

20. The computer system of claim 18, further comprising an operand stack for storing the retrieved data set.

21. The computer system of claim 18, further comprising software code for locating and retrieving the data sets.

22. A method of accelerating the execution of a non-quick instruction which requires the retrieval of an associated first data set before the non-quick instruction can be executed, the non-quick instruction having an associated first instruction identifier value that uniquely identifies the corresponding non-quick instruction, the method comprising the steps of:

storing the first instruction identifier value and the first data set in an associative memory;

comparing a current instruction identifier value associated with a current instruction with the first instruction identifier value stored in the memory;

accessing the first data set stored in the memory when the current instruction identifier value matches the first instruction identifier value;

providing the non-quick instruction, the first instruction identifier value and the first data set to an execution unit for execution when the ent instruction identifier value matches the first instruction identifier value; and retaining the first data set in the memory for use by a subsequent non-quick instruction.

23. A method of accelerating the execution of a non-quick instruction which requires the retrieval of an associated first data set before the non-quick instruction can be executed, the non-quick instruction having an associated first instruction identifier value that uniquely identifies the corresponding non-quick instruction, the method comprising the steps of:

storing one or more instruction identifier values in a memory;

comparing a current instruction identifier value associated with a current instruction with the instruction identifier values stored in the memory;

retrieving the first data set from a program memory when the current instruction is the non-quick instruction and the current instruction identifier value is the first instruction identifier value, and the current instruction identifier value does not match any of the instruction identifier values stored in the memory;

loading the retrieved first data set and the first instruction identifier value into the memory and retaining the first data set in the memory for use by a subsequent non-quick instruction.

\* \* \* \* \*

UNITED STATES PATENT AND TRADEMARK OFFICE
CERTIFICATE OF CORRECTION

PATENT NO.    :   6,065,108
ISSUE DATE    :   May 16, 2000
INVENTOR(S)   :   O'Connor, James Michael; Tremblay, Marc It is certified that error appears in the above-identified patent and that said Letters Patent is hereby corrected as shown below:

Col. 268, line 1, after "the" please delete "ent" and insert --current--.

Signed and Sealed this

Twenty-seventh Day of March, 2001

Attest:

NICHOLAS P. GODICI

Attesting Officer    Acting Director of the United States Patent and Trademark Office